United States Patent [19]

Wiggins, Jr. et al.

[11] 4,304,964

[45] Dec. 8, 1981

[54] VARIABLE FRAME LENGTH DATA CONVERTER FOR A SPEECH SYNTHESIS CIRCUIT

[75] Inventors: Richard H. Wiggins, Jr., Dallas; George L. Brantingham, Lubbock, both of Tex.

[73] Assignee: Texas Instruments Incorporated, Dallas, Tex.

[21] Appl. No.: 901,392

[22] Filed: Apr. 28, 1978

[51] Int. Cl.³ .............................................. G10L 1/00
[52] U.S. Cl. .............................. 179/1 SM; 179/1 SA
[58] Field of Search .......... 179/1 SM, 1 SA, 15.55 T, 179/15 BW, 15.55 R; 358/261; 364/900, 200; 370/79, 118

[56] References Cited

U.S. PATENT DOCUMENTS

| | | | |
|---|---|---|---|
| 3,104,284 | 9/1963 | French et al. | 179/1 SM |
| 3,641,496 | 2/1972 | Slavin | 179/1 SM |
| 4,058,676 | 11/1977 | Wilkes et al. | 179/1 SA |
| 4,092,665 | 5/1978 | Saran | 179/15 BW |
| 4,156,111 | 5/1979 | Downey et al. | 179/15 BW |

Primary Examiner—Mark E. Nusbaum
Assistant Examiner—E. S. Kemeny
Attorney, Agent, or Firm—William E. Hiller; Melvin Sharp; James T. Comfort

[57] ABSTRACT

A speech synthesis circuit is provided with a variable frame length data converter and the speech synthesizer is preferably integrated on an integrated circuit chips. The variable frame length data converter reduces the amount of data required to synthesizer human speech at a given quality level. Preferably, a full frame of data includes, a pitch parameter, an energy parameter, a repeat bit and a plurality of speech coefficients. Each parameter or coefficient has a preselected length, but each frame has a variable number of parameters or coefficients associated therewith. The parameters and coefficients are encoded and a particular code of the pitch parameter indicates that the speech is to be unvoiced. An unvoiced frame includes fewer coefficients that a voiced frame and the converter detects this particular pitch parameter and automatically sets the unsent coefficients to zero. The converter also detects the state of the repeat bit for controlling the synthesizing to use the coefficients received during the previous frame as the coefficient to be used to generate speech in response to the present frame. In this embodiment, when the repeat bit comes up, new pitch and energy parameters are inputted therewith. Further, the converters preferably detects particular codes in the energy parameter for determining when a pause occurs or when the last frame of data has been sent.

20 Claims, 54 Drawing Figures

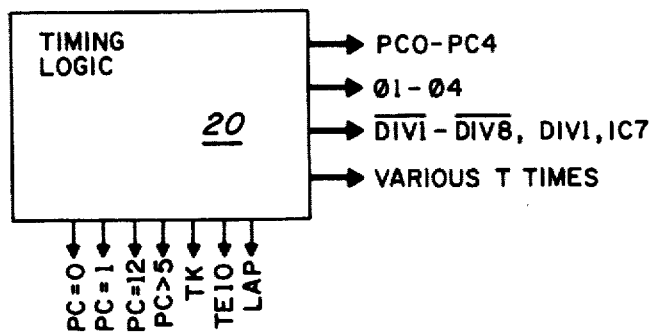
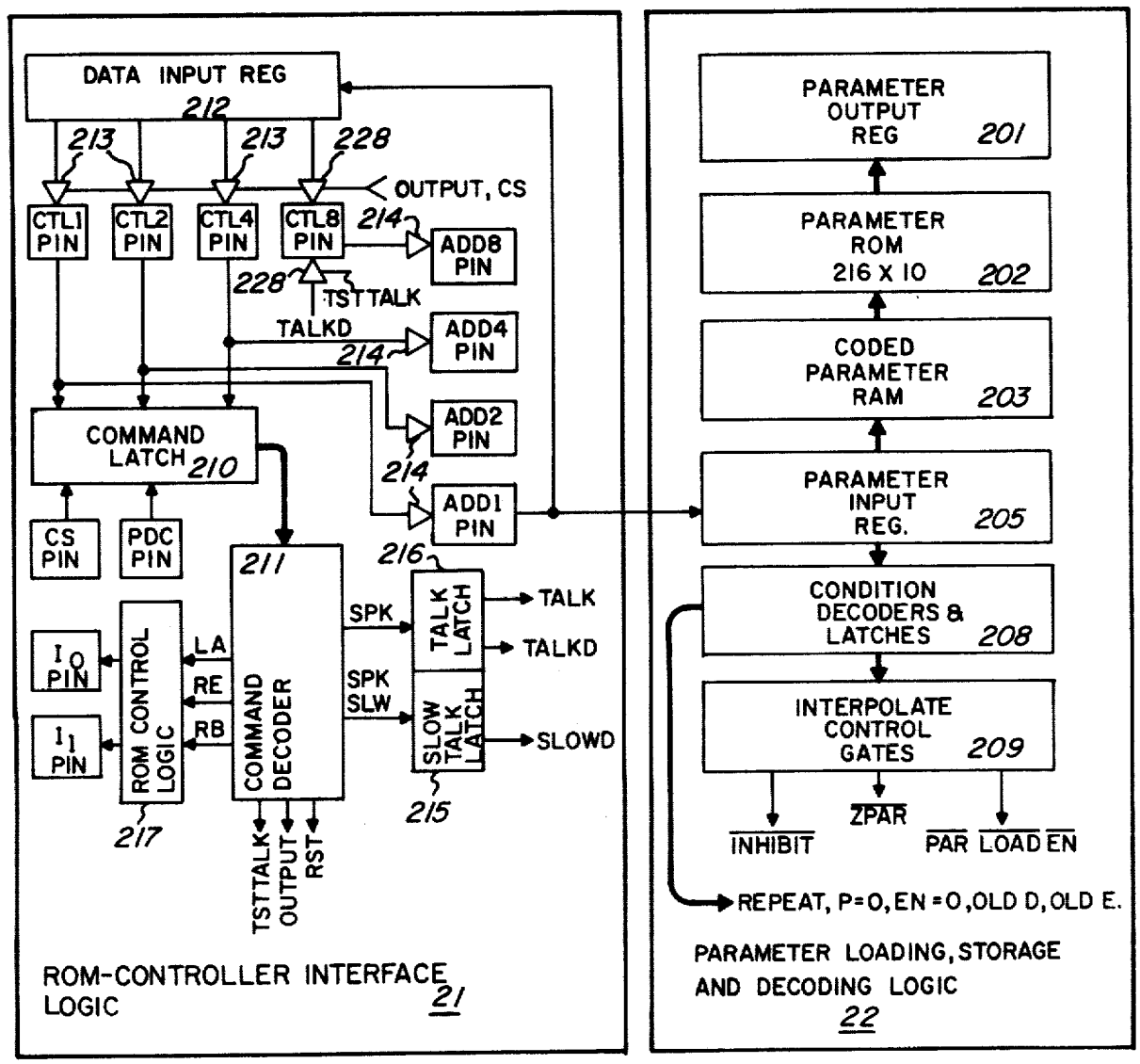
Fig. 4a

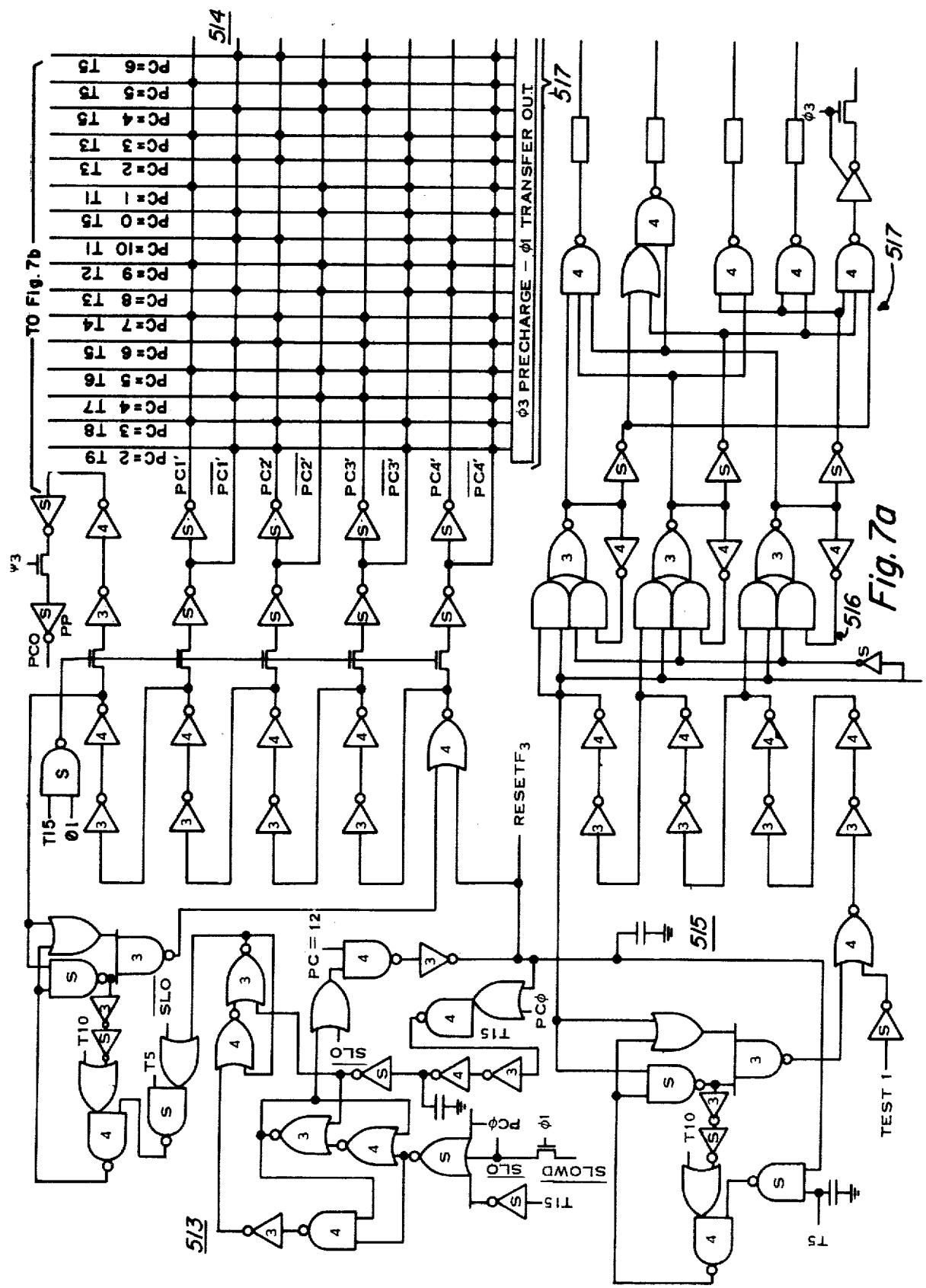

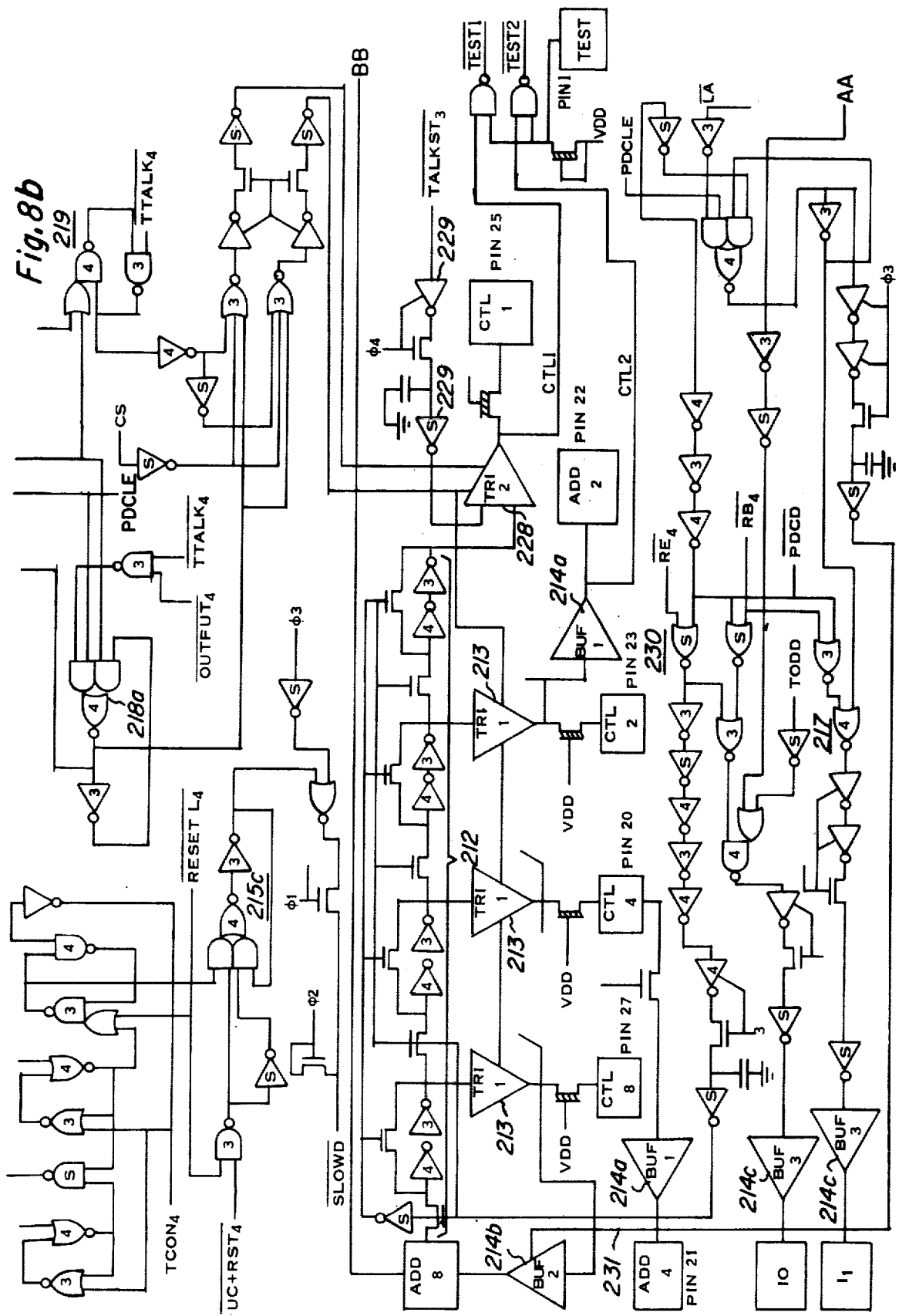

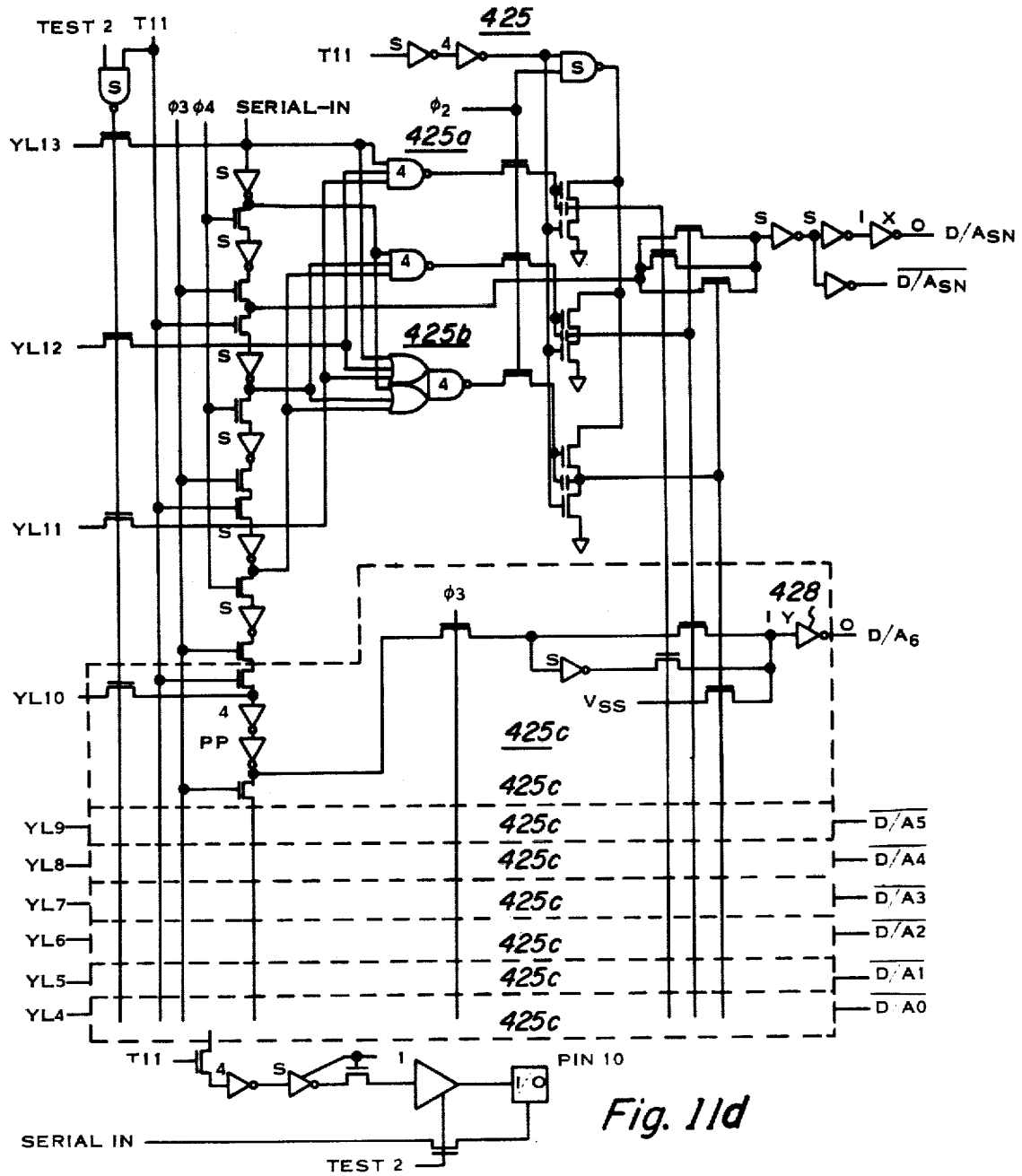
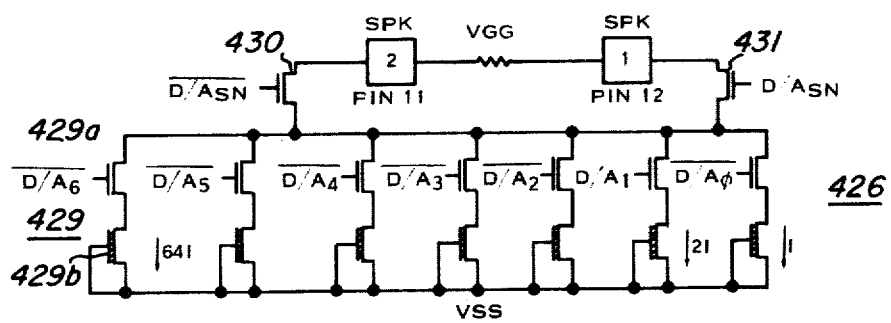
Fig. 11d

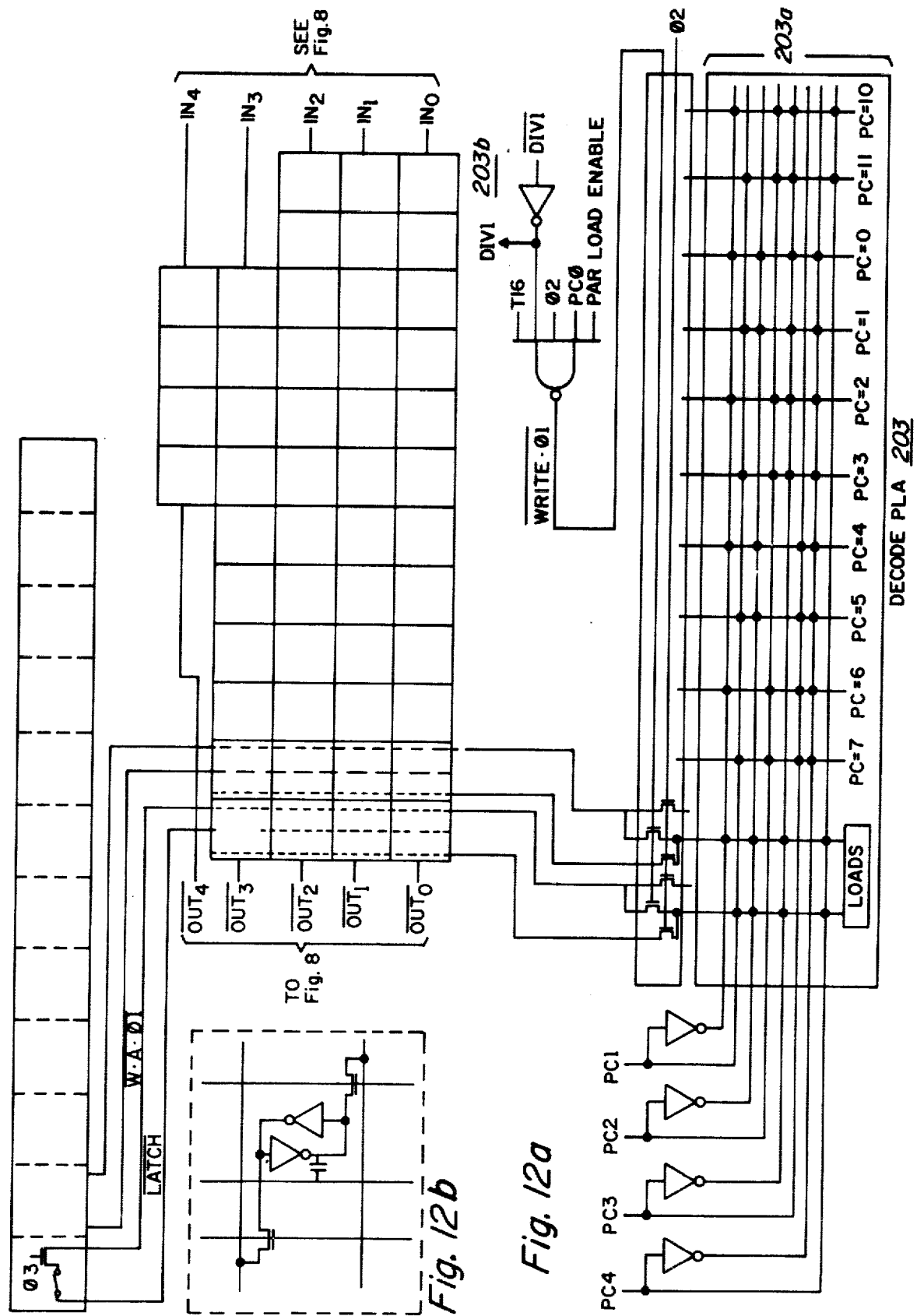

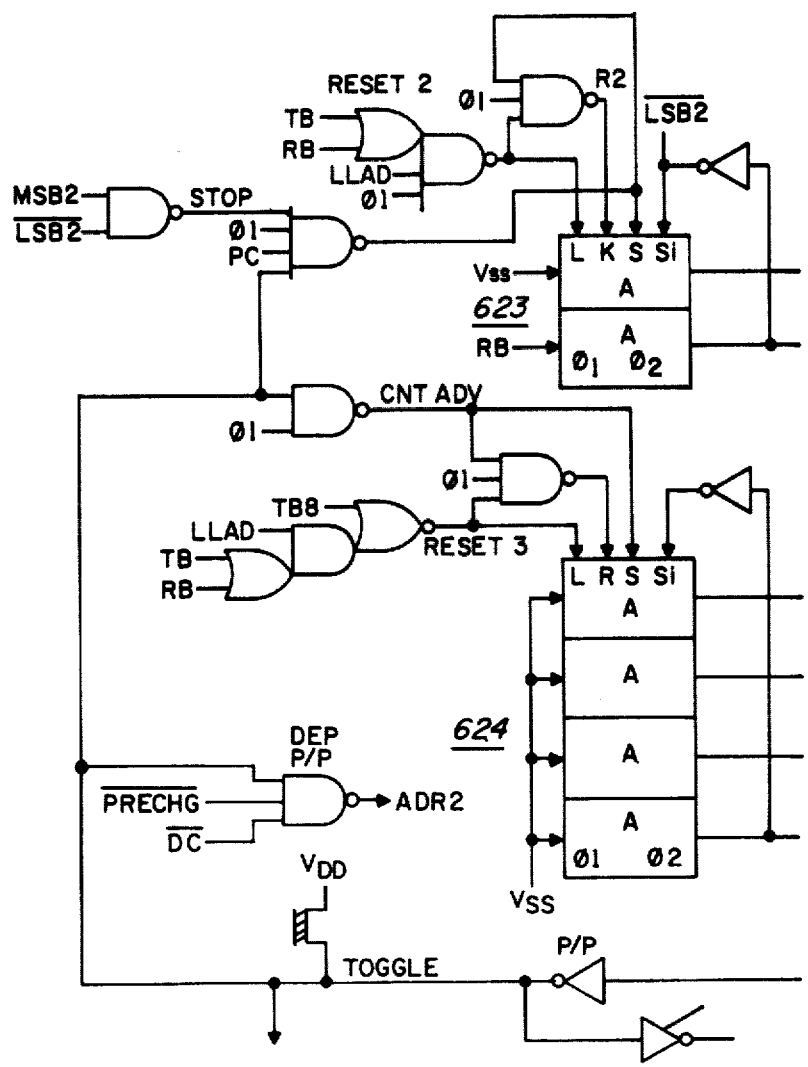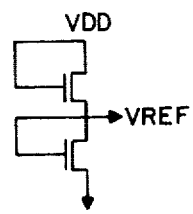
Fig. 20e

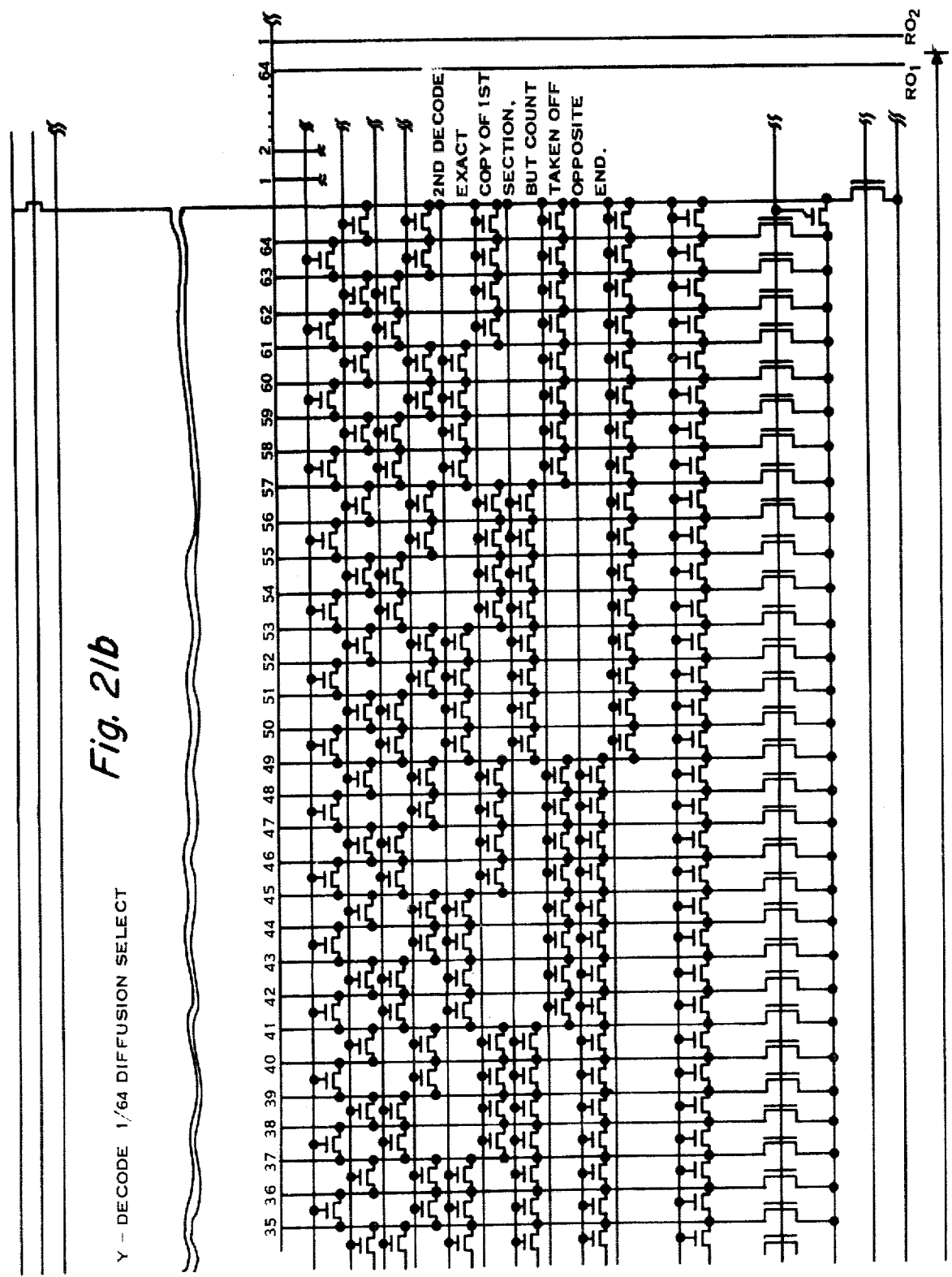
Fig. 2/b

VARIABLE FRAME LENGTH DATA CONVERTER FOR A SPEECH SYNTHESIS CIRCUIT

BACKGROUND OF THE INVENTION

This invention relates to a variable frame length data converter for speech synthesis circuits and particularly for those speech synthesis circuits capable of being implemented one, or a few, integrated circuit chips.

Several techniques are known in the prior art for digitizing human speech. For example, pulse code modulation, differential pulse code modulation, adaptive predictive coding, data modulation, channel vocoders, cepstrum, vocoders, format vocoders, voice excited vocoders and linear predictive coding techniques of speech digitalization are known. The techniques are briefly explained in "Voice Signals: Bit by Bit" on pages 28–34 of the October 1973 issue of *IEEE Spectrum*.

In certain applications and particularly those in which the digitized speech is to be stored in a memory tend to use the linear predictive coding technique because it produces very high quality speech using rather low data rates. Linear Predictive Coding systems usually make use of a multi-stage digital filter. In the past, the digital filter has typically been implemented by appropriately programming a large scale digital computer. However, in U.S. patent application Ser. No. 807,461, since abandoned and continued in U.S. patent application Ser. No. 905,328, filed May 12, 1978, filed June 11, 1977, there is taught a particularly useful digital filter for a speech synthesis circuit, which digital filter may be implemented on an integrated circuit using standard MOS or equivalent technology. A theoretical discussion of linear predictive coding can be found in "Speech Analysis and Synthesis by Linear Prediction of the Speech Wave" at Volume 50, number 2 (part 2)of *The Journal of the Acoustical Society of America*.

Disclosed herein is a talking learning aid which utilizes speech synthesis technology for producing human speech. A complete talking learning aid is disclosed, so, in addition to describing the speech synthesis circuits in detail, this patent also discloses the details of the learning aid's controller and the Read-Only-Memory devices used to store the digitized speech. Of course, those practicing the present invention may wish to practice the invention in conjunction with a talking learning aid, such as that described herein, other learning aids or any other application wherein the generation of human speech from digital data is desirable. Using the techniques described in the aforementioned U.S. patent application Ser. No. 804,461, since abandoned and continued in U.S. patent application Ser. No. 905,328, filed May 12, 1978, and the teachings of this patent permit those desiring to make use of digital speech technology to do so with one, or a small number of relatively inexpensive integrated circuit devices.

As aforementioned, linear predictive coding permits the synthesis of human speech from digital data having a relatively low data rate. For example, using ten bit parameters for speech energy, pitch and ten filter coefficients and by updating these twelve parameters fifty times per second yields very high quality speech and only at a bit rate of 6000 bits per second (bps). Thus, if this data were stored in a 131 K bit Read-Only-Memory, then 21.8 seconds of human speech would be stored therein. However, if the bit rate could be dropped to an average of 1000–1200 bps then that 131 k bit Read-Only-Memory could store 109 to 131 seconds of spoken speech. The advantages of being able to lower the bit rate while maintaining the quality of the resulting speech are obvious since less Read-Only-Memory capacity is required to store a given amount of speech. Thus, the primary objective of this invention was to effect a reduction of the bit rate without unduly affecting speech quality.

The foregoing objects are achieved as is now described. Variable frame length data is provided to the speech synthesis circuit. Preferably, a full length frame includes a pitch parameter, an energy parameter, a repeat bit and a plurality of speech coefficients. Each parameter is encoded according to a preselected coding scheme and has a preselected length, the encoded parameter being longer as its significance in speech synthesis increases. A particular encoded pitch parameter is used to signify that the speech is unvoiced. An unvoiced frame includes fewer speech coefficients than does a regular voiced frame. Thus the converter detects this particular encoded pitch parameter and automatically sets the unsent coefficients to zero. The repeat bit is used to signify that the frame contains pitch and energy parameters, but no speech coefficients. Thus, the converter is also sensitive to the repeat bit for controlling the synthesizer to use the speech coefficients from the previous frame during the present frame. Since the particular encoded pitch parameter may be used during a repeat frame, the repeat bit circuitry preferably takes preference over the particular encoded pitch parameter circuitry.

According to the foregoing the frame may include all, a few or none of the speech coefficients. To further reduce the data rate, the converter is preferably also responsive to particular encoded energy parameters indicating that a frame is either a pause or the last frame sent. Thus, the converter is preferably also responsive to these particular encoded energy parameters for controlling the speech synthesizer accordingly.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying drawings, wherein:

FIGS. 4a and 4b form a composite block diagram (when placed side by side) of the speech synthesizer chip;

FIGS. 7a–d form a composite logic diagram of the synthesizer's timing circuits;

FIGS. 8a–f form a composite logic diagram of the synthesizer's ROM/Controller interface logics;

FIGS. 11a–d form a composite logic diagram of the speech synthesizer's lattice filter and excitation generator;

FIGS. 12a and 12b are schematic diagrams of the parameter RAM;

FIGS. 20a–20f form a composite logic diagram of the control logic for ROMs 12a, 12b, 13a or 13b;

FIGS. 21a and 21b form a composite logic diagram of the X and Y address decoders and the array of memory cells;

GENERAL DESCRIPTION

Figure 1:
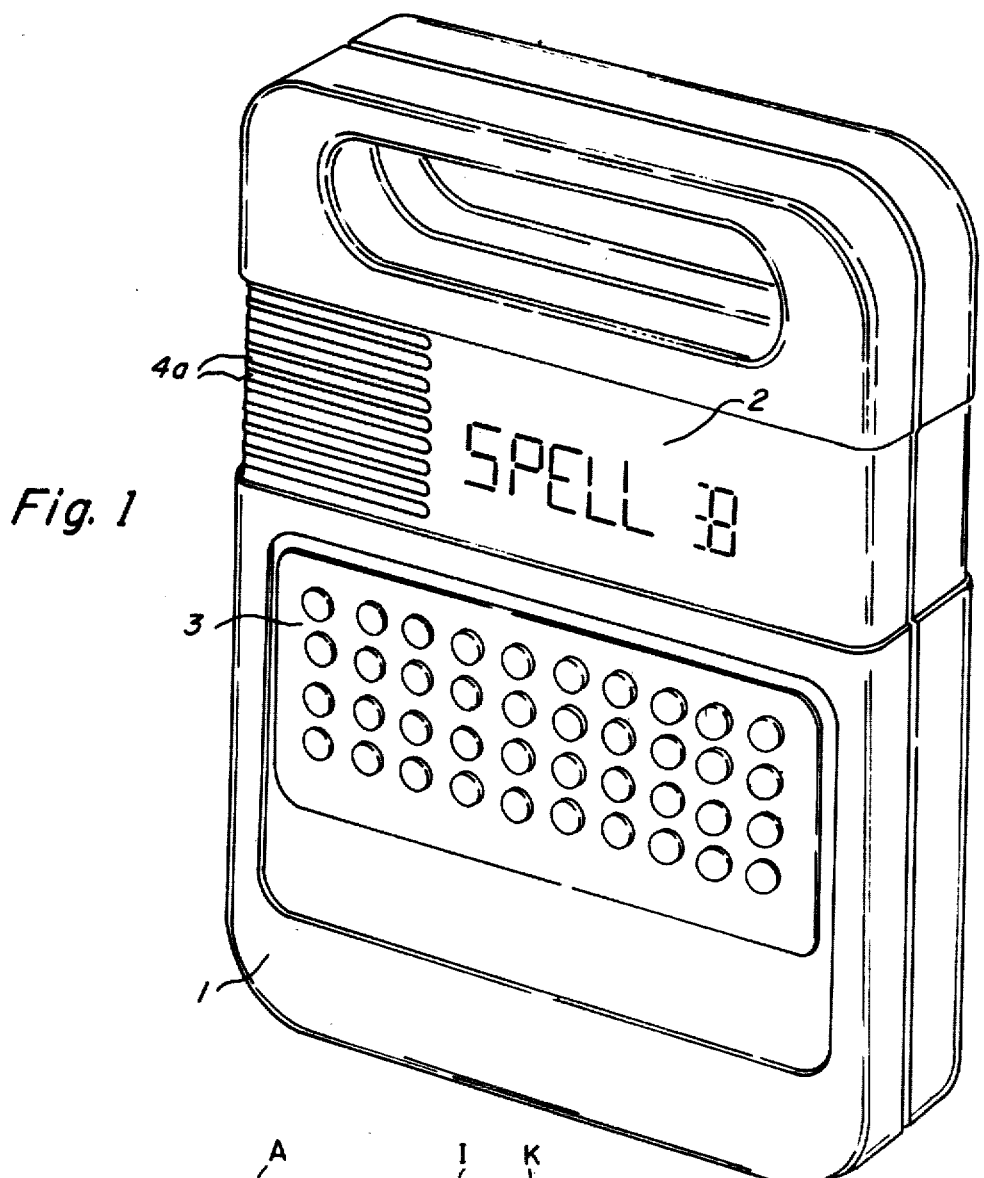
FIG. 1 is a front view of a talking learning aid.

FIG. 1 is a front view of a talking learning aid of the type which may embody the present invention. The learning aid includes a case 1 which encloses electronic circuits preferably implemented on integrated circuits (not shown in this figure). These circuits are coupled to a display 2, a keyboard 3 and a speaker 4 or other voice coil means (also not shown in FIG. 1). However, the openings 4a are shown behind which speaker 4 is preferably mounted. The display is preferably of the vacuum fluorescent type in the embodiment to be described; however, it will be appreciated by those skilled in the art that other display means, such as arrays of light emitting diodes, liquid crystal devices, electrochromic devices, gas discharge devices or other displays means alternatively may be used if desired. Also, in this embodiment, as a matter of design choice, the display has eight character positions. The keyboard 3 of the learning aid of this embodiment has forty key switch positions, twenty-six of which are used to input the letters of the alphabet into the learning aid. Of the remaining fourteen key switch positions, five are utilized for mode keys (on/spelling mode, learn mode, word guesser game mode, code breaker mode and random letter mode), another five are used to control functions performed by the learning aid in its modes (enter, say again, replay, erase and go) and the remaining four are used for an apostrophe key, a blank space key, a word list select key and an off key. The words spoken by the learning aid, as well as the correct spelling of those words, are stored as digital information in one or more Read-Only-Memories.

The learning aid depicted in FIG. 1 may be battery powered or powered from a source of external electrical power, as desired. The case is preferably made from injection molded plastic and the keyboard switches may be provided by two 5 by 8 arrays of key switches of the type disclosed in U.S. Pat. No. 4,005,293, if desired. Of course, other types of case materials or switches alternatively may be used.

Having described the outward appearance of the learning aid, the modes in which the learning aid may operate will be first described followed by a description of the block diagrams and detailed logic diagrams of the various electronic circuits use to implement the learning aid of FIG. 1.

MODES OF OPERATION

The learning aid of this embodiment has five modes of operation which will be subsequently described. It will be evident to those skilled in the art, however, that these modes of operation may be modified, reduced in number or expanded in capability. As a matter of design choice, the present talking and learning aid is provided with the following modes of operation.

The first mode, the spelling mode, is automatically entered when the "on" key is depressed. In the spelling mode the learning aid randomly selects ten words from a selected word list and at a selected difficulty category within the selected word list. The word list may be changed by depressing the "word list select" key which is coupled to a software implemented flip flop circuit which flips each time the "word list select" key is depressed. The word list select flip flop then determines, as will be seen, which pair of read-only-memories from which the ten words will be randomly selected. Each word list preferably includes words arranged in four levels of difficulty. This embodiment of the learning automatically enters the least difficult level of difficulty. The fact that the least difficulty level has been selected is shown by displaying "SPELL A" in display 2. The level difficulty may be increased by depressing the B, C or D keys, and display 2 will show, in response, "SPELL B", "SPELL C" or "SPELL D", respectively. Having selected the word list and level difficulty, the "go" key is depressed upon which the learning aid commences to randomly select ten words and to say the word "spell" followed by the first randomly selected word. A dash, that being segment D in display 2 (FIG. 2), comes up in the left hand most character position. At this time the student may either (1) enter his or her spelling of the word and then depress the "enter" key or (2) depress the "say again" key. The student may also depress the "erase" key if he or she realizes that the spelling being inputted is incorrect before having depressed the "enter" key; the student may then again try to input the correct spelling. The "say again" key causes the word to be spoken by the learning aid again. In some embodiments a subsequent depression of the "say again" key may cause the selected word to be repeated once more, however, then at a slower rate. As the student enters his or her spelling of the word using the alphabet keys at keyboard 3, the inputted spelling appears at display 2 and the shifts from left to right as the letters are inputted. Following the depression the "enter" key, the learning aid compares the student's spelling with a correct spelling, which is stored in one of the Read-Only-Memories, and verbally indicates to the student whether the student spelling was correct or incorrect. The verbal response is also stored as digital information in a Read-Only-Memory. Of course, a visual response may likewise or alternatively be used, if desired. In this embodiment the student is given two opportunities to spell the word correctly and if the student has still failed to correctly spell the word, the learning aid then verbally (via speaker 4) and visually (via display 2) spells the word for the student and goes on to the next word from the group of ten randomly selected words.

At the end the test of the spelling of the ten randomly selected words, the learning aid then verbally and visually indicates the number of right and wrong answers. Further, in order to give the student additional reinforcement, the learning aid preferably gives a audible response which is a function of the correctness of the spellings. In this embodiment the learning aid plays a tune, the number of notes of which is a function of the correctness of the student's spellings for the group of selected words. The use of the "enter", "say again", "erase", and "go" function keys has just been described with reference to the spelling mode of operation. There is an additional function key, "replay", whose function has not yet been described. The "replay" key causes the learning aid to repeat the group of ten randomly selected words after the group has been completed or causes the learning aid to start over with the first word of the group of ten words if it is depressed during the progression through the group. Alternatively, at the end of a group of ten words, the student may depress the "go" which initiates the random selection of another group of ten words from the selected word list.

An exemplary set of spell mode problems is shown in Table I; exemplary key depressions, which a student might make during the exemplary set of problems, are listed along with the responses made by the learning aid at display 2 and speaker 4.

The learn mode is entered by depressing the "learn" key. In the learn mode, after the "go" key is depressed the learning aid randomly selects ten words from the selected word list at the selected difficulty level and then proceeds to display the first randomly selected word at display 2 and approximately one second later to speak "say it". Approximately two seconds thereafter the learning proceeds to pronounce the word shown in display 2. During this interval the student is given the opportunity to try to pronounce the word spelled at display 2; the learning aid then goes on to demonstrate how the word should be pronounced. After going through the ten randomly selected words the learning automatically returns to the aforementioned spell mode, but the ten words tested during the spell mode are the ten words previously presented during the learn mode. While in the learn mode the "say again", "erase", "repeat" and "enter" keys are invalid. The difficulty level is selected as in the spelling mode, but in the learn mode the learning aid displays the various levels as "SAY IT A", "SAY IT B", etc. Depressing the "go" key causes the learning aid to select another group of ten words in the learn mode. An exemplary set of learn mode problems are set forth in Table II.

The word guesser mode is entered by depressing the "word guesser" mode key. In the word guesser mode the learning aid randomly selected a word from the selected word list and displays dashes in a number of character positions at display 2, the number of character positions corresponding to the number of letters in the randomly selected word. Thus, if the learning aid randomly selects the word "course" for instance, then the dashes will appear in six of the eight character positions in display 2, starting with the left most position and proceeding to the right for six character positions. The dash is shown in the characters of the display by energizing the D segments in those character positions (see FIG. 2). The child may then proceed to enter his or her guesses of the letters in the randomly selected word by depressing the letter keys at keyboard 2. For a correct choice, the learning aid gives an audible response of four tones and shows every place the chosen letter occurs in the randomly selected word. Once letters have been correctly guessed, they remain in the display until the end of the game. For incorrect guesses the learning aid preferably makes no response, but may alternatively say something like "incorrect guess." In this embodiment the child is given six incorrect guesses. Upon the seventh incorrect guess the learning says "I win". On the other hand, if the child correctly guesses all the letters before making seven incorrect guesses the learning aid speaks "you win" and gives an audible response of four tones. Thus in the word guesser mode, the learning aid permits the child to play the traditional spelling game known as "hangman" either by himself or herself or along with other children. Exemplary word guesser problems are set forth in Table III.

The disclosed learning aid has another mode of operation known as "code breaker" which is entered by depressing the "code breaker" mode key. In this mode the child may enter any word of his or her choice and upon depressing the "enter key" the letters in the display are exchanged according to a predetermined code. Thus, in the code breaker mode the learning aid may be used to encode words selected by the child. Further in the code breaker mode the learning aid may be used to decode the encoded words by entering the encoded word and depressing the "enter key".

Another mode with which the learning aid may be provided is the "random letter" mode which is entered by depressing the "random letter" key. In the random letter mode the learning automatically displays in response to depression of the "go" key a randomly selected letter of the alphabet in the first character position of display 2. The letters of the alphabet occur in approximate proportion to as they occur in the english language; thus, the more commonly letters are displayed more frequently than uncommonly used letters. If the "go" key is again depressed then another randomly selected letter is displayed in the first character position and the previously selected letter moves right to the second character position and so forth in response to further depressions of the "random letter" key.

Figure 2:
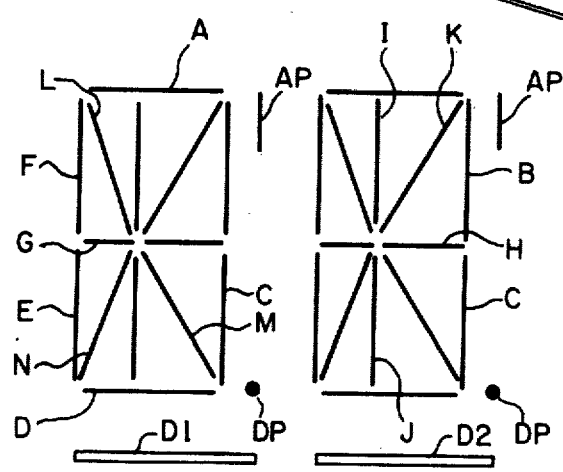
FIG. 2 depicts the segment details of the display.

Referring now to FIG. 2, there is shown a preferred arrangement of the segments of display 2. Display 2 preferably has eight character positions each of which is provided by a sixteen segment character has fourteen segments arranged somewhat like a "British flag" with an additional two segments for an apostrophe and a decimal point. In FIG. 2, segments a-n are arranged more or less in the shape of the "British flag" while segment ap provides apostrophe and segment dpt provides a decimal point. Segment conductors Sa through Sn, Sdp and Sap are respectively coupled to segments a through n, dpt and ap in the eight character positions of display 2. Also, for each character position, there is a common electrode, labeled as D1-D8. When display 2 is provided by a vacuum flourescent display device, the segments electrodes are provided anodes in the vacuum flourescent display device while each common electrode is preferably provided by a grid associated with each character position. By appropriately multiplexing signals on the segment conductors (Sa-Sn, Sdpt and Sap) with signals on the character common electrodes (D1-D8) the display may be caused to show the various letters of the alphabet, a period, and an apostrophe and various numerals. For instance, by appropriately energizing segment conductors A,B,C,E and F when character common electrode D1 is appropriately energized the letter A is actuated in the first character position of display 2. Further, by appropriate strobing segment conductors A,B,C,D,H,I and J when character common electrode D2 is appropriately energized, the letter B is caused to be actuated in the second character position of display 2. It should be evident to those skilled in the art that the other letters of the alphabet as well as the apostrophe, period and numerals may be formed by appropriate energization of appropriate segment conductors and common electrodes. In operation, the character common electrodes D1-D8 are sequentially energized with an appropriate voltage potential as selected segment conductors are energized to their appropriate voltage potential to produce a display of characters at display 2. Of course, the segment electrodes could alternatively be sequentially energized as the digit electrodes are selectively energized in producing a display at display 2.

BLOCK DIAGRAM OF THE LEARNING AID

Figure 3:
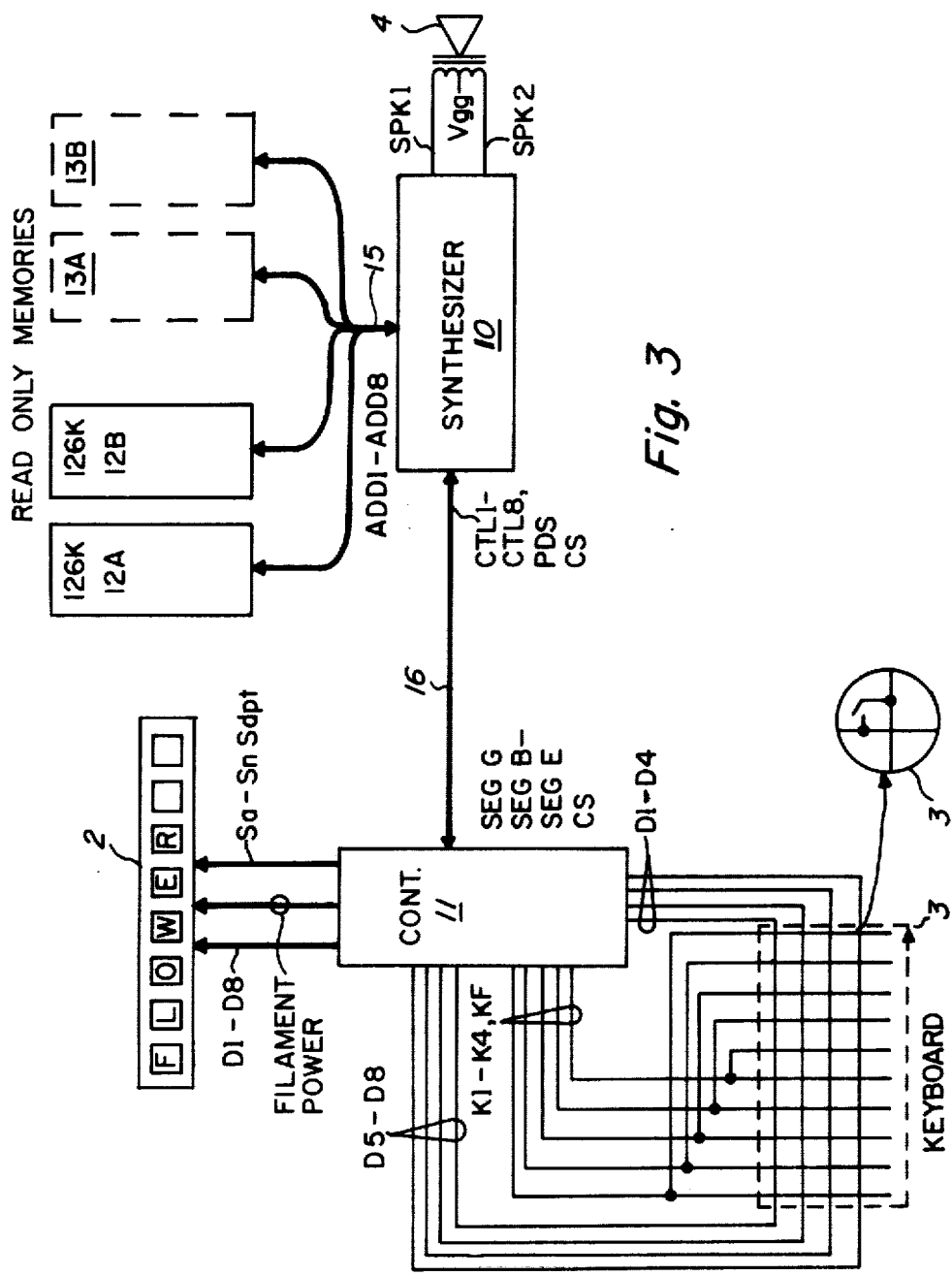
FIG. 3 is a block diagram of the major components preferably making up the learning aid.

FIG. 3 is a block diagram of the major components making up the disclosed embodiment of a speaking learning aid. The electronics of the disclosed learning aid may be divided into three major functional groups, one being a controller 11, another being a speech synthesizer 10, and another being a read-only-memory (ROM) 12. In the embodiment disclosed, these major electronic functional groups are each integrated on separate integrated circuit chips except for the ROM functional group which is integrated onto two integrated circuit chips. Thus, the speech synthesizer 10 is preferably implemented on a single integrated circuit denoted by the box labeled 10 in FIG. 3 while the controller is integrated on a separate integrated circuit denoted by a box 11 in FIG. 3. The word list for the learing aid is stored in the ROM functional group 12, which stores both the correct spellings of the words as well as frames of digital coding which are converted by speech synthesizer 10 to an electrical signal which drives speaker or other voice coil means 4. In the embodiment disclosed, ROM functional group 12 is preferably provided with 262,144 bits of storage. As a matter of design choice, the 262,144 bits of data is divided between two separate read-only-memory chips, represented in FIG. 3 at numerals 12a and 12b. The memory capacity of ROM functional group 12 is a design choice; however, using the data compression features which are subsequentially discussed with reference to FIG. 6, the 262,144 bits of read-only-memory may be used to store on the order of 250 words of spoken speech and their correct spellings as well as various tones, praise phrases and correction phases spoken by the learning aid.

As is discussed with reference to FIG. 1, the "word list select" key causes the learning aid to select words from another word list. In FIG. 3, the basic word list used with the learning aid is stored in ROMs 12a and 12b along with their spellings and appropriate phraseology which the learning aid speaks during its different modes of operation. The second word list, which may be selected by depressing the "word list select" key, is preferably stored in another pair of ROMs 13a and 13b. In FIG. 3 these are depicted by dashed lines because these read-only-memories are preferably plugged into the learning aid by a person using the system (of course, when children use the system it is preferable that an adult change the read-only-memories since children may not have the required manual dexterity) rather than normally packaged with the learning aid. In this manner many different "libraries" of word lists may be made available for use with the learning aid.

Of course, the number of chips on which the learning aid is implemented is a design choice and as large scale integration techniques are improved (using electron beam etching and other techniques), the number of integrated circuit chips may be reduced from four to as few as a single chip.

Synthesizer chip 10 is interconnected with the read-only-memories via data path 15 and is interconnected with controller 11 via data path 16. The controller 11, which may be provided by an appropriately programmed microprocessor type device, preferably actuates display 2 by providing segment information on segment conductors Sa-Sn, Sdpt and Sap along with character position information on connectors D1-D8. In the embodiment herein disclosed, controller 11 preferably also provides filament power to display 2 when a vacuum fluorescent device is used therefor. Of course, if a liquid crystal, electrochromographic, light emitting diode or gas discharge display were used such filament power would not be required. One technique for generating filament power on a controller chip is described in U.S. patent application Ser. No. 843,017 filed Oct. 17, 1977. Controller 11 also scans keyboard 3 for detecting key depressions thereat. Keyboard 3 has forty switch positions which are shown in representative form in FIG. 3, the switch locations occurring where the conductors cross within the dashed line at numeral 3 in FIG. 3. A switch closure causes the conductors shown as crossing in FIG. 3 to be coupled together. At numeral 3' the switch occurring at a crossing of conductors at numeral 3 is shown in detail. In addition to actuating display 2 and sensing key depression at keyboard 3, controller 11 also perform such functions as providing addresses for addressing ROMs 12a and 12b (via synthesizer 10), comparing the correct spellings from ROMs 12a or 12b with spellings inputted by a student at keyboard 3, and other such functions which will become apparent. Addresses from controller 11 are transmitted to ROMs 12a-b by synthesizer 10 because, as will be seen, synthesizer 10 preferably is equipped with buffers capable of addressing a plurality of read-only-memories. Preferably, only one of the pairs of ROMs will output information in response to this addressing because of a chip select signal which is transmitted from synthesizer 10 to all the Read-Only-Memories. Controller 11, in this embodiment, transmits addresses to the ROMs via synthesizer 10 so that only synthesizer 10 output buffers need be sized to transmit addresses to a plurality of ROMs simultaneously. Of course, controller 11 output buffers could also be sized to transmit information to a pluralitly of read-only-memories simultaneously and thus in certain embodiments it may be desirable to also couple controller 11 directly to the ROMs.

As will be seen, synthesizer chip 10 synthesizes human speech or other sounds according to frames of data stored in ROMs 12a-12b or 13a-13b. The synthesizer 10 employs a digital lattice filter of the type described in U.S. patent application Ser. No. 807,461, filed June 17, 1977. U.S. patent application Ser. No. 807,461, since abandoned and continued in U.S. patent application Ser. No. 905,328, filed May 12, 1978, is hereby incorporated herein by reference. The following discussion of the speech synthesizer assumes that the reader has a basic understanding of the operation of the lattice filter described in U.S. patent application Ser. No. 807,461, since abandoned and continued in U.S. patent application Ser. No. 905,328, filed May 12, 1978, therefore, the reader is encouraged to read that patent before delving into the following detailed discussion of the speech synthesizer. As will also be seen, synthesizer 10 also includes a digital to analog (D to A) converter for converting the digital output from the lattice filter to analog signals for driving speaker 4 or other voice coil means with those analog signals. Synthesizer 10 also includes timing, control and data storage and data compression systems which will be subsequently described in detail.

SYNTHESIZER BLOCK DIAGRAM

Figure 4B:
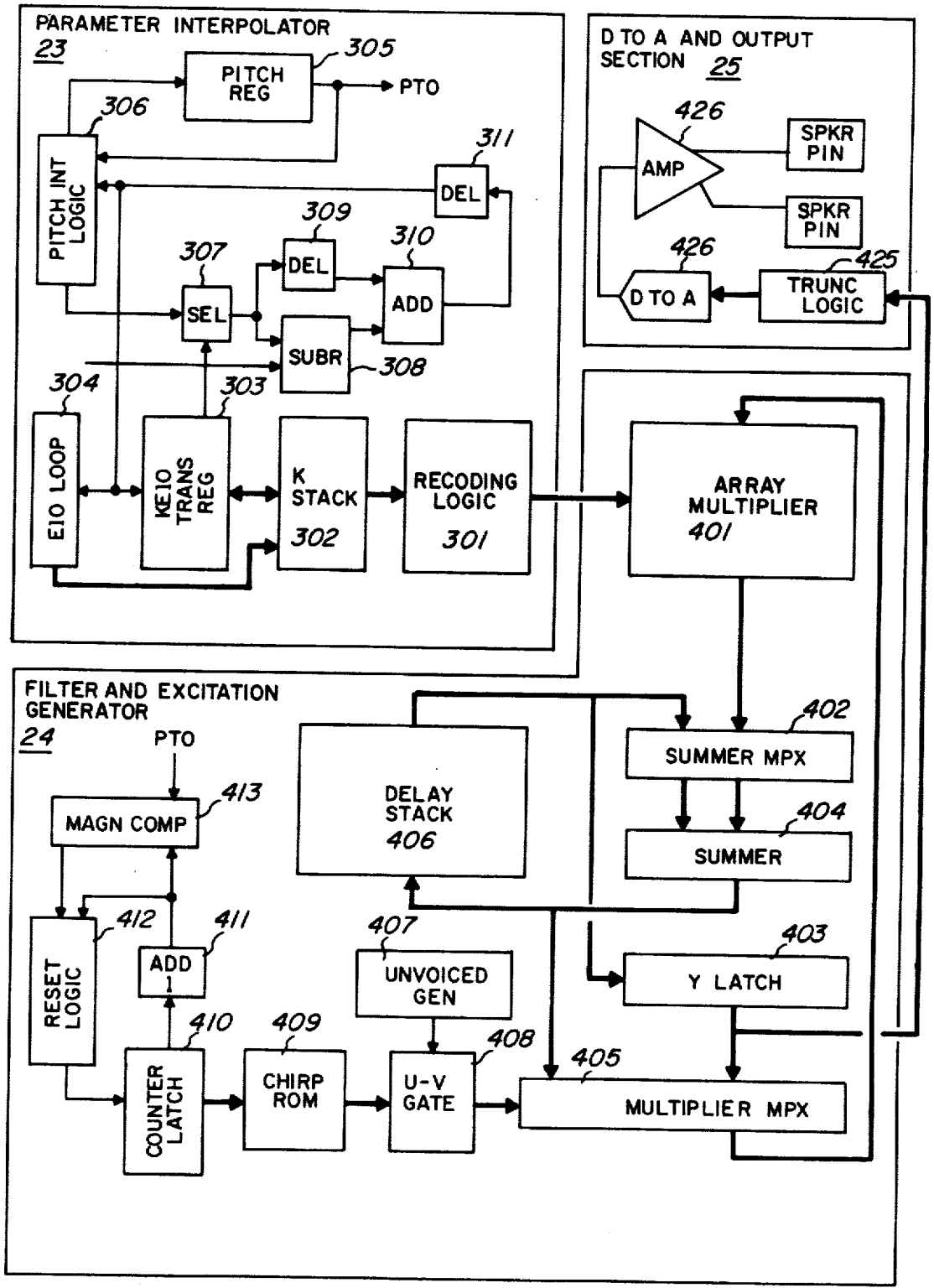

FIGS. 4a and 4b form a composite block diagram of the synthesizer 10. Synthesizer 10 is shown as having six major functional blocks, all but one of which are shown in greater detail in block diagram form in FIGS. 4a and 4b. The six major functional blocks are timing logic 20; ROM-Controller interface logic 21; parameter loading, storage and decoding logic 22; parameter interpolator 23; filter and excitation generator 24 and D to A and output section 25. Subsequentially, these major functional blocks will be described in detail with respect to FIGS. 5a–b, 6, 7a–d, 8a–f, 9a–d, 10a–c and 11a–d.

Rom/Controller Interface Logic

Referring again to FIGS. 4a and 4b, ROM/Controller interface logic 21 couples synthesizer 10 to read-only-memories 12a and 12b and to controller 11. The control 1-8 (CTL1-CTL8), chip select (CS) and processor data clock (PDC) pins are coupled, in this embodiment, to the controller while the address 1-8 (ADD1-ADD8) and instruction 0-1 (I0-I1) pins are connected to ROMs 12a and 12b (as well as ROMs 13a–13b, if used). ROM/Controller interface logic 21 sends address information from controller 11 to the Read-Only-Memories 12a–12b and preferably returns digital information from the ROMs back to the controller 12; logic 21 also brings data back from the ROMs for use by synthesizer 10 and initiates speech. A Chip Select (CS) signal enables tristate buffers, such as buffers 213, and a three bit command latch 210. A Processor Data Clock (PDC) signal sets latch 210 to hold the data apearing at CTL1-CTL4 pins from the controller. Command latch 210 stores a three bit command from controller 11, which is decoded by command decoder 211. Command decoder 211 is responsive to eight commands which are: speak (SPK) or speak slowly (SPKSLOW) for causing the synthesizer to access data from the Read-Only-Memory and speak in response thereto either at a normal rate or at a slow rate; a reset (RST) command for resetting the synthesizer to zero; a test talk (TTALK) so that the controller can assertain whether or not the synthesizer is still speaking; a load address (LA) where four bits are received from the controller chip at the CTL1-CTL8 pins and transferred to the ROMs as an address digit via the ADD1-ADD8 pins and associated buffers 211; a read and branch (RB) command which causes the Read-Only-Memory to take the contents of the present and subsequent address and use that for a branch address; a read (RE) command which causes the Read-Only-Memory to output one bit of data on ADD1, which data shifts into a four bit data input register 212; and an output command which transfers four bits of data in the data input register 212 to controller 11 via buffers 213 and the CTL1-CTL8 pins. Once the synthesizer 10 has commenced speaking in response to a SPK or SPKSLOW command it continues speaking until ROM interface logic 21 encounters a RST command or an all ones gate 207 (see FIGS. 7a–7d) detects an "energy equal to fifteen" code and resets talk latch 216 in response thereto. As will be seen, an "energy equal to 15" code is used as the last frame of data in a plurality of frames of data for generating words, phases or sentences. The LA, RE and RB commands decoded by decoder 211 are re-encoded via ROM control logic 217 and transmitted to the read-only-memories via the instruction (I0–I1) pins.

The processor Data Clock (PDC) signal serves other purposes than just setting latch 210 with the data on CTL1-CTL4. It signals that an address is being transferred via CTL1-CTL8 after an LA or output command has been decoded or that the TTALK test is to be performed and outputted on pin CTL8. A pair of latches 218A and B (FIGS. 7a–7d) associated with decoder 211 disable decoder 211 when the aforementioned LA, TSTTALK and OUTPUT commands have been decoded and a subsequent PDC occurs so that the data then on pins CTL1-CTL8 is not decoded.

A TALK latch 216 is set in response to a decoded SPK or SPKSLW command and is reset: (1) during a power up clear (PUC) which automatically occurs whenever the synthesizer is energized; (2) by a decoded RST command or (3) by an "energy equals fifteen" code in a frame of speech data. The TALKD outut is delayed output to permit all speech parameters to be inputed into the synthesizer before speech is attempted. The talk slow latch 215 is set in response to a decoded SPKSLOW command and reset in the same manner as latch 216. The SLOWD output is similarly a delayed output to permit all the parameters to be inputted into the synthesizer before speech is attempted.

Parameter Loading, Storage and Decoding Logic

The parameter loading, storage and decoding logic 22 includes a six bit long parameter input register 205 which receives serial data from the read-only-memory via pin ADD1 in response to a RE command ouputted to the selected read-only-memory via the instruction pins. A coded parameter random access memory (RAM) 203 and condition decoders and latches 208 are connected to receive the data inputted the parameter input register 205. As will be seen, each frame of speech data is inputted in three to six bit portions via parameter input register 205 to RAM 203 in a coded format where the frame is temporarily stored. Each of the coded parameters stored in RAM 203 are converted to a ten bit parameter by parameter ROM 202 and temporarily stored in a parameter output register 201.

As will be discussed with respect to FIG. 6, the frames of data may be either wholly are partially inputted into parameter input register 205, depending upon the length of the particular frame being inputted. Condition decoders and latches 208 are responsive to particular portions of the frame of data for setting repeat, pitch equal zero, energy equal zero, old pitch and old energy latches. The function of these latches will be discussed subsequently with respect to FIGS. 7a–7b. The condition decoders and latches 208 as well as various timing signals are used to control various interpolation control gates 209. Gates 209 generate an inhibit signal when interpolation is to be inhibited, a zero parameter signal when the parameter is to be zeroed and a parameter load enable signal which, amoung other things, permits data in parameter input register 205 to be loaded into the coded parameter RAM 203.

Parameter Interpolator

The parameters in parameter output registers 201 are applied to the parameter interpolator functional block 23. The inputted K1-K10 speech parameters, including speech energy are stored in a K-stack 302 and E10 loop 304, while the pitch parameter is stored in a pitch register 305. The speech parameters and energy are applied via recoding logic 301 to array multiplier 401 in the filter and excitation generator 24. As will be seen, however, when a new parameter is loaded into parameter output register 201 it is not immediately inserted into K-stack 302 or E10 loop 304 or register 305 but rather the corresponding value in K-stack 302, E10 loop 304 or register 305 goes through eight interpolation cycles during which a portion of the difference between the present value in the K-stack, E10 loop 305 or register 305 and the target value of that parameter in parameter output register 201 is added to the present value in K-stack 203, E10 loop 304 or register 305.

Essentially the same logic circuits are used to perform the interpolation of pitch, energy and the K1-K10 speech parameters. The target value from the parameter output register 201 is applied along with the present value of the corresponding parameter to a substractor 308. A selector 307 selects either the present pitch from pitch logic 306 or present energy or K coefficient data from KE10 transfer register 303, according to which parameter is currently in parameter output register 201, and applies the same to subtractor 308 and a delay circuit 309. As will be seen, delay circuit 309 may provide anywhere between zero delay to three bits of delay. The output of delay circuit 309 as well as the output of subtractor 308 is supplied to an adder 310 whose output is applied to a delay circuit 311. When the delay associated with delay circuit 309 is zero the target value of the particular parameter in parameter output register 201 is effectively inserted into K-stack 302, E10 loop 304 or pitch register 305, as is appropriate. The delay in delay circuit 311 is three to zero bits, being three bits when the delay in the delay circuit 309 is zero bits, whereby the total delay through selector, 307 delay, 309 and 311, adder 310 and subtractor 308 is constant. By controlling the delays in delay circuit 309 and 311, either all, ½, ¼ or ⅛ of the difference outputted from substractor 308 (that being the difference between the target value and the present value) is added back into the present value of the parameter. By controlling the delays in the fashion set forth in Table IV, a relatively smooth eight step parameter interpolation is accomplished.

U.S. patent application Ser. No. 807,461 since abandoned and continued in U.S. patent application Ser. No. 905,328, filed May 12, 1978, discusses with reference to FIG. 7 thereof a speech synthesis filter wherein speech coefficients K1-K9 are stored in the K-stack continuously, until they are updated, while the K10 coefficient and the speech energy (referred to by the letter A in U.S. patent application Ser. No. 807,461, since abandoned and continued in U.S. patent application Ser. No. 905,328, filed May 12, 1978, are periodically exchanged. In parameter interpolator 23, speech coefficients K1-K9 are likewise stored in stack 302, until they are updated, whereas the energy parameter and the K10 coefficient effectively exchange places in K-stack 302 during a twenty time period cycle of operations in the filter and excitation generator 24. To accomplish this function, E10 loop 304 stores both the energy parameter and the $K_{10}$ coefficient and alternately inputs the same into the appropriate location in K-stack 302. KE10 transfer register 303 is either loaded with the K10 or energy parameter from E10 loop 304 or the appropriate K1-K9 speech coefficient from K-stack 302 for interpolation by logics 307-311.

As will be seen, recoding logic 301 preferably performs a Booth's algorithm on the data from K-stack 302, before such data is applied to array multiplier 401. Recoding logic 301 thereby permits the size of the array multiplier 401 to be reduced compared to the array multiplier described in U.S. patent application Ser. No. 807,461, since abandoned and continued in U.S. patent application Ser. No. 905,328, filed May 12, 1978.

Filter and Excitation Generator

The filter excitation generator 24 includes the array multiplier 401 whose output is connected to a summer multiplexer 402. The output of summer multiplexer 402 is coupled to the input of summer 404 whose output is coupled to a delay stack 406 and multiplier multiplexer 405. The output of the delay stack is applied as an input to summer multiplexer 402 and to Y latch 403. The output of Y latch 403 is coupled to an input of multiplier multiplexer 405 along with truncation logic 501. The output of multiplier multiplexer 405 is applied as an input to array multiplier 401. As will be seen filter and excitation generator 24 make use of the lattice filter described in U.S. Patent Application Ser. No. 807,461, since abandoned and continued in U.S. patent application Ser. No. 905,328, filed May 12, 1978. Various minor interconnections are not shown in FIG. 4b for sake of clarity, but which will be described with reference to FIGS. 10a–d and 11a–d. The arrangement of the foregoing elements generally agrees with the arrangement shown in FIG. 7 of U.S. patent application Ser. No. 807,461, since abandoned and continued in U.S. patent application Ser. No. 905,328, filed May 12, 1978; thus array multiplier 401 corresponds to element 30', summer multiplexer 402 corresponds to elements 37b', 37c' and 37d', gates 414 (FIGS. 11a and 11b) correspond to element 33', delay stack 406 corresponds to elements 34' and 35', Y latch 403 coresponds to element 36' and multiplier multiplexer 405 corresponds to elements 38a', 38b', 38c' and 38d'.

The voice excitation data is supplied from unvoiced/voice gate 408. As will be subsequently described in greater detail, the parameters inserted into parameter input gate 205 are supplied in a compressed data format. According to the data compression scheme used, when the coded pitch parameter is equal zero in input register 205, it is interpreted as an unvoiced condition by condition decoders and latches 208. Gate 408 responds by supplying randomized data from unvoiced generator 407 as the excitation input on line 414. When the coded pitch parameter is of some other value, however, it is decoded by parameter ROM 202, loaded into parameter output register 201 and eventually inserted into pitch register 305, either directly or by the interpolation scheme previously described. Based on the period indicated by the number in pitch register 305, voiced exition is derived from chirp ROM 409. As discussed in U.S. Patent Application Ser. No. 807,461, since abandoned and continued in U.S. patent application Serial No. 905,328, filed May 12, 1978, the voiced excitation signal may be an impulse function or some other repeating function such as a repeating chirp function. In this embodiment, a chirp has been selected as this tends to reduce the "fuzziness" from the speech generated (because it apparently more closely models the action of the vocal cards than does a impulse function) which chirp is repetitively generated by chirp ROM 409. Chirp ROM 409 is addressed by counter latch 410, whose address is incremented in an add one circuit 411. The address in counter latch 410 continues to increment in add one circuit 411, recirculating via reset logic 412 until magnitude comparator 413, which compares the magnitude of the address being outputted from add one circuit 411 and the contents of the pitch register 305, indicates that the value in counter latch 410 then compares with or exceeds the value in pitch register 305, at which time reset logic 412 zeroes the address in counter 410. Beginning at address zero and extending through approximately fifty addresses is the chirp function in chirp ROM 409. Counter latch 410 and chirp ROM 409 are set up so that addresses larger than fifty do not cause any portion of the chirp function to be outputted from chirp ROM 409 to UV gate 408. In this manner the chirp function is repetitively generated on a pitch related period during voiced speech.

SYSTEM TIMING

Figure 5:
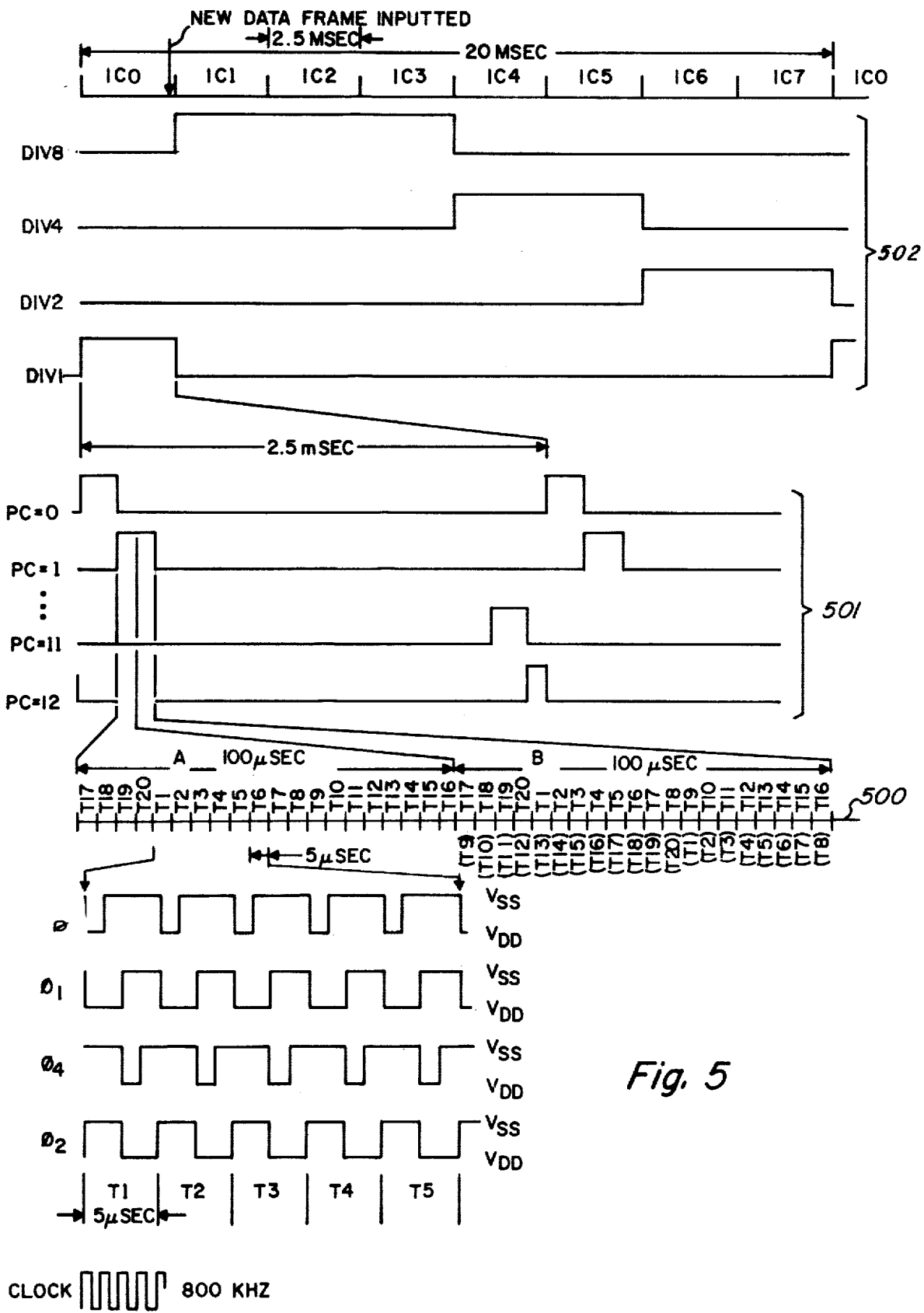
FIG. 5 is a timing diagram of various timing signals preferably used on the synthesizer.

FIG. 5 depicts the timing relationships between the occurrences of the various timing signals generated on synthesizer chip 10. Also depicted are the timing relationships with respect to the time new frames of data are inputted to synthesizer chip 10, the timing relationship with respect to the interpolations performed on the inputted parameters, the timing relations with respect to the foregoing with the time periods of the lattice filter and the relationship of all the foregoing to the basic clock signals.

The synthesizer is preferably implemented using precharged, conditional discharge type logics and therefore FIG. 5 shows clocks $\phi1$–$\phi4$ which may be appropriately used with such precharge-conditonal discharge logic. There are two main clock phases ($\phi1$ and $\phi2$) and two precharge clock phases ($\phi3$ and $\phi4$). Phase $\phi3$ goes low during the first half of phase $\phi1$ and serves as a precharge therefor. Phase $\phi4$ goes low during the first half of phase $\phi2$ and serves as a precharge therefore. A set of clocks $\phi1$–$\phi4$ required to clock one bit of data and thus correspond to one time period.

The time periods are labeled T1–T20 and each preferably has a time period on the order of five microseconds. Selecting a time period on the order of five microseconds permits, as will be seen, data to be outputted from the digital filter at a ten kilohertz rate (i.e., at a 100 microsecond period) which provides for a frequency response of five kilohertz in the D to A output section 25 (FIG. 4b). It will be appreciated by those skilled in the art, however, that depending on the frequency response which is desired and depending upon the number of Kn speech coefficients used, and also depending upon the type of logics used, that the periods or frequencies of the clocks and clock phases shown in FIG. 5 may be substantially altered, if desired.

As is explained in U.S. patent application Ser. No. 807,461, since abandoned and continued in U.S. patent application Ser. No. 905,328, filed May 12, 1978, one cycle time of the lattice filter in filter excitation generator 24, preferably comprises twenty time periods, T1–T20. For reasons not important here, the numbering of these time periods differs between this application and U.S. patent application Ser. No. 807,461, since abandoned and continued in U.S. patent application Ser. No. 905,328, filed May 12, 1978. To facilitate the reader's understanding of the differences in the numbering of the time periods, both numbering schemes are shown at the time period time line 500 in FIG. 5. At time line 500, the time periods, T1–T20 which are not enclosed in parenthesis identify the time periods according to the convention used in this application. On the other hand, the time periods convention used in U.S. patent applicaton Ser. No. 807,461, since abandoned and continued in U.S. patent application Ser. No. 905,328, filed May 12, 1978. Thus, time period T17 is equivalent to time period (T9).

At numeral 501 is depicted the parameter count (PC) timing signals. In this embodiment there are thirteen PC signals, PC=0 through PC=12. The first twelve of these, PC=0 through PC=11 correspond to times when the energy, pitch, and K1–K10 parameters, respectively, are available in parameter output register 201. Each of the first twelve PC's comprise two cycles, which are labeled A and B. Each such cycle starts at time period T17 and continues to the following T17. During each PC the target value from the parameter output register 201 is interpolated with the existing value in K-stack 302 in parameter interpolator 23. During the A cycle, the parameter being interpolated is withdrawn from the K-stack 302, E10 loop 304 or register 305, as appropriate, during an appropriate time period. During the B cycle the newly interpolated value is reinserted in the K-stack (or E10 loop or pitch register). The thirteenth PC, PC=12, is provided for timing purposes so that all twelve parameters are interpolated once each during a 2.5 milliseconds interpolation period.

As was discussed with respect to the parameter interpolator 23 of FIG. 4b and Table IV, eight interpolations are performed for each inputting of a new frame of data from ROMs 12a-b into synthesizer 10. This is seen at numeral 502 of FIG. 5 where timing signals DIV 1, DIV 2, DIV 4 and DIV 8 are shown. These timing signals occur during specific interpolation counts (IC) as shown. There are eight such interpolation counts, IC0–IC7. New data is inputted from the ROMs 12a-b into the synthesizer during IC0. These new target values of the parameters are then used during the next eight interpolation counts, IC1 through IC0; the existing parameters in the pitch register 305 K-stack 302 and E10 loop 304 are interpolated once during each interpolation count. At the last interpolation count, IC0, the present value of the parameters in the pitch register 305, K-stack 302 and E10 loop 304 finally attain the target values previously inputted toward the last IC0 and thus new target values may then again be inputted as a new frame of data. Inasmuch as each interpolation count has a period of 2.5 milliseconds, the periods at which new data frames are inputted to the synthesizer chip is 20 microseconds or equivalent to a frequency of 50 hertz. The DIV 8 signal corresponds to those interpolation counts in which one-eighth of the difference produced by subtractor 308 is added to the present values in adder 310 whereas during DIV 4 one-fourth of the difference is added in, and so on. Thus, during DIV 2, ½ of the difference from subtractor 308 is added to the present value of the parameter in adder 310 and lastly during DIV 1 the total difference is added in adder 310. As has been previously mentioned, the effect of this interpolation scheme can be seen in Table IV.

PARAMETER DATA COMPRESSION

It has been previously mentioned that new parameters are inputted to the speech synthesizer at 50 hertz rate. It will be subsequently seen that in parameter interpolator and excitation generator 24 (FIG. 4b) the pitch data, energy data and $K_{1-Kn}$ parameters are stored and utilized as ten bit digital binary numbers. If each of these twelve parameters were updated with a ten bit binary number at a fifty hertz rate from an external source, such as ROMs 12a and 12b, this would require a $12 \times 10 \times 50$ or 6,000 hertz bit rate. Using the data compression techniques which will be explained, we reduce this bit rate required for synthesizer 10 to on the order of 1,000 to 1,200 bits per second. And more importantly, it has been found that the speech compression schemes herein disclosed do not appreciably degrade the quality of speech generated thereby in comparison to using the data uncompressed.

Figure 6:
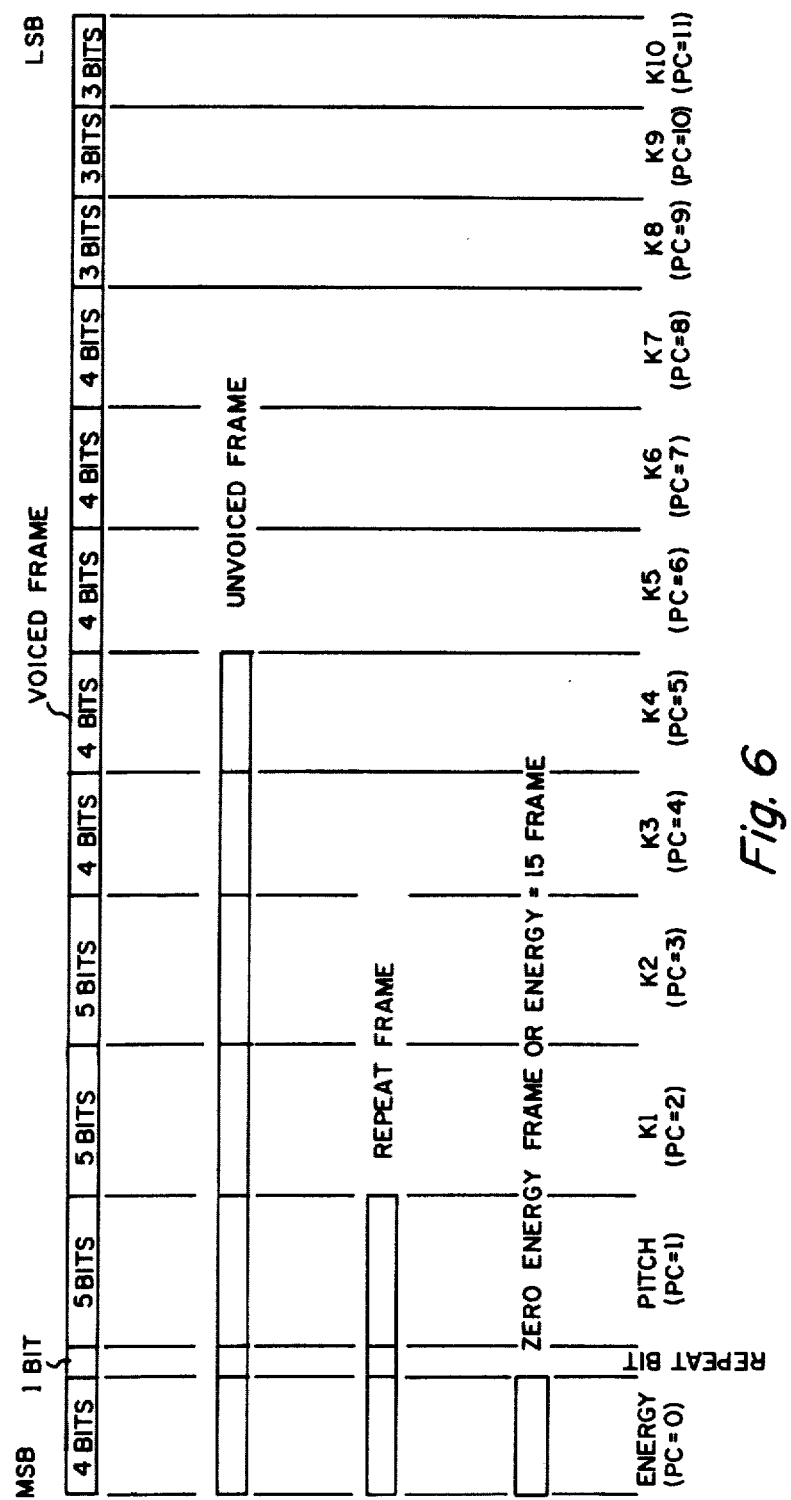
FIG. 6 pictorially shows the data compression scheme preferably used to reduce the data rate required by the synthesizer.

The data compression scheme used is pictorially shown in FIG. 6. Referring now to FIG. 6, it can be seen that there is pictorially shown four different lengths of frames of data. One, labeled voiced frame, has a length of 49 bits while another entitled unvoiced frame, has a length of 28 bits while still another called "repeat frame" has a length of ten bits and still another which may be alternatively called zero energy frame or energy equals fifteen frame has the length of but four bits. The "voiced frame" supplies four bits of data for a coded energy parameter as well as coded four bits for each if five speech parameters K3 through K7. Five bits of data are reserved for each of three coded parameters, pitch, K1 and K2. Additionally, three bits of data are provided for each of three coded speech parameters K8-K10 and finally another bit is reserved for a repeat bit.

In lieu of inputting ten bits of binary data for each of the parameters, a coded parameter is inputted which is converted to a ten bit parameter by addressing parameter ROM 202 with the coded parameter. Thus, coefficient K1, for example, may have any one of thirty-two different values, according to the five bit code for K1, each one of the thirty-two values being a ten bit numerical coefficient stored in parameter ROM 202. Thus, the actual values of coefficients K1 and K2 may have one of thirty-two different values while the actual values of coefficients K3 through K7 may be one of sixteen different values and the values of coefficients K8 through K9 may be one of eight different values. The coded pitch parameter is five bits long and therefore may have up to thirty-two different values. However, only thirty-one of these reflect actual pitch values, a pitch code of 00000 being used to signify an unvoiced frame of data. The coded energy parameter is four bits long and therefore would normally have sixteen available ten bit values; however, a coded energy parameter equal to 0000 indicates a silent frame such as occur as pauses in and between words, sentences and the like. A coded energy parameter equal to 1111 (energy equals fifteen), on the other hand, is used to signify the end of a segment of spoken speech, thereby indicating that the synthesizer is to stop speaking. Thus, of the sixteen codes available for the coded energy parameter, fourteen are used to signify different ten bit speech energy levels.

Coded coefficients K1 and K2 have more bits than coded coefficients K3-K7 which in turn have more bits than coded coefficients K8 through K10 because coefficient K1 has a greater effect on speech than K2 which has a greater effect on speech than K3 and so forth through the lower order coefficients. Thus given the greater significance of coefficients K1 and K2 than coefficients K8 and K10, for example, more bits are used in coded format to define coefficients K1 and K2 than K3-K7 or K8-K10.

Also it has been found that voiced speech data needs more coefficients to correctly model speech than does unvoiced speech and therefore when unvoiced frames are encountered, coefficients K5 through K10 are not updated, but rather are merely zeroed. The synthesizer realizes when an unvoiced frame is being outputted because the uncoded pitch parameter is equal to 00000.

It has also been found that during speech there often occur instances wherein the parameters do not significantly change during a twenty millisecond period; particularly, the K1-K10 coefficients will often remain nearly unchanged. Thus, a repeat frame is used wherein new energy and new pitch are inputted to the synthesizer, however, the K1-K10 coefficients previously inputted remain unchanged. The synthesizer recognizes the ten bit repeat frame because the repeat bit between energy and pitch then comes up whereas it is normally off. As previously mentioned, there occur pauses between speech or at the end of speech which are preferably indicated to the synthesizer; such pauses are indicated by a coded energy frame equal to zero, at which time the synthesizer recognizes that only four bits are to be sampled for that frame. Similarly, only four bits are sampled when an "energy equals fifteen". Using coded values for the speech in lieu of actual values, alone would reduce the data rate to $48 \times 50$ or 2400 bits per second. By additionally using variable frame lengths, as shown in FIG. 6, the data rate may be further reduced to on the order of one thousand to twelve hundred bits per second, depending on the speaker and on the material spoken.

The effect of this data compression scheme can be seen from Table V where the coding for the word "HELP" is shown. Each line represents a new frame of data. As can be seen, the first part of the word "HELP", "HEL", is mainly voiced while the "P" is unvoiced. Also note the pause between "HEL" and "P" and the advantages of using the repeat bit. Table VI sets forth the encoded and decoded speech parameter. The 3, 4 or 5 bit code appears as a hexadecimal number in the left-hand column, while the various decoded parameter values are shown as ten bit, two's complement numbers expressed as hexadecimal numbers in tabular form under the various parameters. The decoded speech parameter are stored in ROM 203. The repeat bit is shown in Table V between the pitch and K parameters for sake of clarity; preferably, according to the embodiment of FIG. 6, the repeat bit occurs just before the most significant bit (MSB) of the pitch parameter.

SYNTHESIZER LOGIC DIAGRAMS

The various portions of the speech synthesizer of FIGS. 4a and 4b will now be described with reference to FIGS. 7a through 14b which, depict, in detail, the logic circuits implemented on a semiconductor chip, for example, to form the synthesizer 10. The following discussion, with reference to the aforementioned drawings, refers to logic signals available at many points in the circuit. It is to be remembered that in P channel MOS devices a logical zero corresponds to a negative voltage, that is Vdd, while a logical one refers to a zero voltage, that is, Vss. It should be further remembered that P-channel MOS transistors depicted in the aforementioned figures are conductive when a logical zero, that is, a negative voltage, is applied at their respective gates. When a logic signal is referred to which is unbarred, that is, has no bar across the top of it, the logic signal is to be interpreted as "TRUE" logic; that is, a binary one indicates the presence of the signal (Vss) whereas a binary zero indicates the lack of the signal (Vdd). Logic signal names including a bar across the top thereof are "FALSE" logic; that is, a binary zero (Vdd voltage) indicates the presence of the signal whereas a binary one (Vss voltage) indicates that the signal is not present. It should also be understood that a numeral three in clocked gates indicates that phase $\phi 3$ is used as a precharge whereas a four in a clocked gate indicates that phase $\phi 4$ is used as a precharge clock. An "S" in the gate indicates that the gate is statically operated.

Timing Logic Diagram

Referring now to FIGS. 7a-7d, they form a composite, detailed logic diagram of the timing logic for synthesizer 10. Counter 510 is a pseudorandom shift counter including a shift register 510a and feed back logic 510b. The counter 510 counts into pseudorandom fashion and the TRUE and FALSE outputs from shift register 510a are supplied to the input section 511 of a timing PLA. The various T time periods decoded by the timing PLA are indicated adjacent to the output lines thereof. Section 511c of the timing PLA is applied to an output timing PLA 512 generating various combinations and sequences of time period signals, such as T odd, $\overline{T10}$-$\overline{T18}$, and so forth. Sections 511a and 511b of timing PLA 511 will be described subsequently.

The parameter count in which the synthesizer is operating is maintained by a parameter counter 513. Parameter counter 513 includes an add one circuit and circuits which are responsive to SLOW and SLOW D. In SLOW, the parameter counter repeats the A cycle of the parameter count twice (for a total of three A cycles) before entering the B cycle. That is, the period of the parameter count doubles so that the parameters applied to the lattice filter are updated and interpolated at half the normal rate. To assure that the inputted parameters are interpolated only once during each parameter count during SLOW speaking operations each parameter count comprises three A cycles followed by one B cycle. It should be recalled that during the A cycle the interpolation is begun and during the B cycle the interpolated results are reinserted back into either K-stack 302, E10 loop 304 or pitch register 305, as appropriate. Thus, merely repeating the A cycle has no affect other than to recalculate the same value of a speech parameter but since it is only reinserted once back into either K-stack 302, E10 loop 304 or pitch register 305 only the results of the interpolation immediately before the B cycle are retained.

Inasmuch as parameter counter 513 includes an add one circuit, the results outputted therefrom, PC1-PC4, represent in binary form, the particluar parameter count in which the synthesizer is operating. Output PC0 indicates in which cycle, A or B, the parameter count is. The parameter counter outputs PC1-PC4 are decoded by timing PLA 514. The particular decimal value of the parameter count is decoded by timing PLA 514 which is shown in adjacent to the timing PLA 514 with nomenclature such as PC=0, PC=1, PC=7 and so forth. The relationship between the particular parameters and the value of PC is set forth in FIG. 6. Output portions 511a and 511b of timing PLA 511 are also interconnected with outputs from timing PLA 514 whereby the Transfer K (TK) signal goes high during T9 of PC=2 or T8 of PC=3 or T7 of PC=4 and so forth through T1 of PC=10. Similarly, a LOAD Parameter (LDP) timing signal goes high during T5 of PC=0 or T1 of PC=1 or T3 of PC=2 and so forth through T7 of PC=11. As will be seen, signal TK is used in controlling the transfer of data from parameter output register 201 to subtractor 308, which transfer occurs at different T times according to the particular parameter count the parameter counter 513 is in to assure that the appropriate parameter is being outputted from KE10 transfer register 303. Signal LDP is, as will be seen, used in combination with the parameter input register to control the number of bits which are inputted therein according to the number of bits associated with the parameter then being loaded according to the number of bits in each encoded parameter as defined in FIG. 6.

Interpolation counter 515 includes a shift register and an add one circuit for binary counting the particular interpolation cycle in which the synthesizer 10 is operating. The relationship between the particular interpolation count in which the synthesizer is operating and the DIV1, DIV2, DIV4 and DIV8 timing signals derived therefrom is explained in detail with reference to FIG. 6 and therefore additional discussion here would be superfluous. It will be noted, however, that interpolation counter 515 includes a three bit latch 516 which is loaded at TI. The output of three bit latch 516 is decoded by gates 517 for producing the aforementioned DIV1 through DIV8 timing signals. Interpolation counter 515 is responsive to a signal RESETF from parameter counter 513 for permitting interpolation counter 515 to increment only after PC=12 has occurred.

ROM/Controller Interface Logic Diagram

Turning now to FIGS. 8a-8f, which form a composite diagram, there is shown a detailed logic diagram of ROM/Controller interface logic 21. Parameter input register 205 is coupled, at its input to address pin ADD8. Register 205 is a six bit shift register, most of the stages of which are two bits long. The stages are two bits long in this embodiment inasmuch as ROMs 12a and b output, as will be seen, data at half the rate at which data is normally clocked in synthesizer 10. At the input of parameter input register 205 is a parameter input control gate 220 which is responsive to the state of a latch 221. Latch 221 is set in response to LDP, PC0 and DIV1 all being a logical one. It is reset at T14 and in response to parameter load enable from gate 238 being a logical zero. Thus, latch 221 permits gate 220 to load data only during the A portion (as controlled by PC0) of the appropriate parameter count and at an appropriate T time (as controlled by LDP) of IC0 (as controlled by DIV1) provided parameter load enable is at a logical one. Latch 221 is reset by T14 after the data has been inputted into parameter register 205.

The coded data in parameter input register 205 is applied on lines IN0-IN4 to coded parameter RAM 203, which is addressed by PC1-PC4 to indicate which coded parameter is then being stored. The contents of register 205 is tested by all one's gate 207, all zeroes gate 206 and repeat latch 208a. As can be seen, gate 206 tests for all zeroes in the four least significant bits of register 205 whereas gate 207 tests for all ones in those bits. Gate 207 is also responsive to PC0, DIV1, T16 and PC=0 so that the zero condition is only tested during the time that the coded energy parameter is being loaded into parameter RAM 203. The repeat bit occurs in this embodiment immediately in front of the coded pitch parameter; therefore, it is tested during the A cycle of PC=1. Pitch latch 208b is set in response to all zeroes in the coded pitch parameter and is therefore responsive to not only gate 206 but also the most significant bit of the pitch data on line 222 as well as PC=1. Pitch latch 208b is set whenever the loaded coded pitch parameter is a 00000 indicating that the speech is to be unvoiced.

Energy=0 latch 208c is responsive to the output of gate 206 and PC=0 for testing whether all zeroes have been inputted as the coded energy parameter and is set in response thereto. Old pitch latch 208d stores the output of the pitch=0 latch 208b from the prior frame of speech data while old energy latch 208e stores the output of energy=0 latch of 208c from the prior frame of speech data. The contents of old pitch latch 208d and pitch=0 latch 208b are compared in comparison gates 223 for purpose of generating an INHIBIT signal. As will be seen, the INHIBIT signal inhibits interpolations and this is desirable during changes from voiced to unvoiced or unvoiced to voiced speech so that the new speech parameters are automatically inserted into K-stack 302, E10 loop 304 and pitch register 305 as opposed to being more slowly interpolated into those memory elements. Also, the contents of old energy latch 208e and energy=0 latch 208c is tested by NAND gate 224 for inhibiting interpolation for a transition from a non-speaking frame to a speaking frame of data. The outputs of NAND gate 224 and gates 223 are coupled to a NAND gate 235 whose output is inverted to INHIBIT by an inverter 236. Latches 208a–208c are reset by gate 225 and latches 208d and 208e are reset by gate 226. When the excitation signal is unvoiced, the K5–K10 coefficients are set to zero, as aforementioned. This is accomplished, in part, by the action of gate 237 which generates as ZPAR signal when pitch is equal to zero and when the parameter counter is greater than five, as indicated by PC 5 from PLA 514.

Figure 8A:
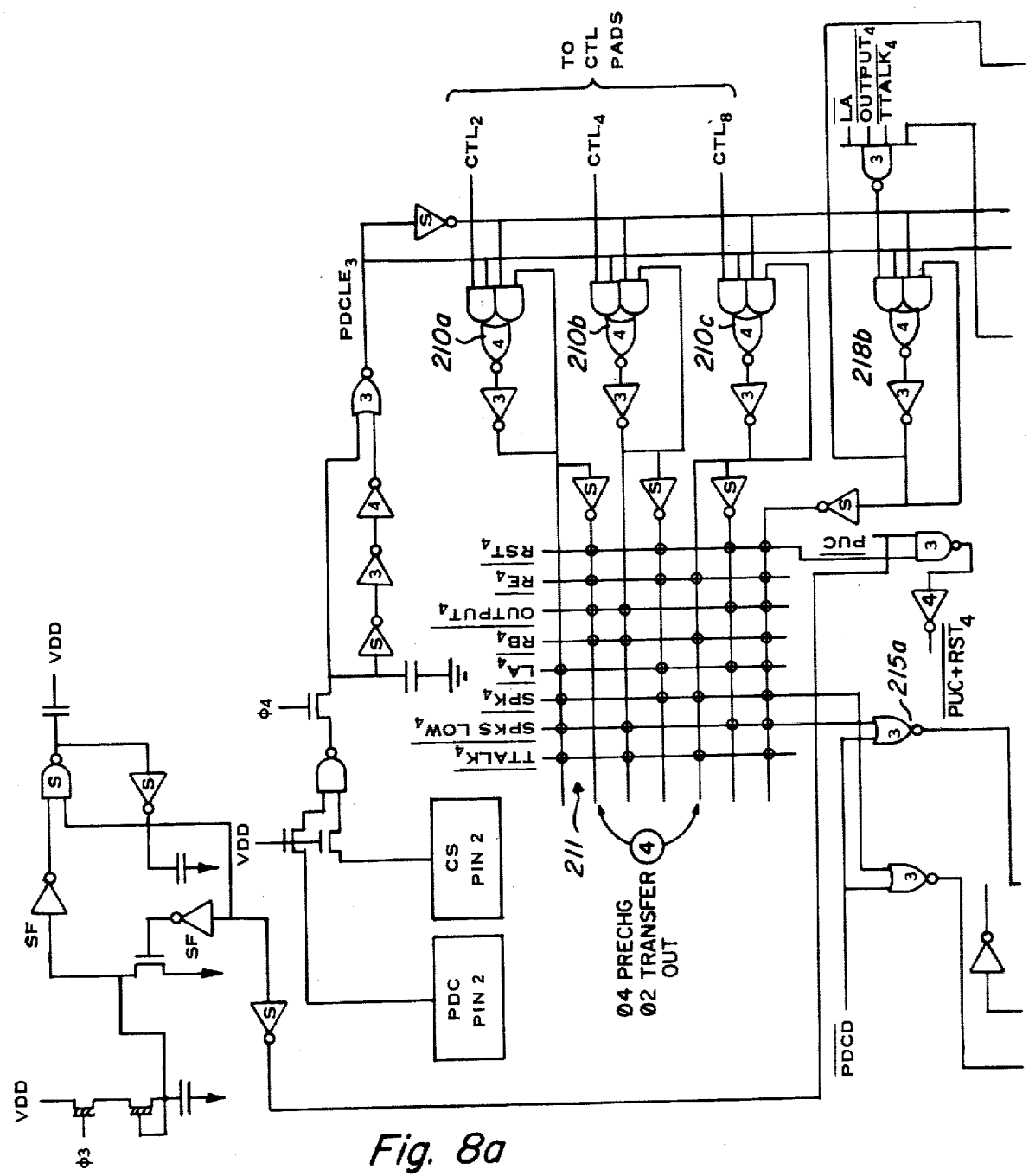
Figure 8C:
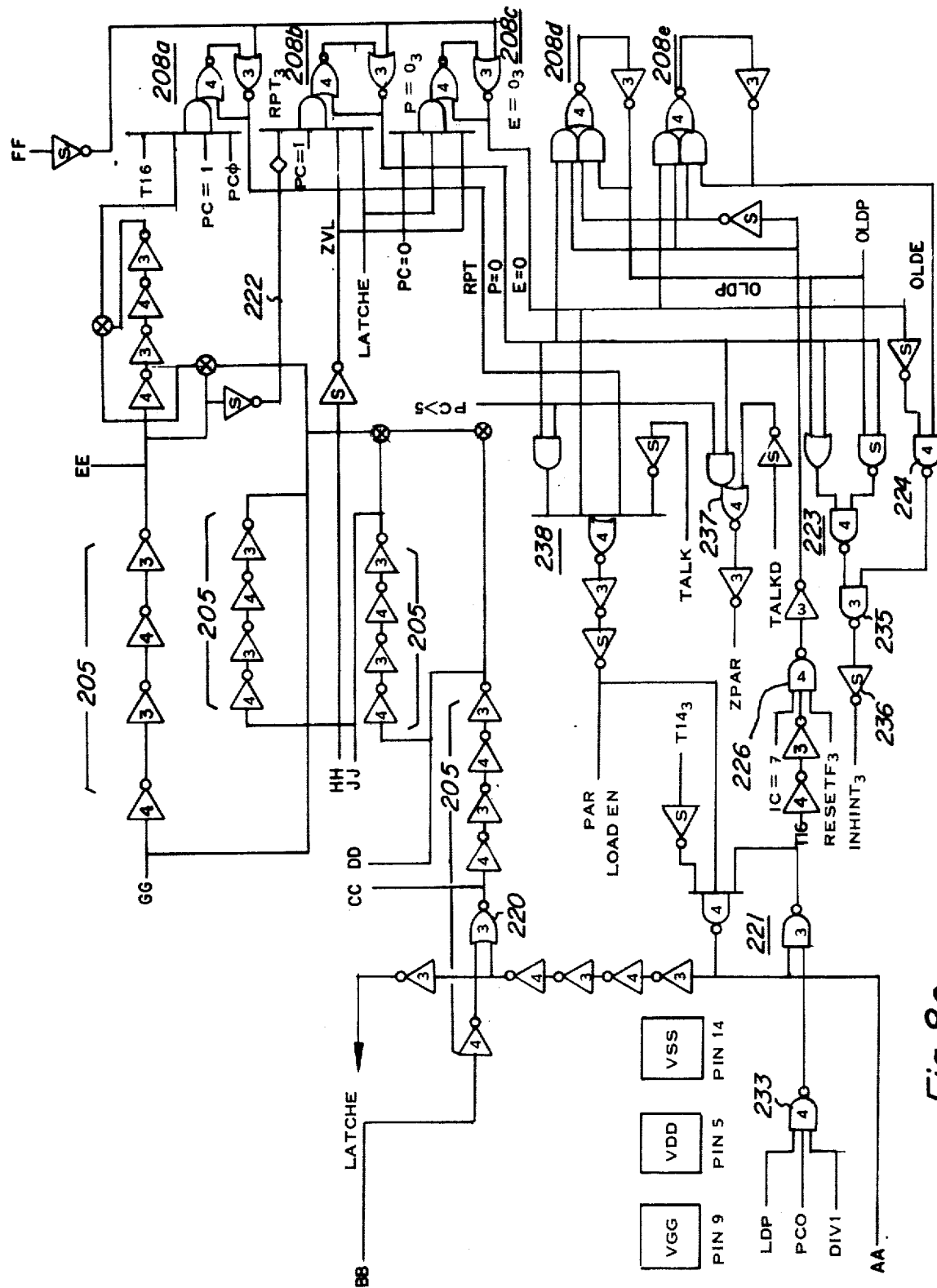
Figure 8D:
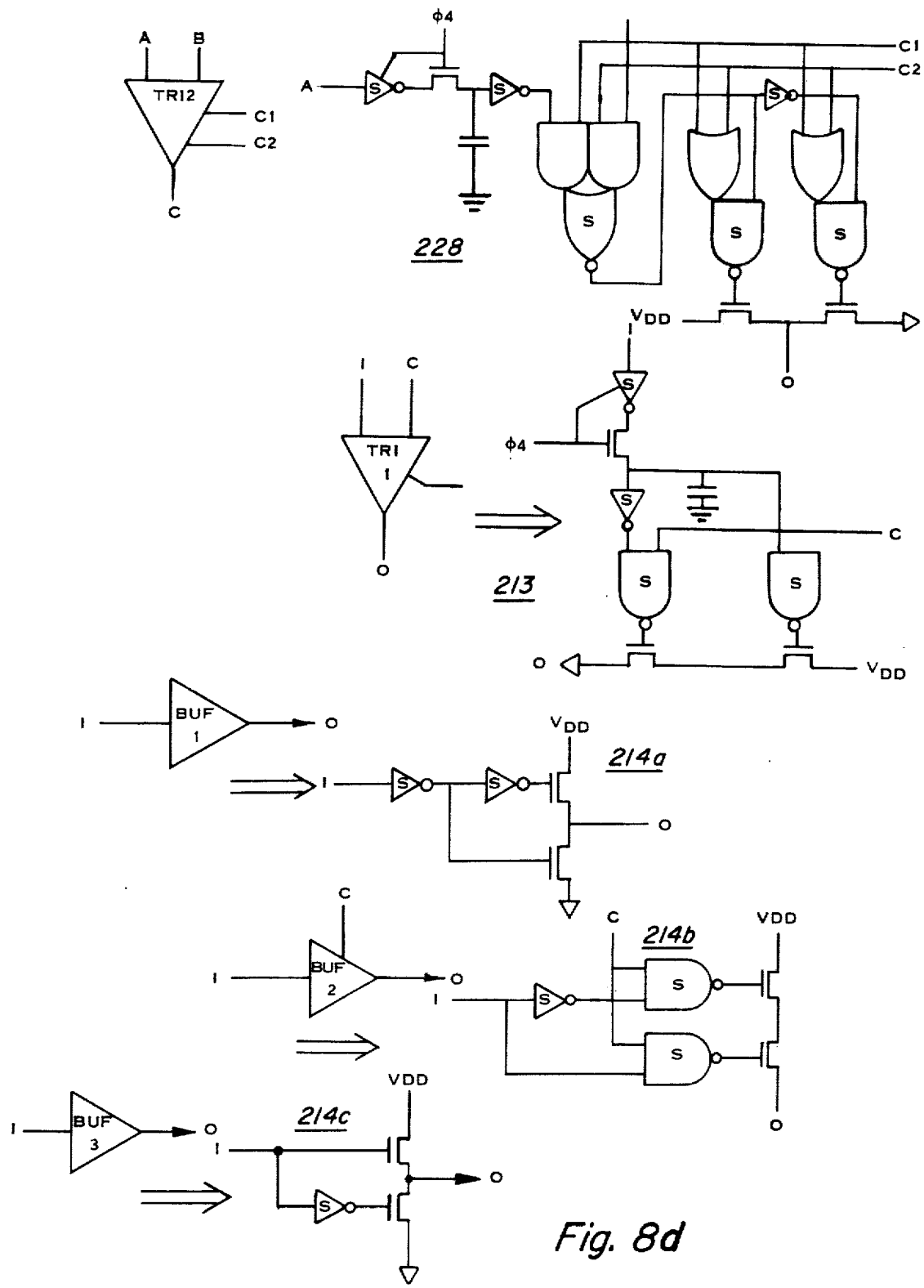
Figure 8E:
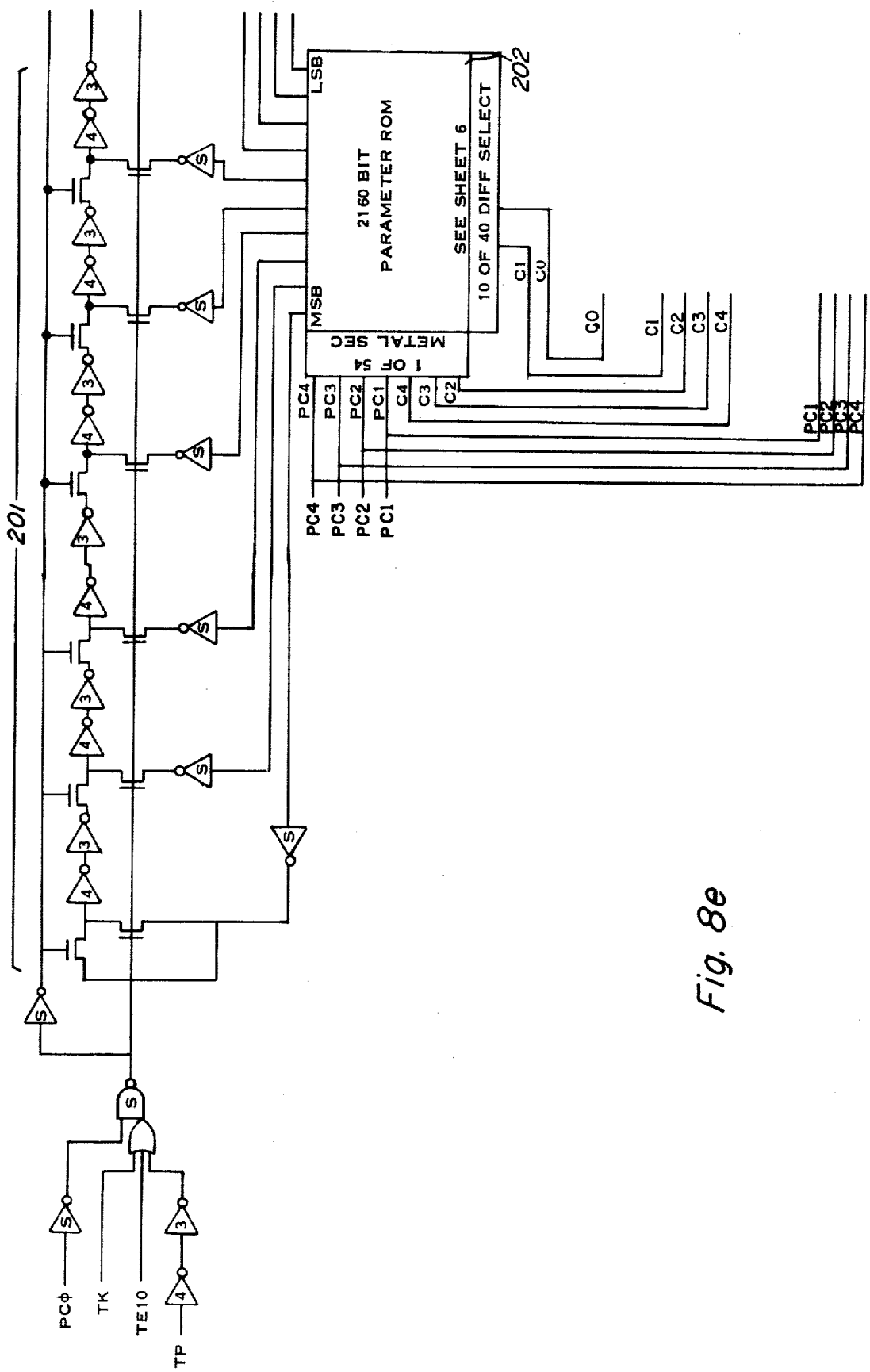
Figure 8F:
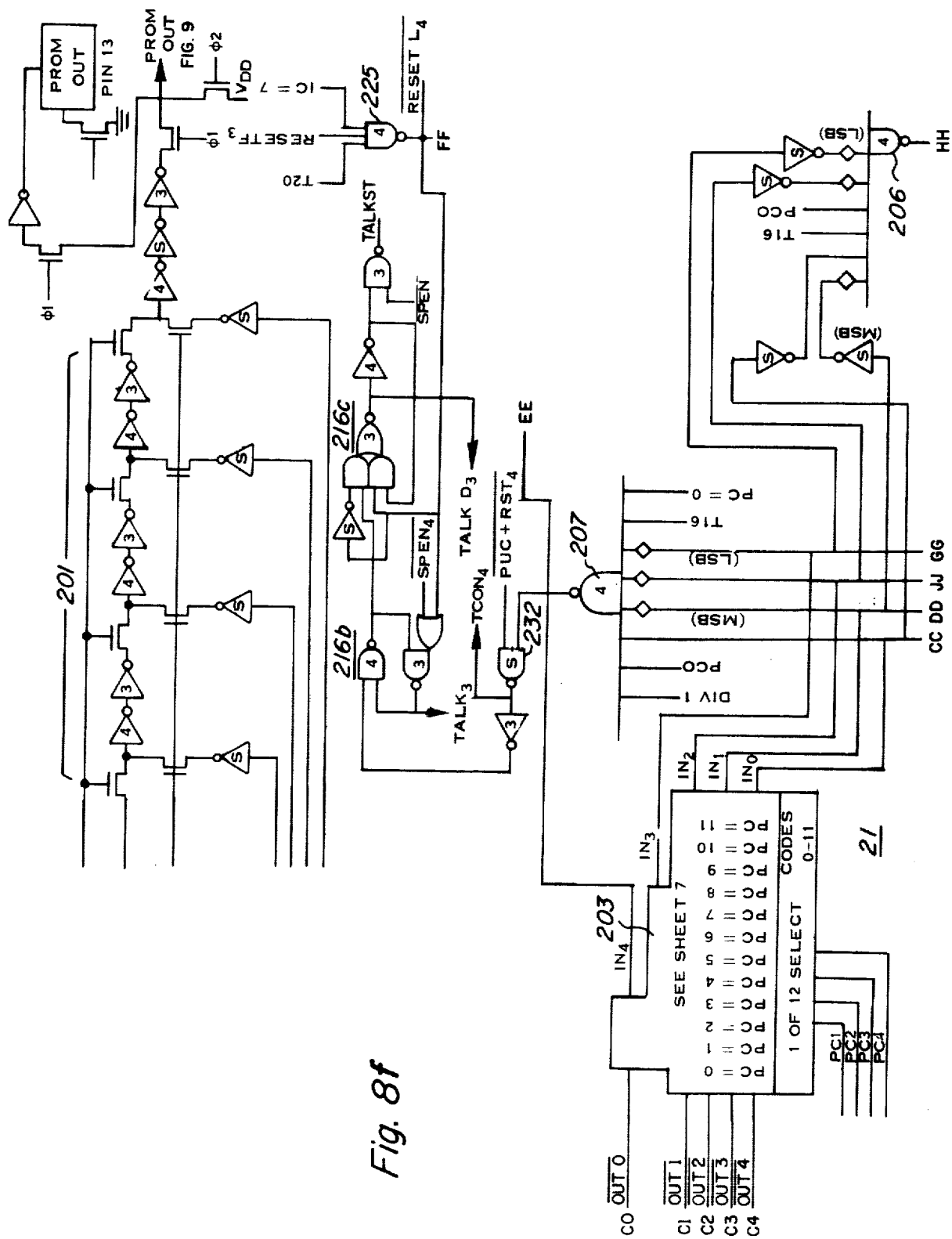
Figure 9A:
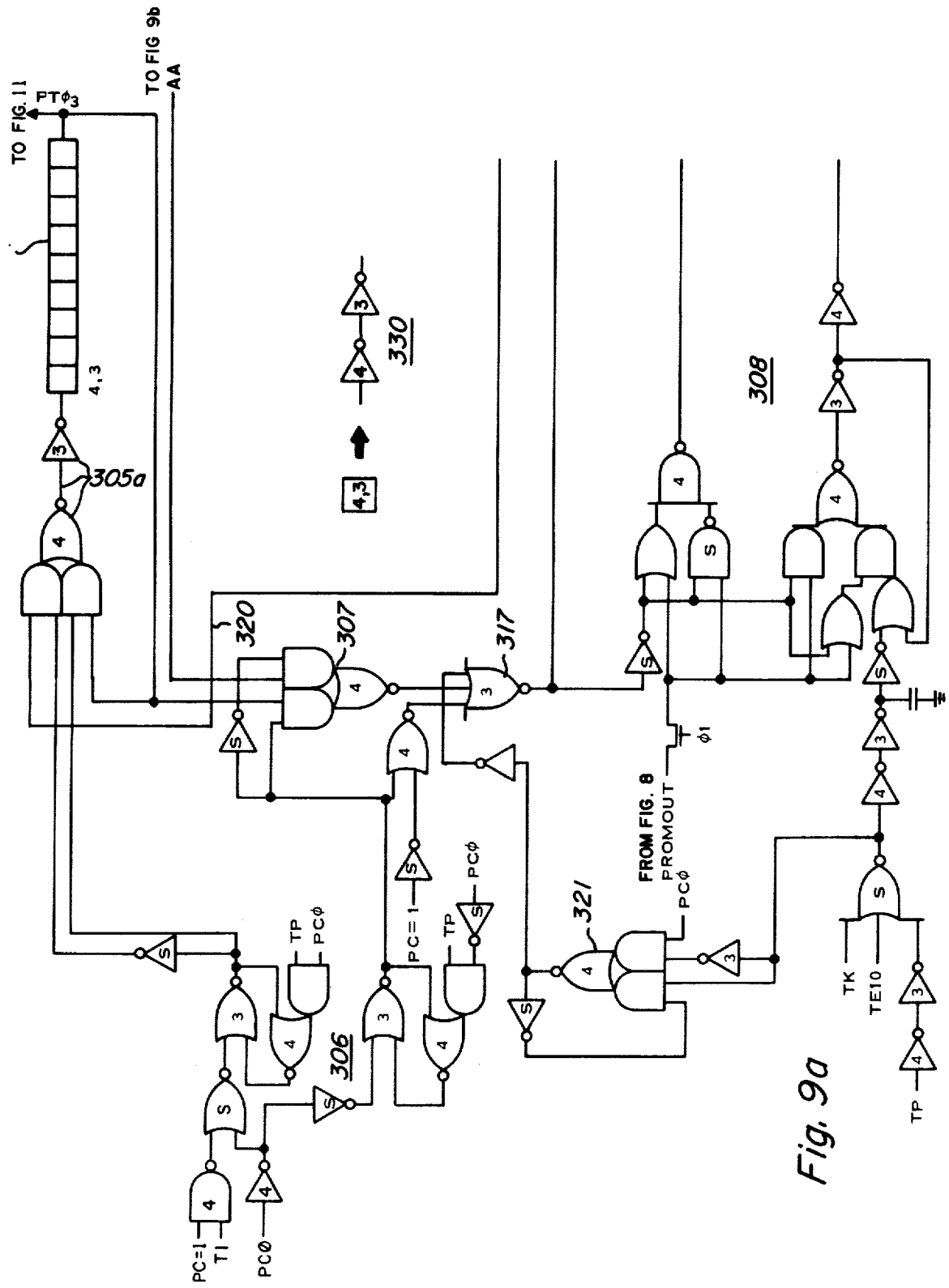
FIGS. 9a–d form a composite logic diagram of the interpolator logics
Figure 9B:
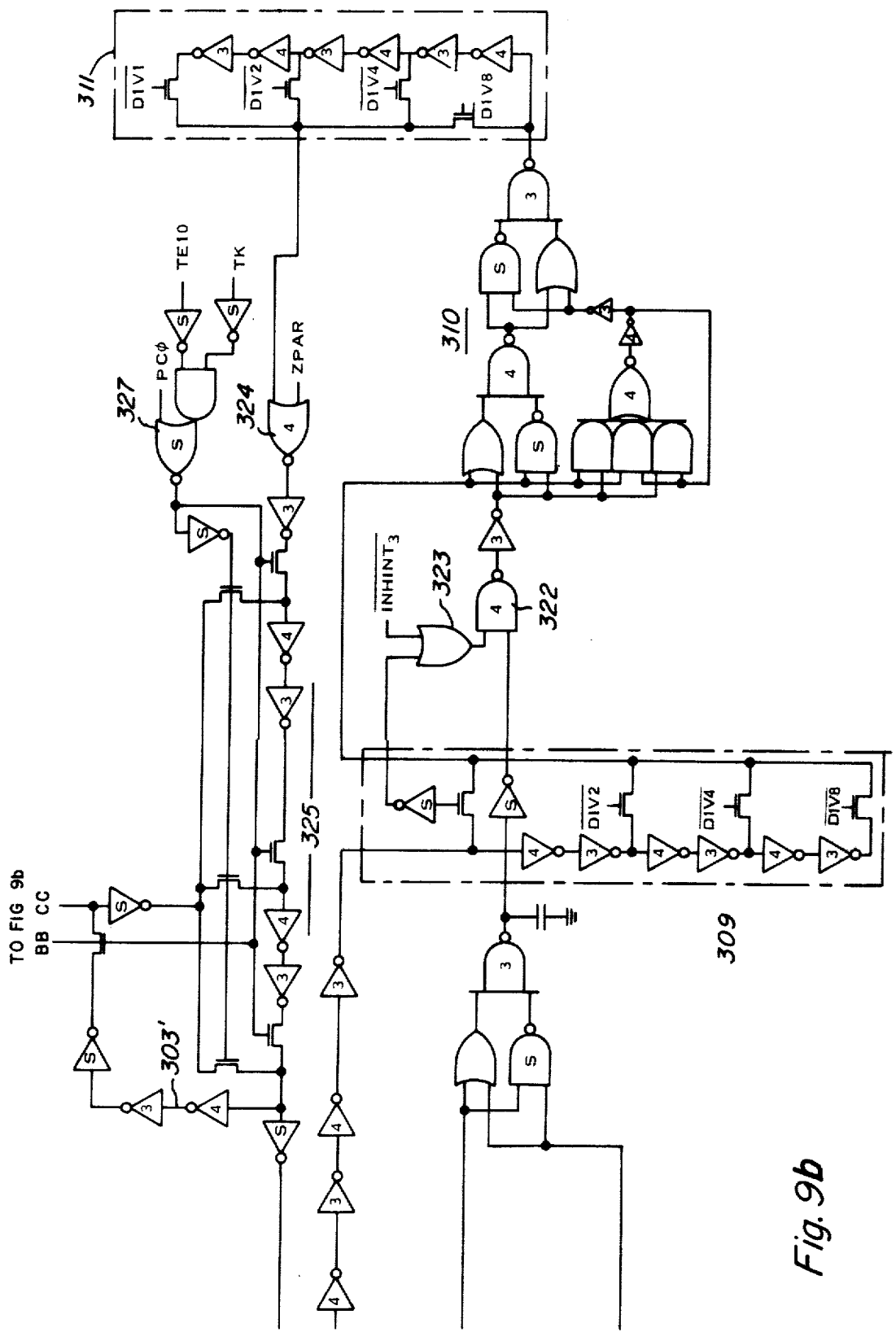
Figure 9C:
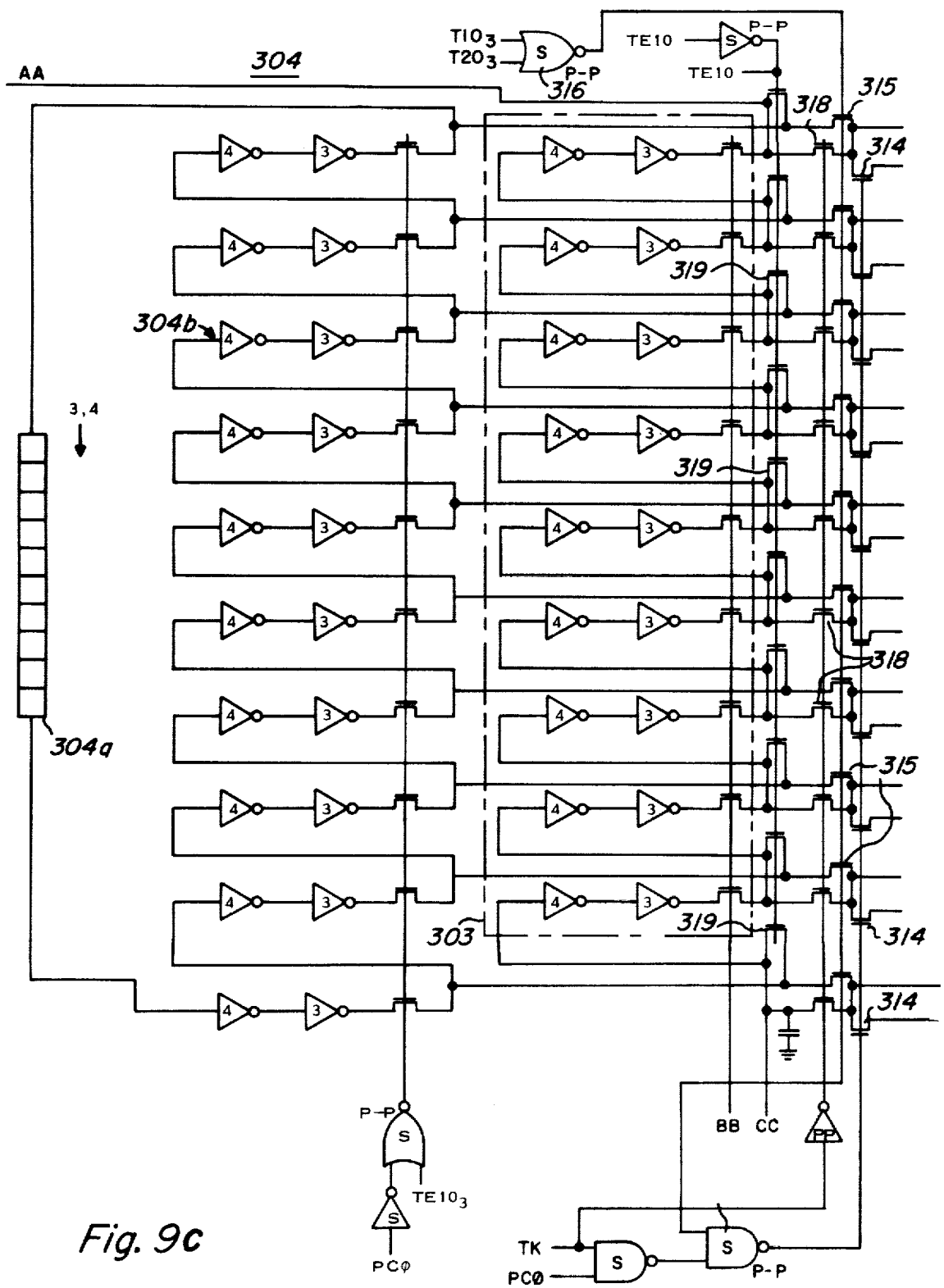
Figure 9D:
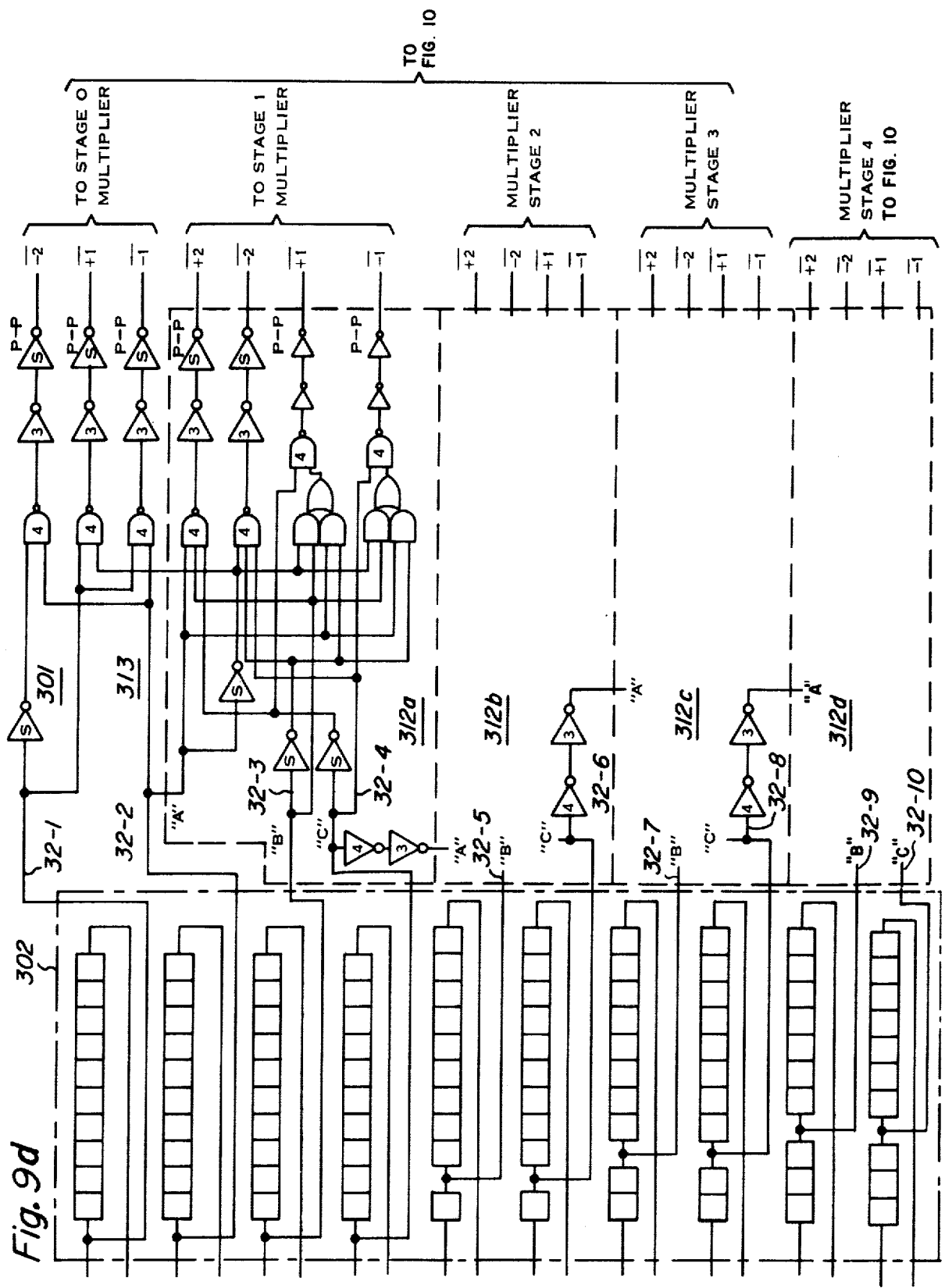

Also shown in FIGS. 8a–c is a command latch 210 which comprises three latches 210a,b, and c which latch in the data at CTL2,4 and 8 in response to a processor data clock (PDC) signal in conjunction with a chip select (CS) signal. The contents of command latch 210 is decoded by command decoder 211 unless disabled by latches 218a and 218b. As previously mentioned, these latches are responsive to decoded LA, output and TTALK commands for disabling decoder 211 from decoding what ever data happens to be on the CTL2-CTL8 pins when subsequent PDC signals are received in conjunction with the LA, output and TTALK commands. A decoded TTALK command set TTALK latch 219. The ouput of TTALK latch 219, which is reset by a Processor Data Clock Leading Edge (PDCLE) signal or by an output from latch 218b, controls along with the output of latch 218a NOR gates 227a and b. The output of NOR gate 227a is a logical one if TTALK latch 219 is set, thereby coupling pins CTL1 to the talk latch via tristate buffer 228 and inverters 229. Tristate latch 228 is shown in detail on the right side of FIGS. 8a–f. NOR gate 227b, on the other hand, outputs a logical one if an output code has been detected, setting latch 228a and thereby connecting pins CTL1 to the most significant bit of data input register 212.

Data is shifted into data input register 212 from address pin 8 in response to a decoded read command by logics 230. RE, RB and LA instructions are outputted to ROM via instruction pins $I_{0-11}$ from ROM control logic 217 via buffers 214c. The contents of data input register 212 is outputted to CTL1-CTL4 pins via buffers 213 and to the aforementioned CTL1 pin via buffer 228 when NOR gate 227b inputs a logical one. CTL1-CTL4 pins are connected to address pins ADD-1-ADD4 via buffers 214a and CTL8 pin is connected to ADD8 pin 8 via a control buffer 214b which is disabled when addresses are being loaded on the ADD1-ADD8 pins by the signal on line 231.

The Talk latch 216 shown in FIGS. 8a–f preferably comprises, three latches 216a, 216b and 216c. Latch 216a is set in response to a decoded SPK command and generates, in response thereto, a speak enable (SPEN) signal. As will be seen, SPEN is also generated in response to a decoded SPKSLOW command by latch 215a. Latch 216b is set in response to speak enable during IC7 as controlled by gate 225. Latches 216a and 216b are reset in response to (1) a decoded reset command, (2) an energy equals fifteen code or (3) on a power-up clear by gate 232. Talk delayed latch 216c is set with the contents of latch 216b at the following IC7 and retains that data through eight interpolation counts. As was previously mentioned, the talk delayed latch permits the speech synthesizer to continue producing speech data for eight interpolation cycles after a coded energy=0 condition has been detected setting latch 208c. Likewise, slow talk latch 215 is implemented with latches 215a, 215b and 215c. Latch 215a enables the speak enable signal while latches 215b and 215c enable the production of the SLOWD signal in much the same manner as latches 216b 21d 216c enable the production of the TALKD signal.

Figure 7B:
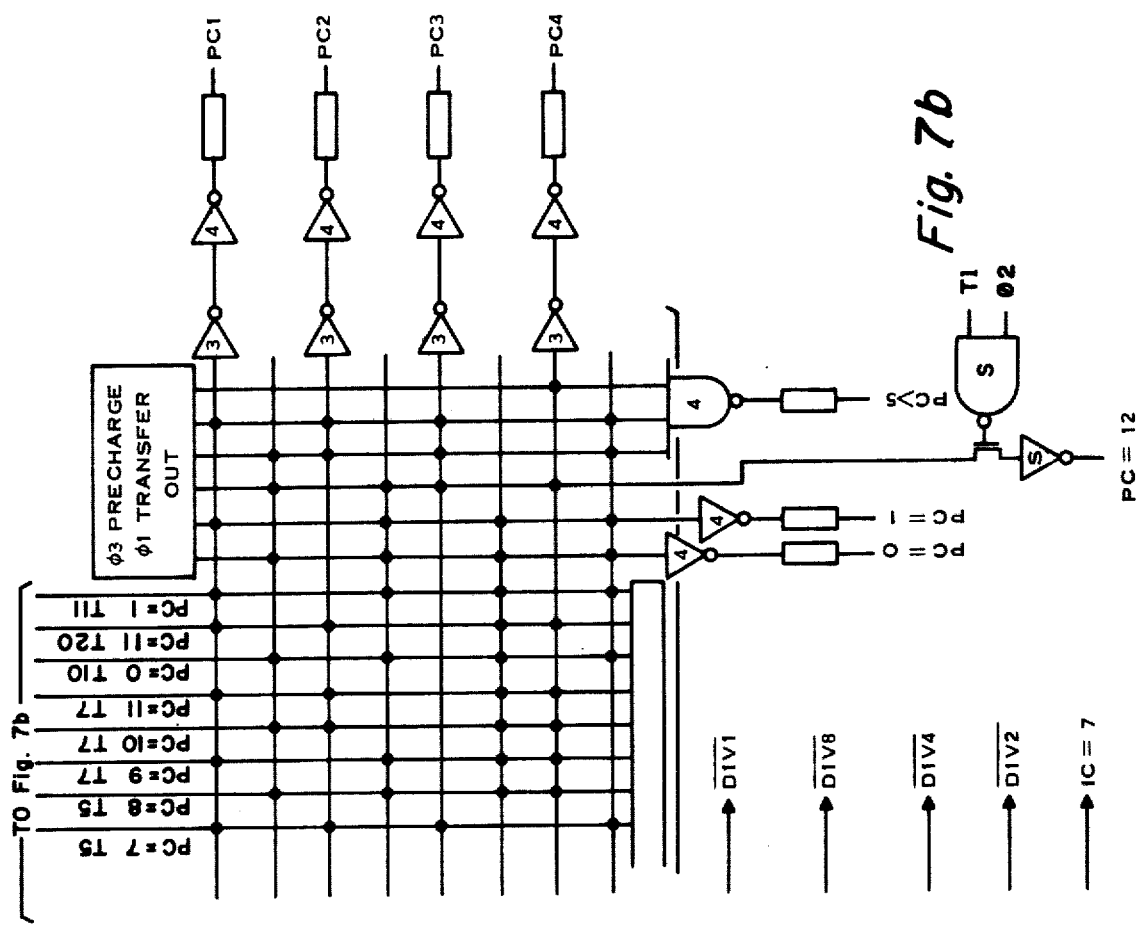
Figure 7C:
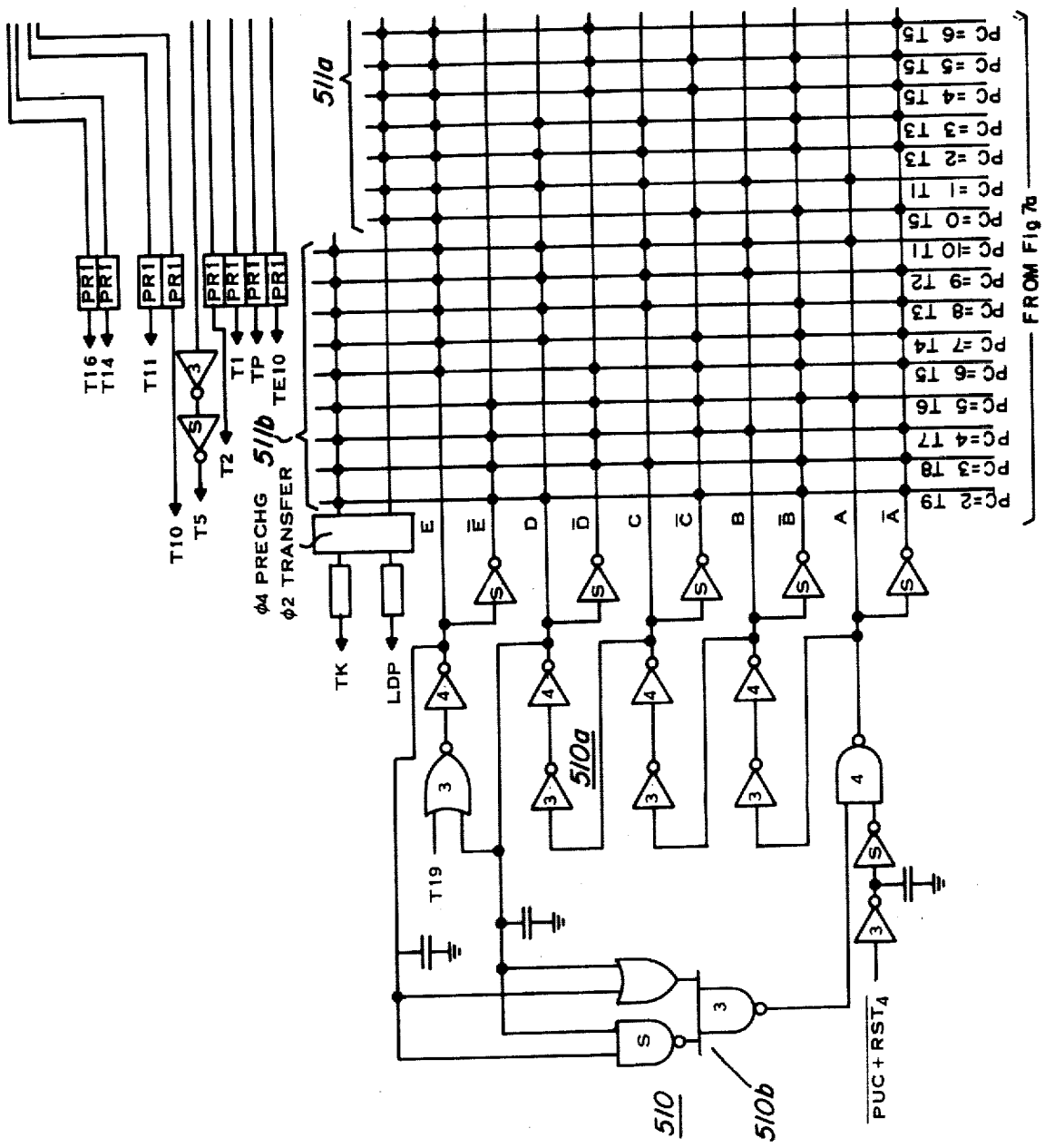
Figure 7D:
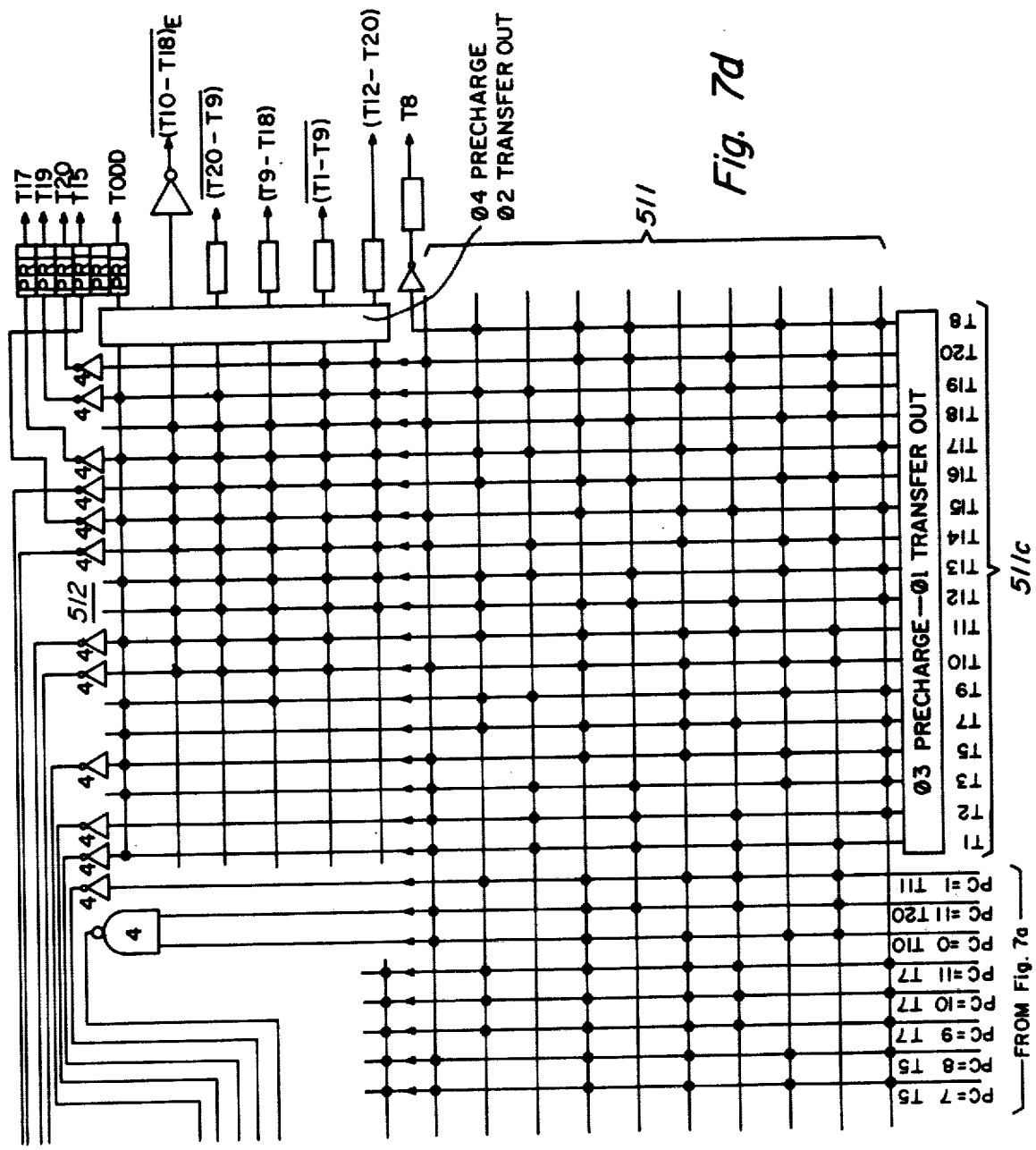

Considering now, briefly, the timing interactions for inputting data into parameter input register 205, it will be recalled that this is controlled chiefly by a control gate 220 in response to the state of a parameter input latch 221. Of course, the state of the latch is controlled by the LDP signal applied to gate 233. The PC0 and DIV1 signals applied to gate 233 to assure that the parameters are loaded during the A cycle of a particular parameter count during IC0. The particular parameter and the parameter T-Time within the parameter count is controlled by LDP according to the portion 511a of timing PLA 511 (FIGS. 7a and 7b). The first parameter inputted (Energy) is four bits long and therefore LDP is initiated during time period T5 (as can be seen in FIGS. 7a and 7b). During parameter count 1, the repeat bit and pitch bits are inputted, this being six bits which are inputted according to LDP which comes up at time period T1. Of course, there four times periods difference between T1 and T5 but only two bits difference in the length of the inputted information. This occurs because it takes two time periods to input each bit into parameter input register 205 (which has two stages per each inputted bit) due to the fact that ROMs 12a–12b are preferably clocked at half the rate at that which synthesizer 10 is clocked. By clocking the ROM chips at half the rate, that the synthesizer 10 chip is clocked simplifies the addressing of the read-only-memories in the aforesaid ROM chips and yet, as can be seen, data is supplied to the synthesizer 10 in plenty of time for performing numerical operations thereon. Thus, in section 511a of timing PLA 511, LDP comes up at T1 when the corresponding parameter count indicates that a six bit parameter is to be inputted, comes up at T3 when the corresponding parameter count indicates that a five bit parameter is to be inputted, comes up at T5 when the corresponding parameter count indicates that a four bit parameter is to be inputted and comes up at time period T7 when the corresponding parameter count (EG parameter counts 9, 10, and 11) which correspond to a three bit coded parameter. ROMs 12a-b are signaled that the addressed parameter ROM is to output in formation when signaled via $I_0$ instruction pin, ROM control logic 217 and line 234 which provides information to ROM control logic 217 from latch 221.

Parameter Interpolator Logic Diagram

Referring now to FIGS. 9a-d, which form a composite diagram the parameter interpolator logic 23 is shown in detail. K-stack 203 comprises ten registers each of which store ten bits of information. Each small square represents one bit of storage, according to the convention depicted at numeral 330. The contents of each shift register is arranged to recirculate via recirculation gates 314 under control of a recirculation control gate 315. K-stack stores speech coefficients K1-K9 and temporarily stores coefficient K10 or the energy parameter generally in accordance with the speech synthesis apparatus of FIG. 7 of U.S. patent application Ser. NO. 807,461 since abandoned and continued in U.S. patent application Ser. No. 905,328, filed May 12, 1978. The data ouputted from K-stack 302 to recoding logic 30 at various time periods is shown in Table VII. In Table III of U.S. patent application Ser. No. 807,461 since abandoned and continued in U.S. patent application Ser. No. 905,328, filed May 12, 1978, is shown the data outputted from the K-stack of FIG. 7 thereof. Table VII of this patent differs from Table III of the aforementioned patent because of (1) recoding logic 301 receives the same coefficient on lines 32-1 through 32-4, on lines 32-5 and 32-6, on lines 32-7 and 32-8 and on lines 32-9 and 32-10 because, as will be seen, recoding logic 301 resonds to two bits of information for each bit which was responded to by the array multiplier of the aforementioned U.S. patent; (2) because of the difference in time period nomenclature as was previously explained with reference to FIG. 5; and (3) because of the time delay associated with the recoding logic 301.

Figure 10A:
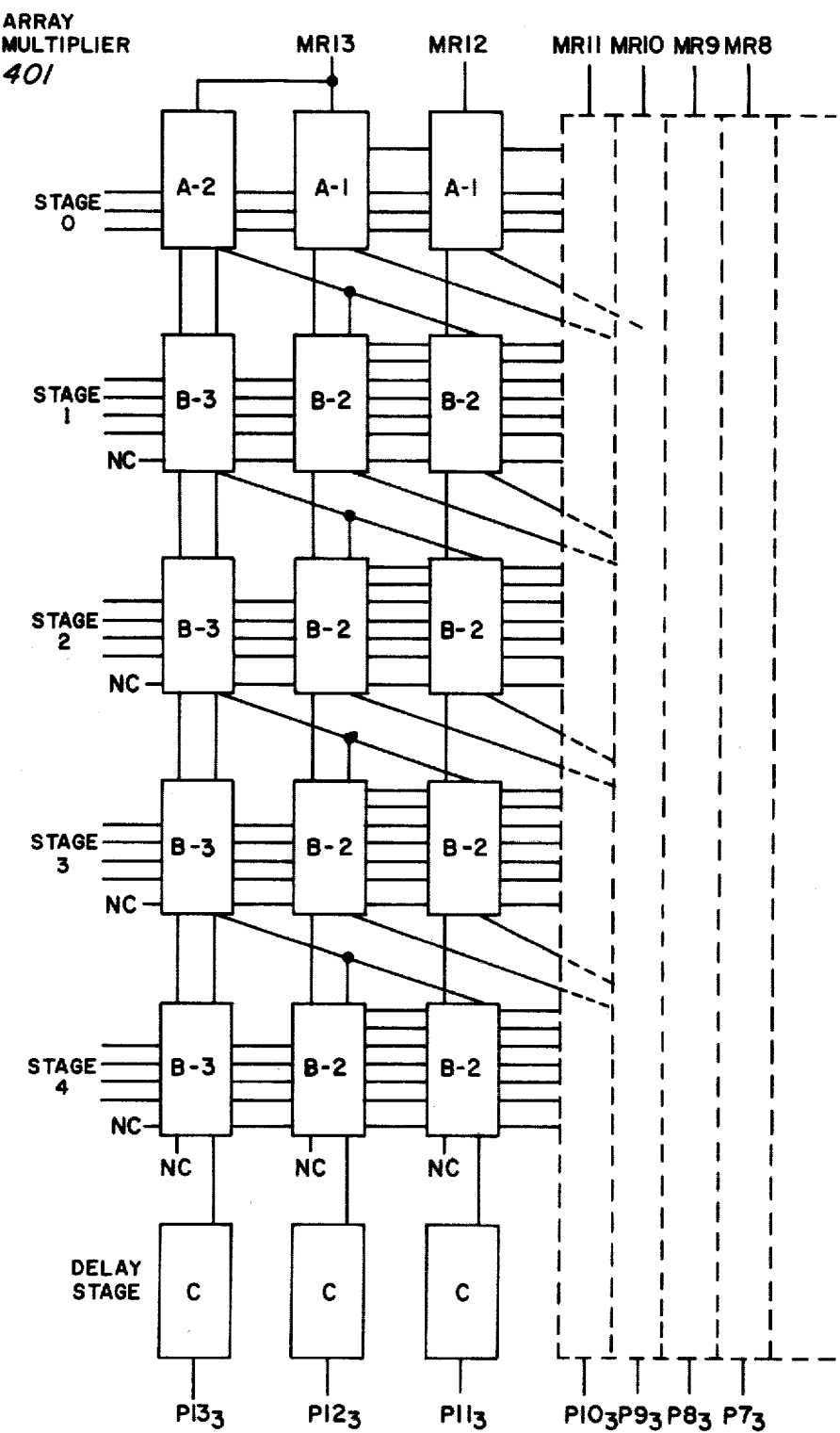
FIGS. 10a–c form a composite logic diagram of the array multiplier.
Figure 10B:
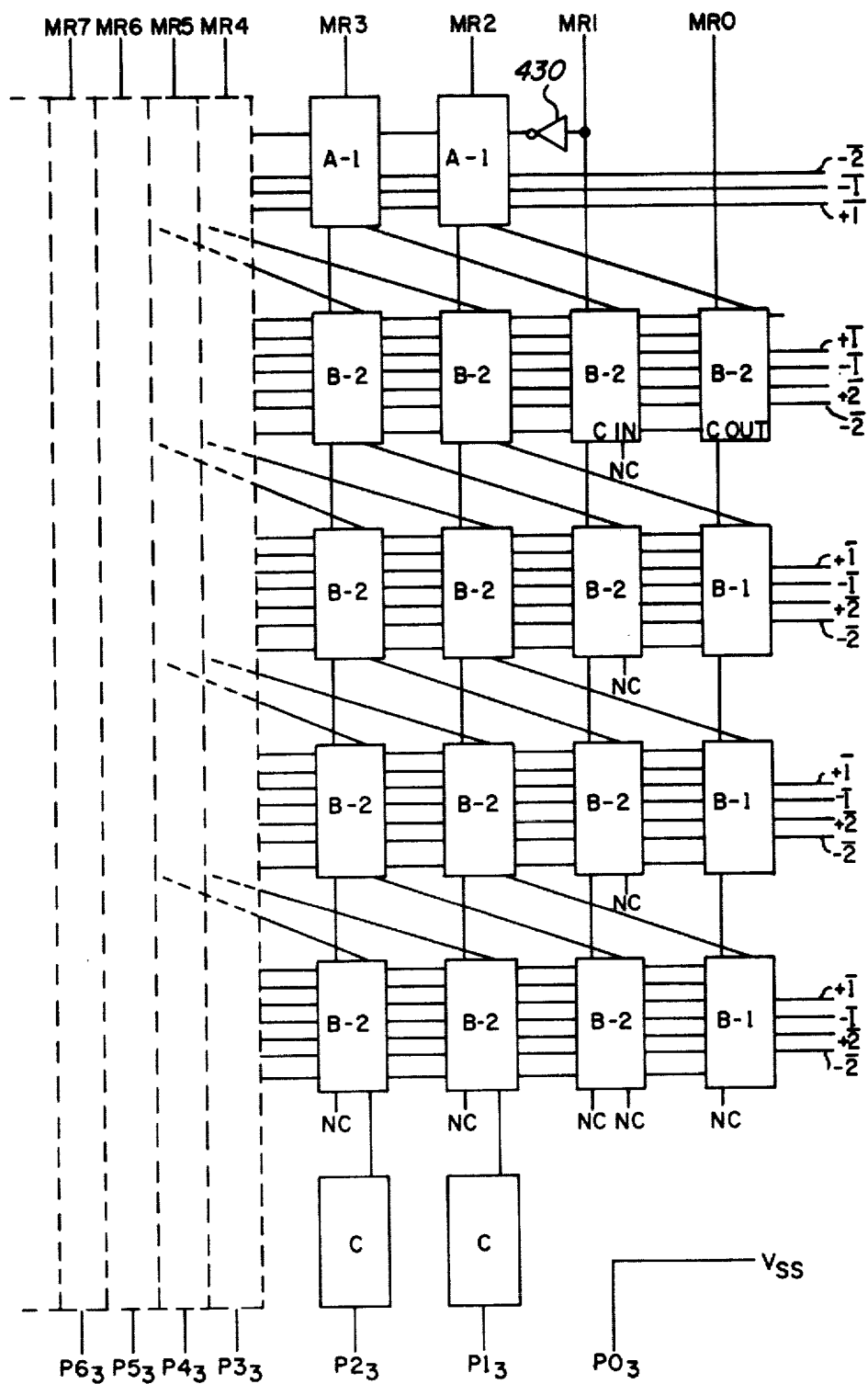
Figure 10C:
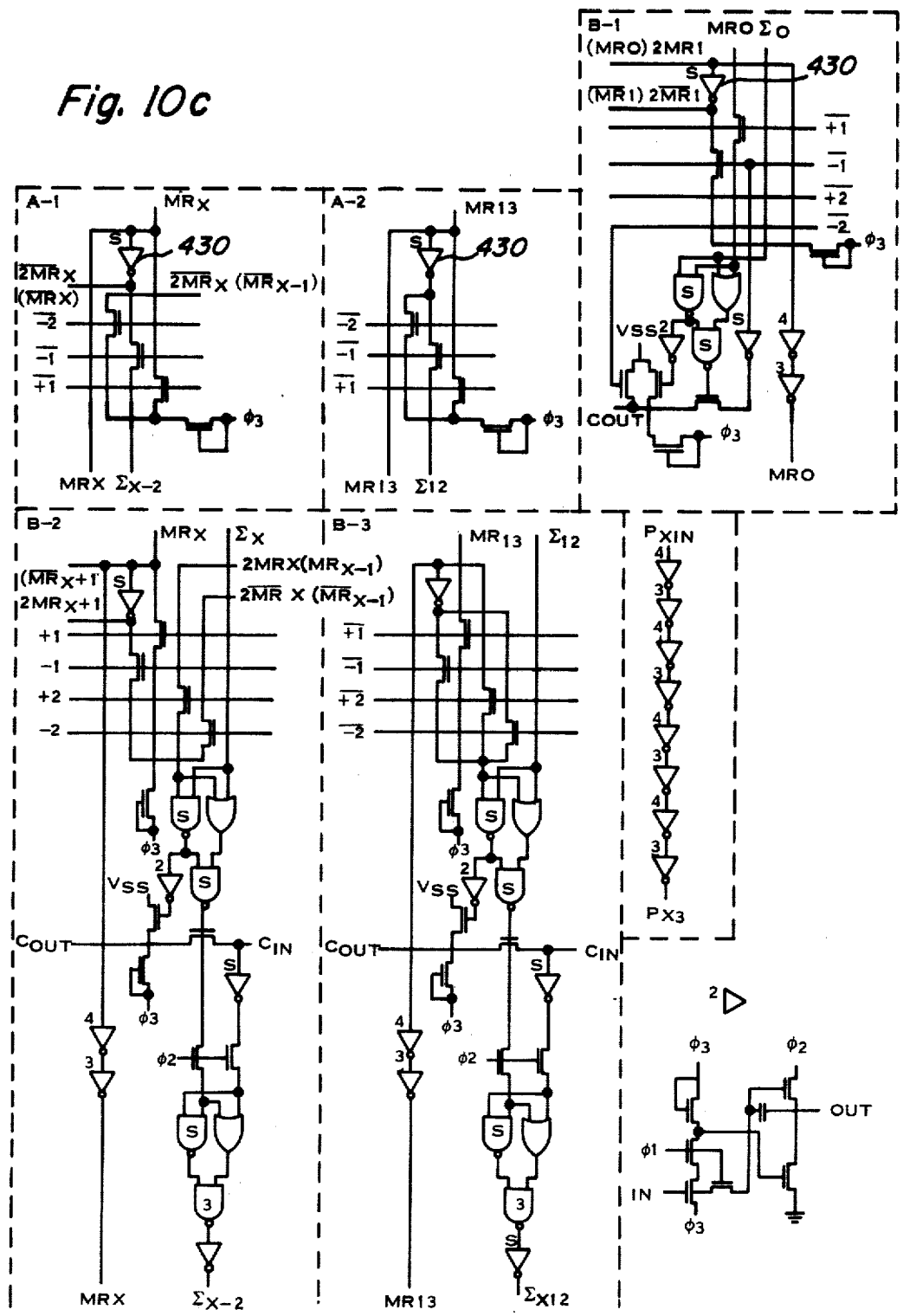

Recoding logic 301 couples K-stack 302 to array multiplier 401 (FIGS. 10a-c). Recoding logic 301 includes four identical recoding stages 312a-312d, only one of which, 312a, is shown in detail. The first stage of the recoding logic, 313, differs from stages 312a-312d basically because there is, of course, no carry, such as occurs on input A in stages 312a-312d, from a lower order stage. Recoding logic outputs $+\overline{2}$, $-\overline{2}$, $+\overline{1}$ and $-\overline{1}$ to each stage of a five stage array multiplier 401, except for stage zero which receives only $-\overline{2}$, $+\overline{1}$ and $-\overline{1}$ outputs. Effectively recoding logic 301 permits array multiplier to process, in each stage thereof, two bits in lieu of one bit of information, using Booth's algorithm. Booth's algorithm is explained in "Theory and Application of Digital SIgnal Processing", published by Prentice-Hall 1975, at pp. 517-18.

The K10 coefficient and energy are stored in E10 loop 304. E10 loop preferably comprises a twenty stage serial shift register; ten stages 304a of E10 loop 304 are preferably coupled in series and another ten stages 304b which are also coupled in series but also have parallel outputs and inputs to K-stack 302. The appropriate parameter, either energy or the K10 coefficient, is transferred from E10 loop 304 to K-stack 302 via gates 315 which are responsive to a NOR gate 316 for transferring the energy parameter from E10 loop 304 to K-stack 302 at time period T10 and transferring coefficient K10 from E10 loop 304 to K-stack 302 at time period T20. NOR gate 306 also controls recirculation control gate 315 for inhibiting recirculation in K-stack 302 when data is being transferred.

KE10 transfer register 303 facilitates the transferring of energy or the K1-K10 speech coefficients which are stored in E10 loop 304 or K-stack 302 to adder 308 and delay circuit 309 via selector 307. Register 303 has nine stages provided by paired inverters and a tenth stage being effectively provided by selector 307 and gate 317 for facilitating the transfer of ten bits of information either from E10 loop 304 or K-stack 302. Data is transferred from K-stack 302 to register 303 via transfer gates 318 which are controlled by a Transfer K (TK) signal generated by decoder portion 511b of timing PLA 511 (FIGS. 7a-d). Since the particular parameter to be interpolated and thus shifted into register 303 depends upon the particular parameter count in which the synthesizer is operating and since the particular parameter available to be outputted from K-stack 302 is a function of particular time period the synthesizer is operating in, the TK signal comes up at T9 for the pitch parameter, T8 for the K1 parameter, T7 for the K2 parameter and so forth, as is shown in FIGS. 7a and 7b. The energy parameter or the K10 coefficient is clocked out of E10 loop 304 into register 303 via gates 319 in response to a TE10 signal generated by a timing PLA 511. After each interpolation, that is during the B cycle, data is transferred from register 303 into (1) K-stack 302 via gates 318 under control of signal TK, at which time recirculation gates 314 are turned off by gate 315, or (2) E10 loop 304 via gates 319.

A ten bit pitch parameter is stored in a pitch register 305 which includes a nine stage shift register as well as recirculation elements 305a which provide another bit of storage. The pitch parameter normally recirculates in register 305 via gate 305a except when a newly interpolated pitch parameter is being provided on line 320, as controlled by pitch interpolation control logics 306. The output of pitch 305 (PTO) or the output from register 303 is applied by selector 307 to gate 317. Selector 307 is also controlled by logics 306 for normally coupling the output of register 303 to gate 317 except when the pitch is to be interpolated. Logics 306 are responsive for outputting pitch to adder 308 and delay 309 during the A cycle of PC=1 and for returning the interpolated pitch value on line 320 on the B cycle of PC=1 to register 305. Gate 317 is responsive to a latch 321 for only providing pitch, energy or coefficient information to adder 308 and delay circuit 309 during the interpolation. Since the data is serially clocked, the information may be started to be clocked during an A portion and PCO may switch to a logical one sometime during the transferring of the information from register 303 or 305 to adder 308 or delay circuit 309, and therefore, gate 317 is controlled by an A cycle latch 321, which latch is set with PCO at the time a transfer coefficient (TK) transfer E10 (TE10) or transfer pitch (TP) signal is generated by timing PLA 511.

The output of gate 317 is applied to adder 308 and delay circuit 309. The delay in delay circuit 309 depends on the state of DIV1-DIV8 signals generated by interpolation counter 515 (FIGS. 7a-d). Since the data exits gate 317 least significant bit first, by delaying the data in delay circuit 309 a selective amount, and applying the output to adder 310 along with the output of subtractor 308, the more delay there is in circuit 309, the smaller the effective magnitude of the difference from subtractor 308 which is subsequently added back in by adder 310. Delay circuit 311 couples adder 310 back into register 303 and 305. Both delay circuits 309 and 303 can insert up to three bits of delay and when adder 309 is at its maximum delay 311 is at its minimum delay and visa-versa. A NAND gate 322 couples the output of subtractor 308 to the input of adder 310. Gate 322 is responsive to the output of an OR gate 323 which is in turn responsive to INHIBIT from inverted 236 (FIGS. 8a–c). Gates 322 and 323 act to zero the output from subtractor 308 when the INHIBIT signal comes up unless the interpolation counter is at IC0 in which case the present values in K-stack 302, E10 loop 304 and P register 305 are fully interpolated to their new target values in a one step interpolation. When an unvoiced frame (FIG. 6) is supplied to the speech synthesis chip, coefficients K5–K10 are set to zero by the action of gate 324 which couples delay circuit 311 to shift register 325 whose output is then coupled to gates 305a and 303'. Gate 324 is responsive to the zero parameter (ZPAR) signal generated by gate 237 (FIGS. 8a–c).

Gate 326 disables shifting in the 304b portion of E10 loop 304 when a newly interpolated value of energy or K10 is being inputted into portion 304b from register 303. Gate 327 controls the transfer gates coupling the stages of register 303, which stages are inhibited from serially shifting data therebetween when TK or TE10 goes high during the A cycle, that is, when register 303 is to be receiving data from either K-stack 302 or E10 loop 304 as controlled by transfer gates 318 or 319, respectively. The output of gates 327 is also connected to various stages of shift register 325 and to a gate coupling 303' with register 303. Whereby up top the three bits which may trail the ten most significant bits after an interpolation operation may be zeroed.

Array Multiplier Logic Diagram

FIGS. 10a–c form a composite logic diagram of array multiplier 401. Array multipliers are sometimes referred to as Pipeline Multipliers. For example, see "Pipeline Multiplier" by Granville E. Ott, published by the University of Missouri.

Array multiplier 401 has five stages, stage 0 through stage 4, and a delay stage. The delay stage is used in array multiplier 41 to give it the same equivalent delay as the array multiplier shown in U.S. patent application Ser. No. 807,461, since abandoned and continued in U.S. patent application Ser. No. 905,328, filed May 12, 1978. The input to array multiplier 401 is provided by signals $MR_0$–$MR_{13}$, from multiplier multiplexer 405. $MR_{13}$ is the most significant bit while $MR_0$ is the least significant bit. Another input to array multiplier are the aforementioned +2, −2, +1 and −1 outputs from recording logic 301 (FIGS. 8a–f). The output from array multiplier 401, $P_{13}$–$P_0$, is applied to summer multiplexer 402. The least significant bit thereof, P0, is in this embodiment always made a logical one because doing so establishes the mean of the truncation error as zero instead of $-\frac{1}{2}$ LSB which value would result from a simple truncation of a two's complement number.

Array multiplier 401 is shown by a plurality of box elements labeled A-1, A-2, B-1, B-2, B-3 or B-C. The specific logic elements making up these box elements are shown on the right-hand side of composite FIGS. 10a–10b in lieu of repetitively showing these elements and making up a logic diagram of FIG. 401, for simplicity sake. The A-1 and A-2 block elements make up stage zero of the array multiplier and thus are each responsive to the $\overline{-2}$, $\overline{+1}$ and $\overline{-1}$ signals outputted from decoder 313 and are further responsive to MR2–MR13. When multiplies occur in array multiplier 401, the most significant bit is always maintained in the left most column elements while the partial sums are continuously shifted toward the right. Inasmuch as each stage of array multiplier 401 operates on two binary bits, the partial sums, labeled Σn, are shifted to the right two places. Thus no A type blocks are provided for the MR0 and MR1 data inputs to the first stage. Also, since each block in array multiplier 401 is responsive to two bits of information from K-stack 302 received via recoding logic 301, each block is also responsive to two bits from multiplier multiplexer 405, which bits are inverted by inverters 430, which bits are also supplied in true logic to the B type blocks.

Filter and Excitation Generator Logic Diagram

Figure 11A:
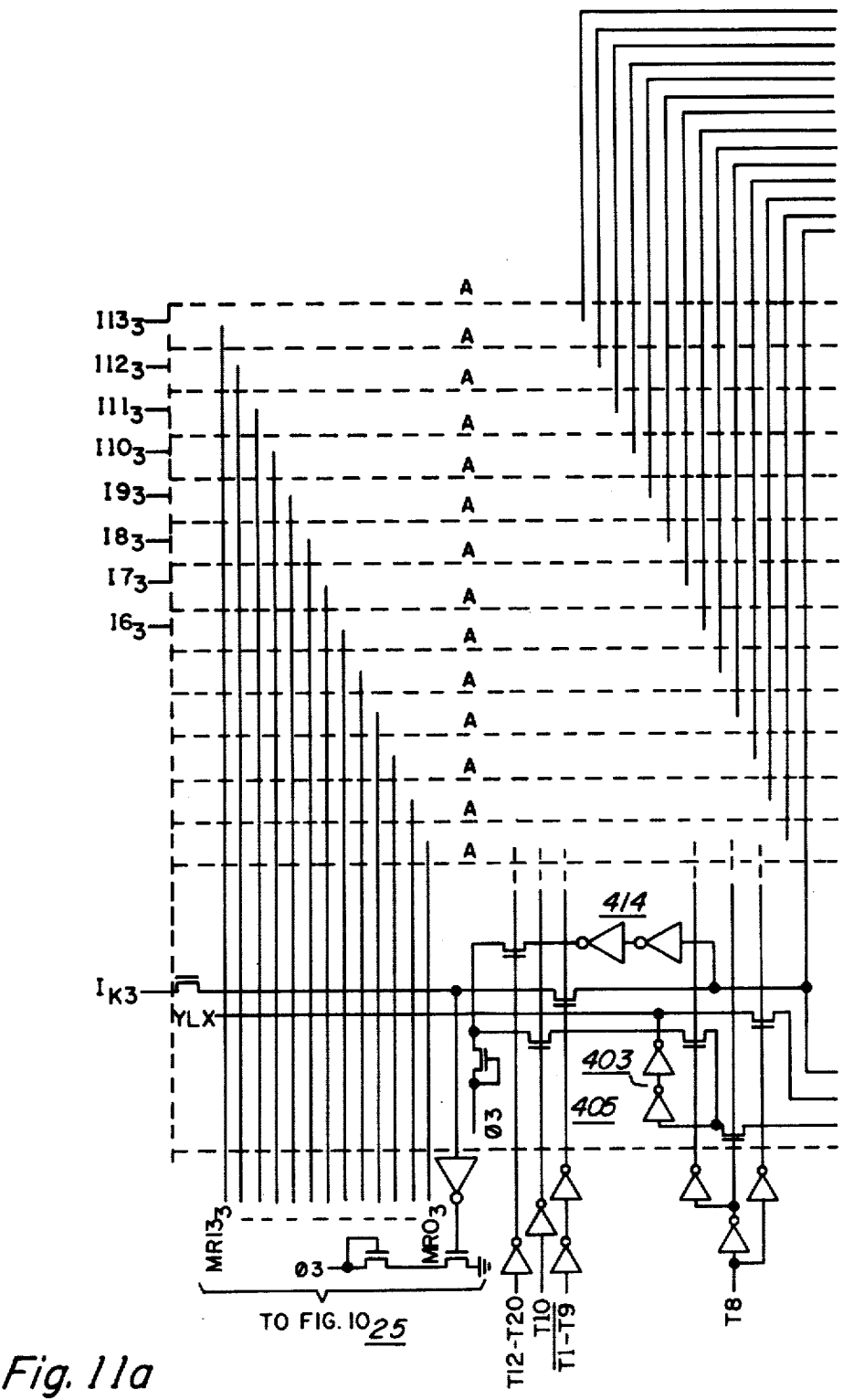
Figure 11B:
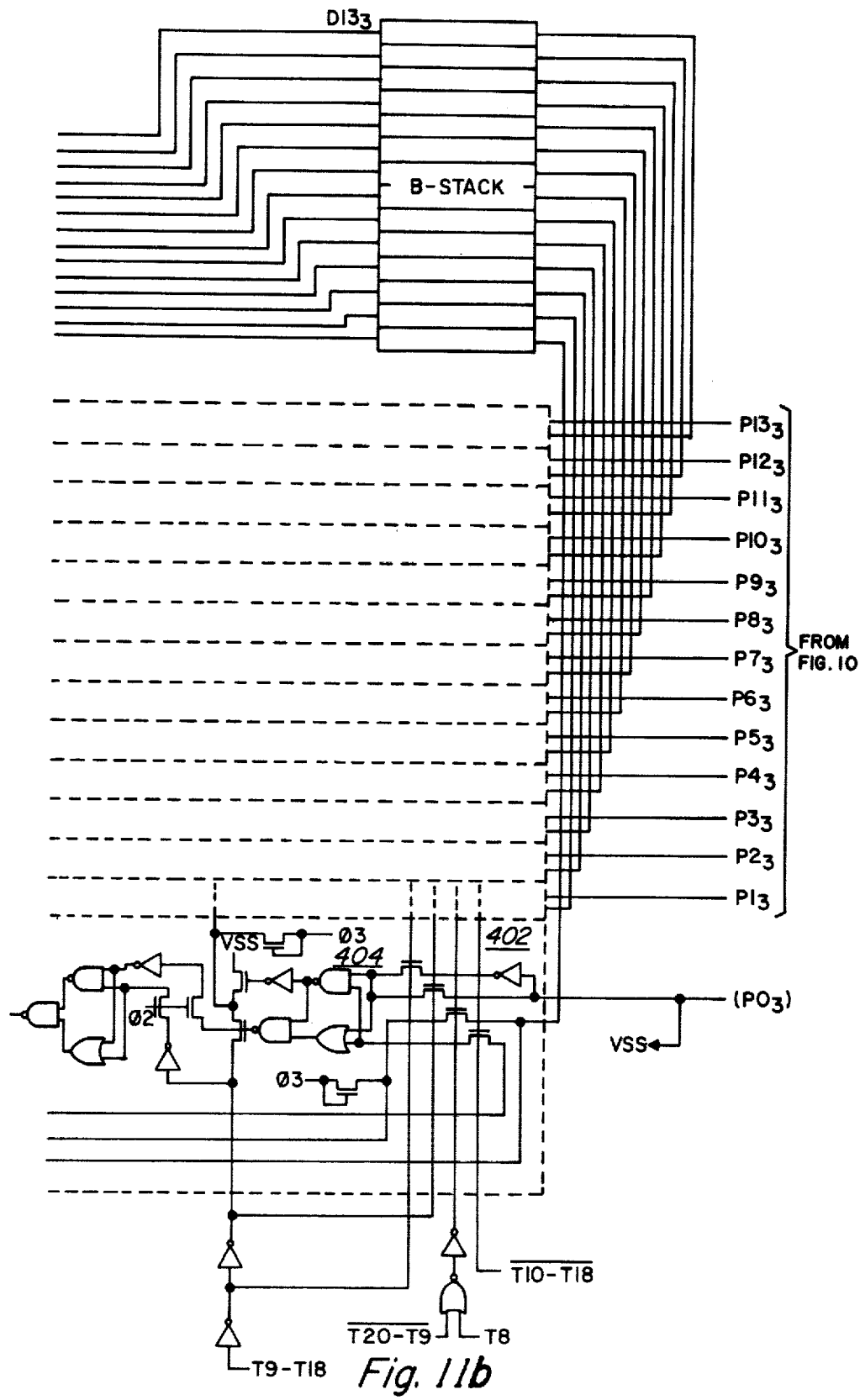
Figure 11C:
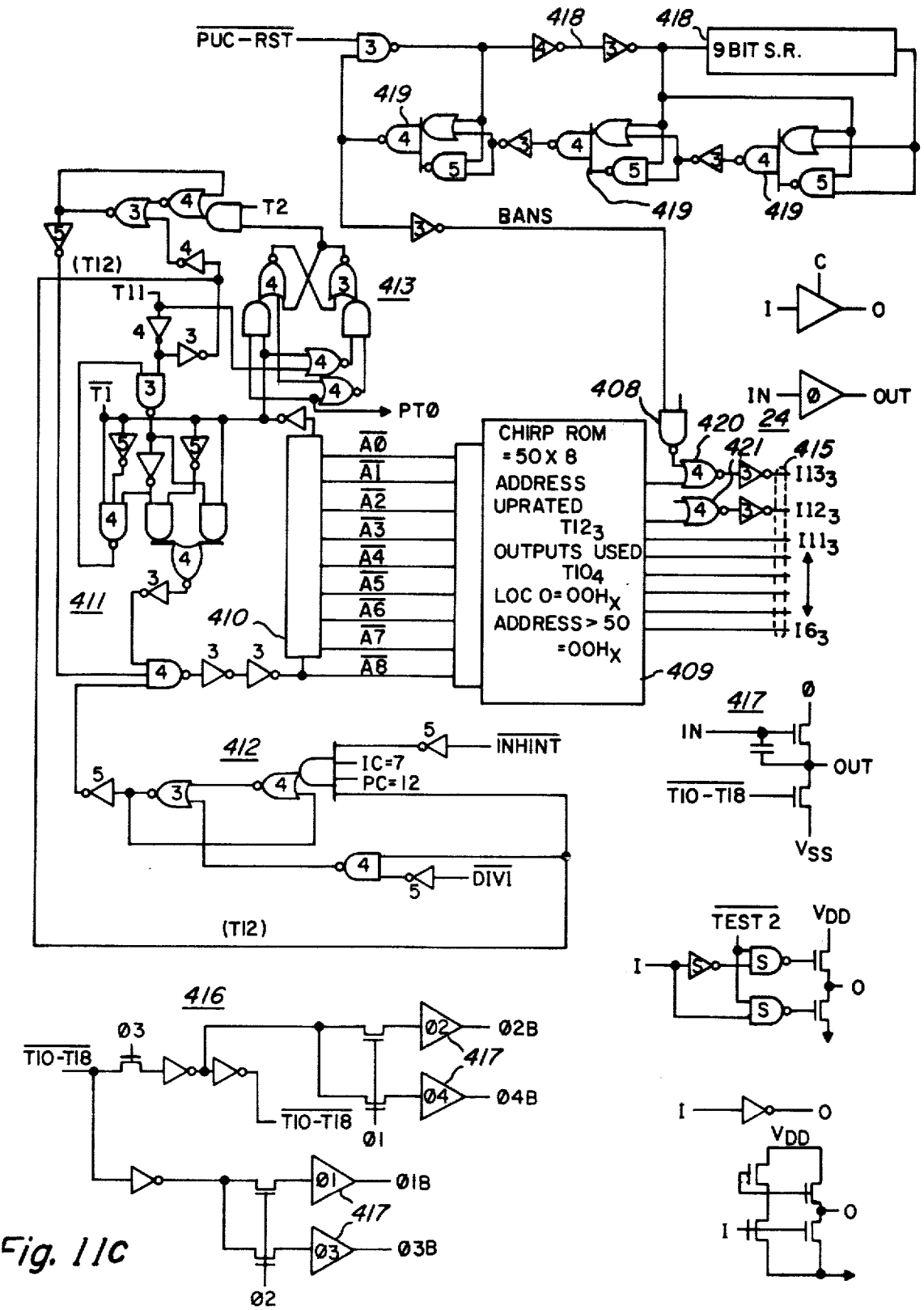

FIGS. 11a–11b form a composite, detailed logic diagram of lattice filter and excitation generator 24 (other than array multiplier 401) and output section 25. In filter and excitation generator 24 is a summer 404 which is connected to receive at one input thereof either the true or inverted output of array multiplier 401 (see FIGS. 10a–c) on lines P0–P13 via summer multiplexer 402. The other input of adder 404 is connected via summer multiplexer 402 to receive either the output of adder 404 (atT10–T18), the output of delay stack 406 on lines 440–453 at T20–T7 and T9), the output of Y-latch 403 (at T8) or a logical zero from φ3 precharge gate 420 (at T19 when no conditional discharge is applied to this input). The reasons these signals are applied at these times can be seen from FIG. 8 of the aforementioned U.S. patent application Ser. No. 807,461, since abandoned and continued in U.S. patent application Ser. No. 905,328, filed May 12, 1978; it is to be remembered of course, that the time period designations differs as discussed with reference to FIG. 5 hereof.

The output of adder 404 is applied to delay stack 406, multiplier multiplexer 405, one period delay gates 414 and summer multiplexer 402. Multiplier multiplexer 405 includes a one period delay gates 414 which are generally equivalent to one period delay 34' of FIG. 7 in U.S. patent application Ser. No. 807,461, since abandoned and continued in U.S. patent application Ser. No. 905,328, filed May 12, 1978. Y-latch 403 is connected to receive the output of delay stack 406. Multiplier multiplexer 405 selectively applies the output from Y-latch 403, one period delay gates 414, or the excitation signal on bus 415 to the input MR0–MR13 of array multiplier 401. The inputs D0–D13 to delay stack 406 are derived from the outputs of adders 404. The logics for summer multiplexer 402, adder 404, Y-latch 403, multiplier multiplexer 405 and one period delay circuit 414 are only shown in detail for the least significant bit as enclosed by dotted line reference A. The thirteen most significant bits in the lattice filter also are provided by logics such as those enclosed by the reference A line, which logics are denoted by long rectangular phantom line boxes labeled "A". The logics for each parallel bit being processed in the lattice filter are not shown in detail for sake of clarity. The portions of the lattice filter handling bits more significant than the least significant bit differ from the logic shown for elements 402, 403, 404, 405, and 414 only with respect to the interconnections made with truncation logics 501 and bus 415 which connects to UV gate 408 and chirp ROM 409. In this respect, the output from UV gate 408 and chirp ROM 409 is only applied to inputs I13–I6 and therefore the input labeled $I_x$ within the reference A phantom line is not needed for the six least significant bits in the lattice filter. Similarly, the output from the Y-latch 403 is only applied for the ten most significant bits, $YL_{13}$ through $YL_4$, and therefore the connection labeled YLx within the reference line is not required for the four least significant bits in the lattice filter.

Delay stack 406 comprises 14 nine bit long shift registers, each stage of which comprise inverters clocked on $\phi 4$ and $\phi 3$ clocks. As is discussed is U.S. patent application Ser. No. 807,461, since abandoned and continued in U.S. patent application Ser. No. 905,328, filed May 12, 1978, the delay stack 406 which generally corresponds to shift register 35' of FIG. 7 of the aforementioned patent, is only shifted on certain time periods. This is accomplished by logics 416 whereby $\phi 1B-\phi 4B$ clocks are generated from T10–T18 timing signal from PLA 512 (FIGS. 7a–d). The clock buffers 417 in circuit 416 are also shown in detail in FIGS. 11a and 11b.

Delay stack 406 is nine bits long whereas shift register 35' in FIG. 7 of U.S. patent application Ser. No. 807,461, since abandoned and continued in U.S. patent application Ser. No. 905,328, filed May 12, 1978, was eight bits long; this difference occurs because the input to delay stack 406 is shown as being connected from the output of adder 404 as opposed to the output of one period delay circuit 414. Of course, the input to delay stack 406 could be connected from the outputs of one period delay circuit 414 and the timing associated therewith modified to correspond with that shown in U.S. patent application Ser. No. 807,461, since abandoned and continued in U.S. patent application Ser. No. 905,328, filed May 12, 1978.

The data handled in delay stack 406, array multiplier 401, adder 402, summer multiplexer 402, Y-latch 403, and multiplier multiplexer 405 is preferably handled in two's complement notation.

Unvoiced generator 407 is a random noise generator comprising a shift register 418 with a feedback term supplied by feedback logics 419 for generating psuedo-random terms in shift register 418. An output is taken therefrom and is applied to UV gate 408 which is also responsive to OLDP from latch 208d (FIGS. 8a–f). Old pitch latch 208d controls gate 408 because pitch=0 latch 208b changes state immediately when the new speech parameters are inputted to register 205. However, since this occurs during interpolation count IC0 and since, during an unvoiced condition the new values are not interpolated into K-stack 302, E10 loop 304 and pitch register 305 until the following IC0, the speech excitation value cannot change from a periodic excitation from chirp ROM 409 to a random excitation from unvoiced generator 407 until eight interpolation cycles have occurred. Gate 420 nors the output of gate 408 into the most significant bit of the excitation signal, $I_{13}$, thereby effectively causing the sign bit to randomly change during unvoiced speech. Gate 421 effectively forces the most significant bit of the excitation signal, $I_{12}$, to a logical one during unvoiced speech conditions. Thus the combined effect of gates 408, 420 and 421 is to cause a randomly changing sign to be associated with a steady decimal equivalent value of 0.5 to be applied to the lattice filter and Filtering Excitation Generator 24.

Figure 14A:
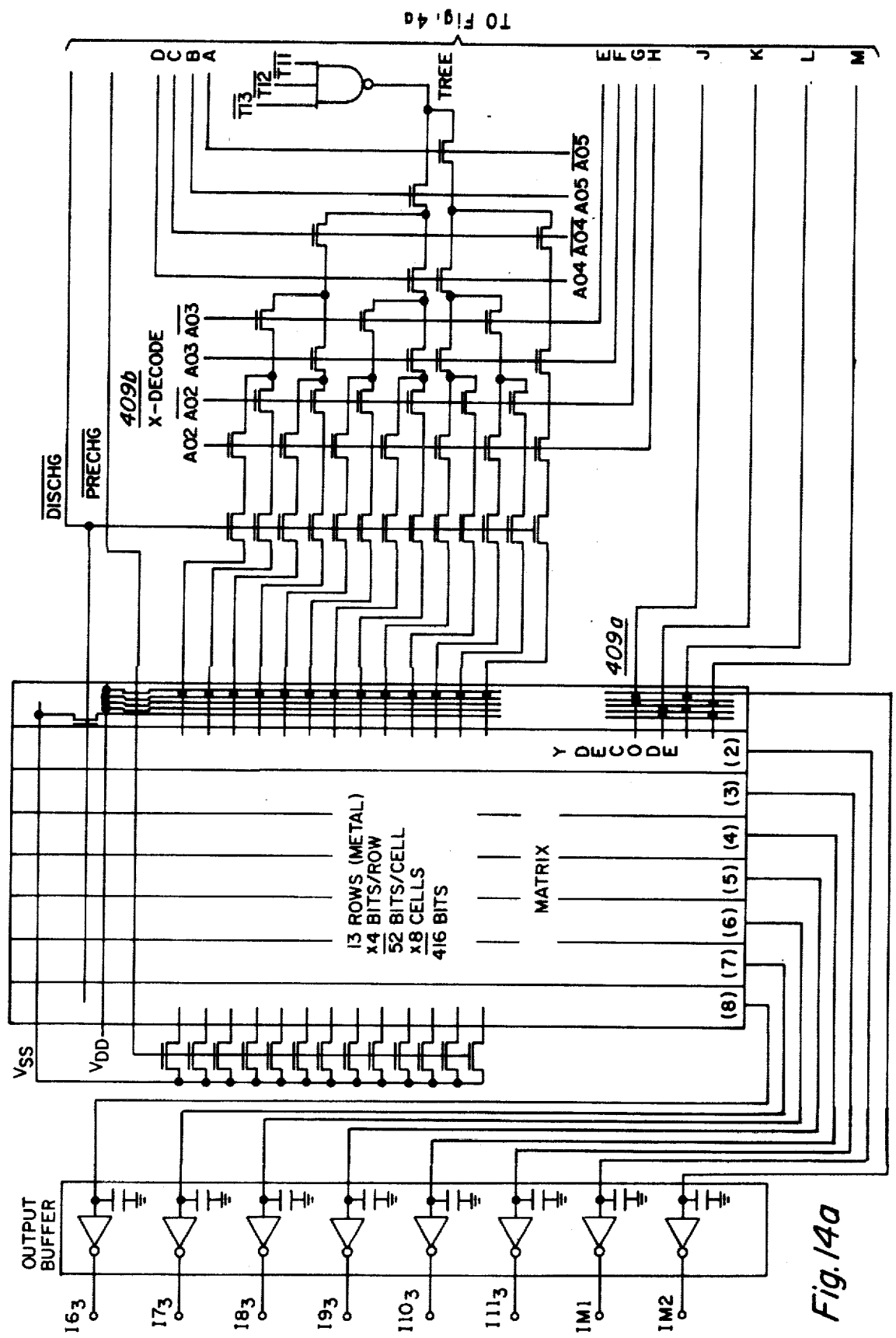
FIGS. 14a–14b form a composite diagram of the chirp ROM.
Figure 14B:
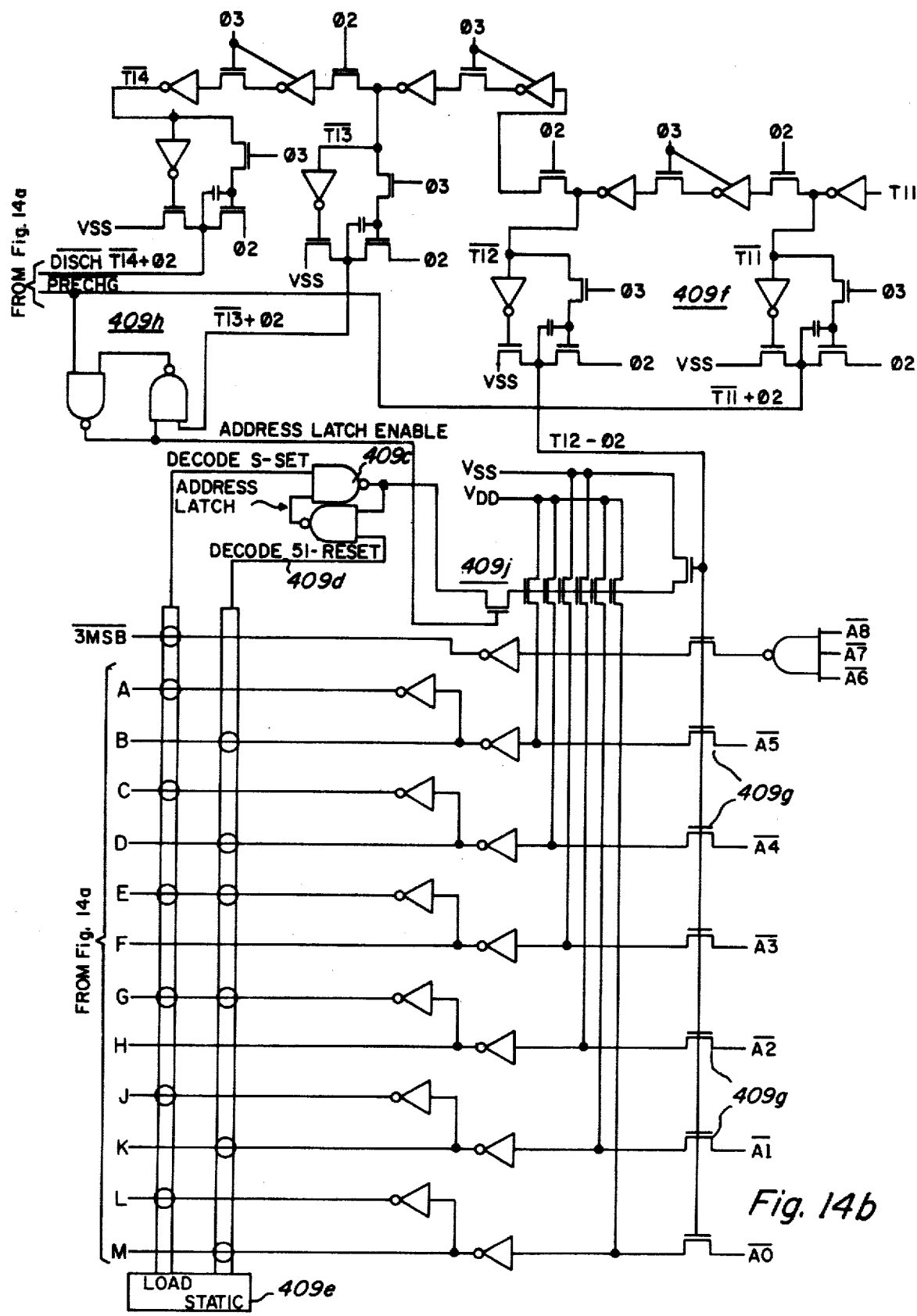

During voiced speech, chirp ROM 409 provides an eight bit output on lines $I_6-I_{13}$ to the lattice filter. This output comprises forty-one successively changing values which, when graphed, represent a chirp function. The contents of ROM 409 are listed in Table VIII; ROM 404 is set up to invert its outputs and thus the data is stored therein in complemented format. The chirp function value and the complemented value stored in the chirp ROM are expressed in two's complement hexadecimal notation. ROM 409 is addressed by an eight bit register 410 whose contents are normally updated during each cycle through the lattice filter by add one circuit 411. The output of register 410 is compared with the contents of pitch register 305 in a magnitude comparitor 403 for zeroing the contents of 410 when the contents of register 410 become equal to or greater than the contents of register 305. ROM 409, which is shown in greater detail in FIGS. 14a–14b, is arranged so that addresses greater than 110010 cause all zeros to be outputted on lines $I_{13}-I_6$ to multiplier multiplexer 405. Zeros are also stored in address locations 41–51. Thus, the chirp may be expanded to occupy up to address location fifty, if desired.

Random Access Memory Logic Diagram

Referring now to FIGS. 12a–12b, there is shown a composite detailed logic diagram of RAM 203. RAM 203 is addressed by address on PC1–PC4, which address is decoded in a PLA 203a and defines which coded parameter is to be inputted into RAM 203. RAM 203 stores the twelve decoded parameters, the parameters having bit lengths varing between three bits and five bits according to the decoding scheme described with reference to FIG. 6. Each cell, reference B, of RAM 203 is shown in greater detail in FIG. 12b. Read-/Write Control Logic 203b is responsive to T1, DIV1, PC0 and parameter load enable for writing into the RAM 203 during the A cycle of each parameter count during interpolation count zero when enabled by parameter load enable from logics 238 (FIG. 8a–c). Data is inputted to RAM 203 on lines IN0–IN4 from register 205 as shown in FIGS. 8a and 8b and data is outputted on lines OUT1–OUT5 to ROM 202 as is shown in the aforementioned figures.

Parameter Read-Only-Memory Logic Diagram

Figure 13A:
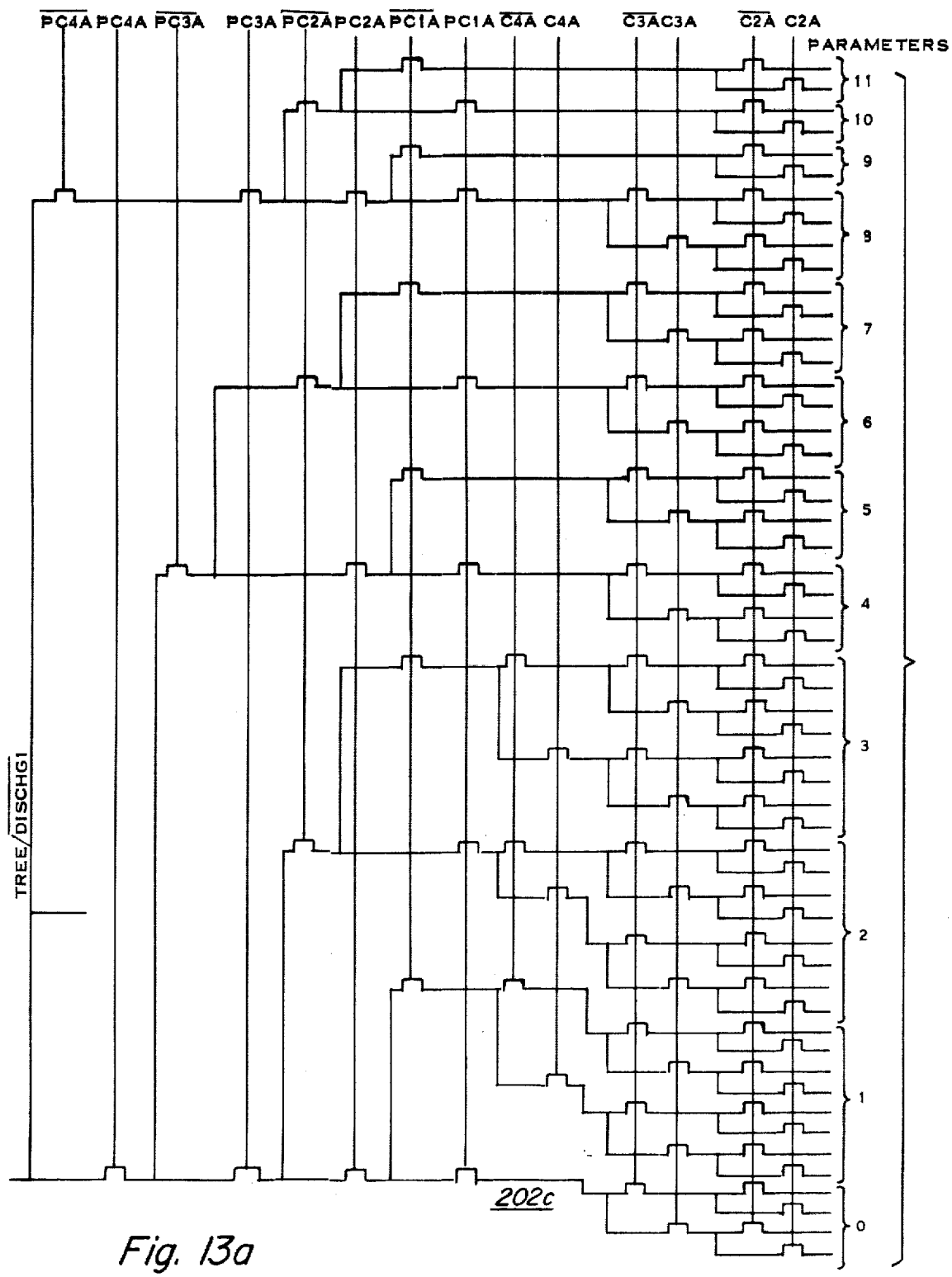
FIGS. 13a–c are schematic diagams of the parameter ROM.
Figure 13B:
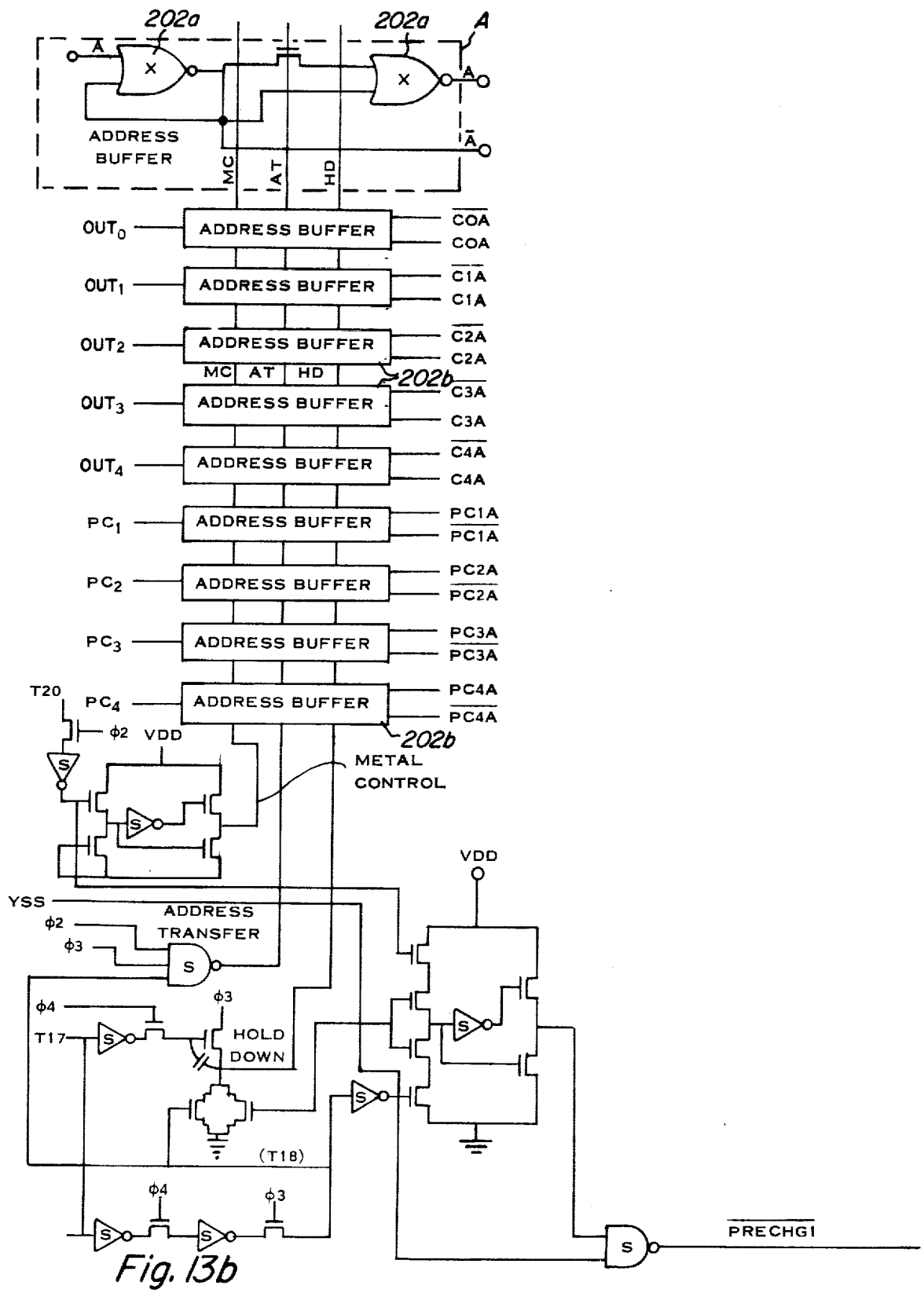

In FIGS. 13a–13b, there is shown a logic diagram of ROM 202. ROM 202 is preferably a virtual ground ROM of the type disclosed in U.S. Pat. No. 3,934,233. Address information from RAM 202 and from parameter counter 513 are applied to address buffers 202b which are shown in detail at reference A. The NOR gates 202a used in address buffers 202b are shown in detail at reference B. The outputs of the address buffers 202b are applied to an X-decoder 202c or to a Y-decoder 202d. The ROM is divided into ten sections labeled reference C, one of which is shown in greater detail. The outline for output line from each of the sections is applied to register 201 via inverters as shown in FIGS. 8a and 8b. X-decoder selects one of fifty-four X-decode lines while Y-decoder 202d test for the presence or nonpresence of a transistor cell between an adjacent pair of diffussion lines, as is explained in greater detail in the aforementioned U.S. Pat. No. 3,934,233. The data preferably stored in ROM 202 of this embodiment is listed in Table VI.

Chirp Read-Only-Memory Logic Diagram

FIGS. 14a–14b form a composite diagram of chirp ROM 409. ROM 409 is addressed via address lines $\overline{A_0}-\overline{A_8}$ from register 410 (FIGS. 11a–11b) and output information on lines $I_6-I_{11}$ to multiplier multiplexer 405 and lines $I_{m1}$ and $I_{m2}$ to gates 421 and 420, all which are shown in FIGS. 11a and 11b. As was previously discussed with reference to FIGS. 11a and 11b, chirp ROM outputs all zeros after a predetermined count is reached in register 410, which, in this case is the count equivalent to a decimal 51. ROM 409 includes a Y-decoder 409a which is responsive to the address on lines $\overline{A_0}$ and $\overline{A_1}$ (and $A_0$ and $A_1$) in an X-decoder 409b which is responsive to the address on lines $\overline{A_2}$ through $\overline{A_5}$ (and $A_2$–$A_5$).

ROM 409 also includes a latch 409c which is set when decimal 51 is detected on lines $\overline{A_0}$–$\overline{A_5}$ according to line 409c from a decoder 409e. Decoder 409e also decodes a logical zero on lines $\overline{A_0}$–$\overline{A_8}$ for resetting latch 409c. ROM 409 includes timing logics 409f which permit data to be clocked in via gates 409g at time period T12. At this time decoder 409e checks to determine whether either a decimal 0 or decimal 51 is occurring on address lines $\overline{A_0}$–$\overline{A_8}$. If either condition occur, latch 409c, which is a static latch, is caused to flip.

An address latch 409h is set at time period T13 and reset at time period T11. Latch 409h permits latch 409c to force a decimal 51 onto lines $\overline{A_0}$–$\overline{A_5}$ when latch 409c is set. Thus, for addresses greater than 51 address register 410, the address is frst sampled at time period T12 to determine whether it has been reset to zero by reset logic 412 (FIGS. 12a–12b) for the purpose of resetting latch 409c and if the address has not been reset to zero then whatever address has been inputted on lines $\overline{A_0}$–$\overline{A_8}$ is written over by logics 409j at T13. Of course, at location 51 in ROM 409 will be stored all zeros on the output lines I6–I11, IM1 and IM2. Thus by the means of logics 409c, 409h and 409j addresses of a preselected value, in this case a decimal 51, are merely tested to determine whether a reset has occurred but are not permitted to address the array of ROM cells via decoders 409a and 409b. Addresses between a decimal 0 and 50 address the ROM normally via decoders 409a and 409b. The ROM matrix is preferably of the virtual ground type described in U.S. Pat. No. 3,934,233. As aforementioned, the contents of ROM 409 are listed in Table VIII. The chirp function is located at addresses 00–40 while zeros are located at addresses 41–51.

Truncation Logic and Digital-To-Analog Converter

Turning again to FIGS. 11a–d, the truncation logic 425 and Digital-to-Analog (D/A) converter is shown in detail. Truncation logic 425 includes circuitry for converting the two's complement data on $YL_{13}$–$YL_{14}$ to sign magnitude data. Logics 425a test the MSB from Y-latch 403 on line $YL_{13}$ for the purpose of generating a sign bit and for controlling the two's complement to sign magnitude conversion accomplished by logics 425c. The sign bit is supplied in true and false logic on lines D/Asn and $\overline{D/Asn}$ to D/A converter 426.

Logics 425c convert the two's complement data from Y-latches 403 in lines $YL_{10}$–$YL_4$ to simple magnitude notation on lines $D/A_6$–$D/A_0$. Only the logics 425c associated with YL10 are shown in detail for sake of simplicity.

Logics 425b sample the $YL_{12}$ and $YL_{11}$ bits from the Y-latches 403 and perform a magnitude truncation function thereon by forcing outputs $D/A_6$ through $D/A_0$ to a logical zero (i.e., a value of one if the outputs were in true logic) wherever either $YL_{12}$ or $YL_{11}$ is a logical one and $YL_{13}$ is a logical zero, indicating that the value is positive or either $YL_{12}$ or $YL_{11}$ is a logical zero and $YL_{13}$ is a logical one, indicating that the value is negative (and complemented, of course). Whenever one of these conditions occurs, a logical zero appears on line 427 and Vss is thereby coupled to the output buffer 428 in each of logics 425c. The magnitude function effectively truncates the more signficant bits on $YL_{11}$ and $YL_{12}$. It is realized that this is somewhat unorthodox truncation, since normally the less significant bits are truncated in most other circuits where truncation occurs. However, in this circuit, large positive or negative values are effectively clipped. More important digital speech information, which has smaller magnitudes, is effectively amplified by a factor of four by this truncation scheme.

Figure 23A:
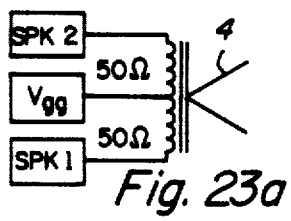
FIGS. 23a and 23b depict embodiments of the voice coil connection.

The outputs $\overline{D/A_6}$–$\overline{D/A_0}$, along with $\overline{D/Asn}$ and D/Asn, are coupled to D/A converter 426. D/A converter 426 preferably has seven MOS devices 429 coupled to the seven lines $\overline{D/A_6}$ through $\overline{D/A_0}$ from truncation logics 425. Each device 429 preferably includes a MOS transistor whose gates is coupled to one of the lines $\overline{D/A_6}$–$\overline{D/A_0}$ and a series connected implanted load transistor 429b. Devices 429 are arranged, by controlling their length to width ratios, to act as current sources, the device 429 coupled to $\overline{D/A_6}$ sourcing twice as much current (when on) as the device 429 coupled to $\overline{D/A_5}$. Likewise the devices 429 coupled to $\overline{D/A_5}$ is capable of sourcing twice as much current as the device 429 coupled to $\overline{D/A_4}$. This two to one current sourcing capability similarly applies to the remaining devices 429 coupled to the remaining lines $\overline{D/A_3}$–$\overline{D/A_0}$. Thus, device 429 coupled to $\overline{D/A_1}$, is likewise capable of sourcing twice as much current as the device 429 coupled to $\overline{D/A_0}$, but only one-half of that source by the device 429 coupled to $\overline{D/A_2}$. All devices 429 are connected in parallel, one side of which are preferably coupled to Vss and the other side is preferably coupled to either side of the speaker 4 via transistors 430 and 431. Transistor 430 is controlled by $\overline{D/Asn}$ which is applied to its gates; transistor 431 is turned off and on in response to D/Asn. Thus, either transistor 430 or 431 is on depending on the state of the sign bit, D/Asn. The voice coil of speaker 4 preferably has a 100 ohm impedance and has a center tap connected to Vgg, as shown in FIG. 23a. Thus, the signals on lines $\overline{D/A_6}$–$\overline{DA_0}$ control the magnitude of current flow through the voice coil while the signals on lines D/Asn and $\overline{D/Asn}$ control the direction of that flow.

Figure 23B:
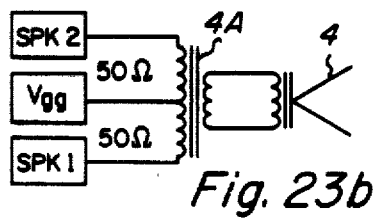

Alternatively to using a center-topped 100 ohm voice coil, a more conventional eight ohm speaker may be used along with a transformer having a 100 ohm center topped primary (connected to Vgg and transistors 430 and 431) and an eight ohm secondary (connected to the speaker's terminals), as shown in FIG. 23b.

It should now be appreciated by those skilled in the art that D/A converter 426 not only converts digital sign magnitude information on lines $D/A_6$–$D/A_0$ and D/Asn–$\overline{D/Asn}$ to an analog signal, but has effectively amplified this analog signal to sufficient levels to permit a speaker to be driven directly from the MOS synthesis chip 10 (or via the aforementioned transformer, if desired). Of course, those skilled in the art will appreciate that simple D/A converters, such as that disclosed here, will find use in other applications in addition to speech synthesis circuits.

THE SPEECH SYNTHESIZER CHIP

Figure 22:
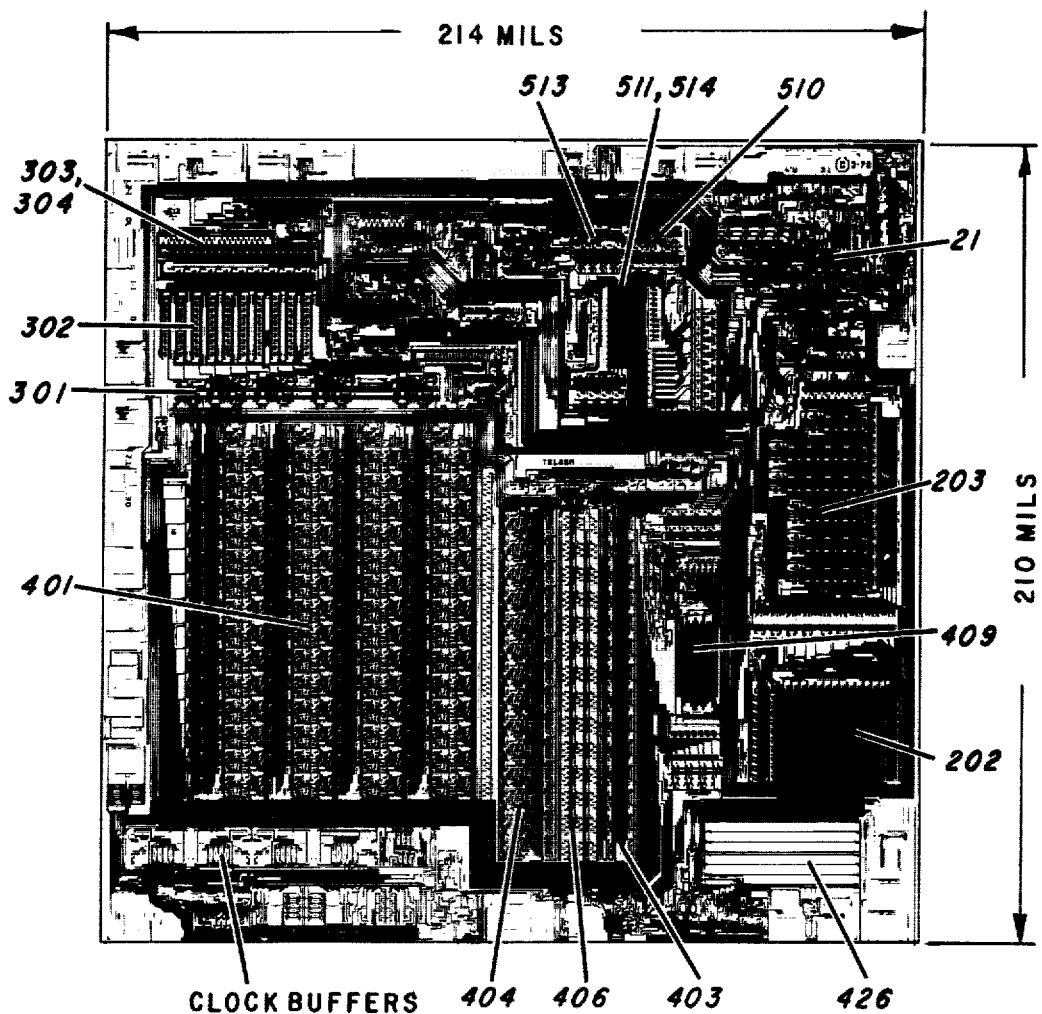
FIG. 22 is a plan view of the synthesizer chip herein described, showing the metal mask or metal pattern, enlarged about fifty times.

In FIG. 22 a greatly enlarged plan view of a semiconductor chip which contains the entire system of FIGS. 4a and 4b is illustrated. The chip is only about two hundred fifteen mils (about 0.215 inches) on a side. In the example shown, the chip is manufactured by the P-channel metal gate process using the following design rules: metal line width 0.25 mil; metal line spacing 0.25 mil; diffusion line width 0.15 mil; and diffusion line spacing 0.30 mil. Of course, as design rules are tightened with the advent of electron beam mask production or slice writing, and other techniques, it will be possible to further reduce the size of the synthesizer chip. The size of the synthesizer chip can, of course also be reduced by not taking advantage of some of the features preferably used on the synthesizer chip.

The total active area of speech synthesizer chip 10 is approximately 45,000 square mils.

It will also be appreciated by those skilled in the art, that other MOS manufacturing techniques, such as N-channel, complementary MOS (CMOS) or silicon gate processes may alternatively be used.

The various parts of the system are labeled with the same reference numerals previously used in this description.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking learning aid described herein.

The microprocessor of U.S. Pat. No. 4,074,355 is an improved version of an earlier microprocessor described in U.S. Pat. No. 3,991,305. One of the improvements concerned the elimination of digit driver devices so that arrays of light emitting diodes (LED's) forming a display could be driven directly from the microprocessor. As a matter of design choice, the display used with this learning aid is preferably a vacuum fluorescent (VF) display device. Those skilled in the art will appreciate that when LED's are directly driven, the display segments are preferably sequentially actuated while the display's common character position electrodes are selectively actuated according to information in a display register or memory. When VF displays are utilized, on the other hand, the common character position electrodes are preferably sequentially actuated while the segments are selectively actuated according to information in the display register or memory. Thus, the microprocessor of U.S. Pat. No. 4,074,355 is preferably altered to utilize digit scan similar to that used in U.S. Pat. No. 3,991,305.

The microprocessor of U.S. Pat. No. 4,074,355 is a four bit processor and to process alphanumeric information, additional bits are required. By using six bits, which can represent $2^6$ or 64 unique codes, the twenty-six characters of the alphabet, ten numerals as well as several special characters can be handled with ease. In lieu of converting the microprocessor of U.S. Pat. No. 4,074,355 directly to a six bit processor, it was accomplished indirectly by software pairing the four bit words into eight bit bytes and transmitting six of those bits to the display decoder.

Figure 15A:
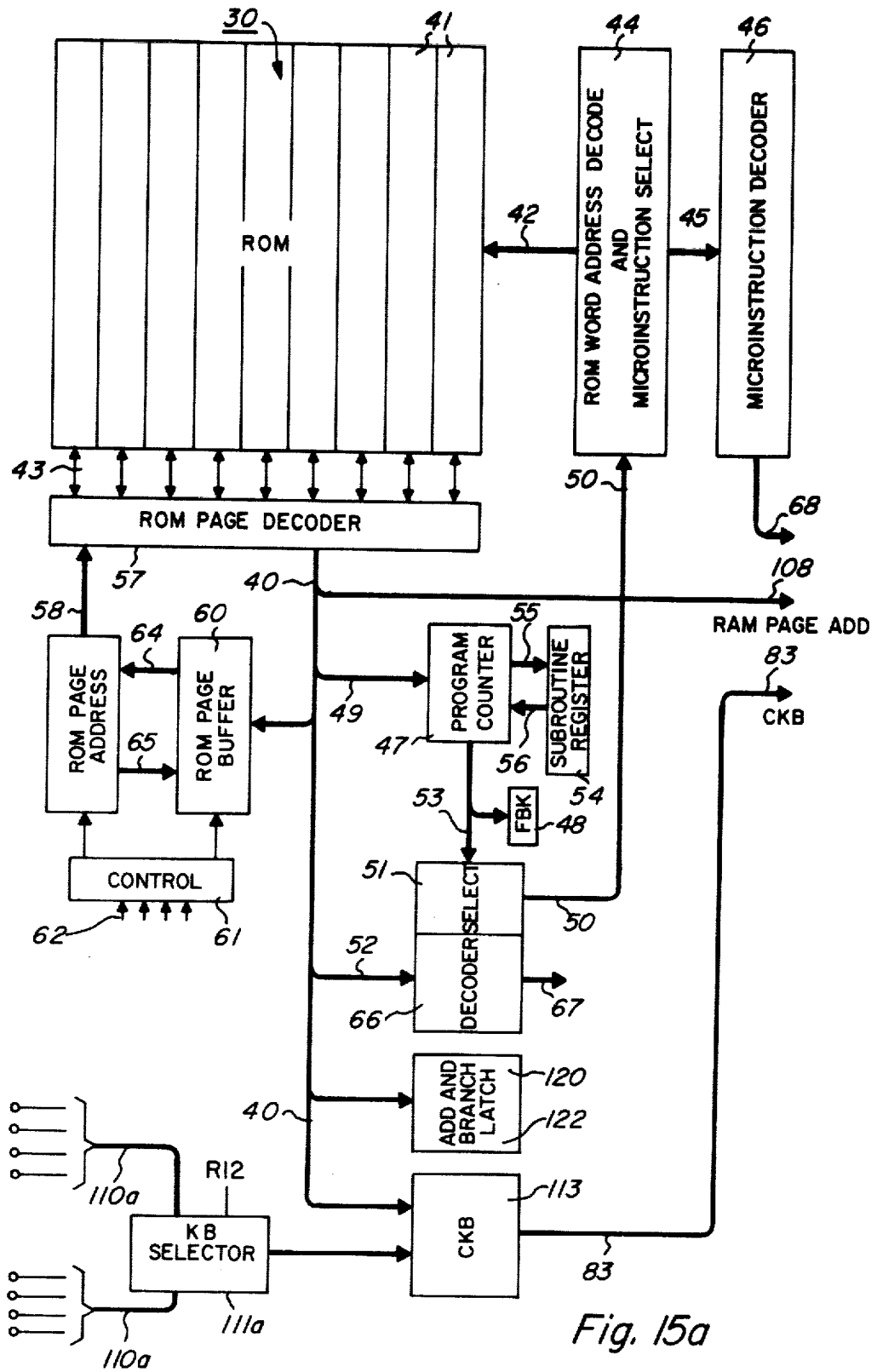
FIGS. 15a–15b form a composite block diagram of a microprocessor which may be utilized as the controller.
Figure 15B:
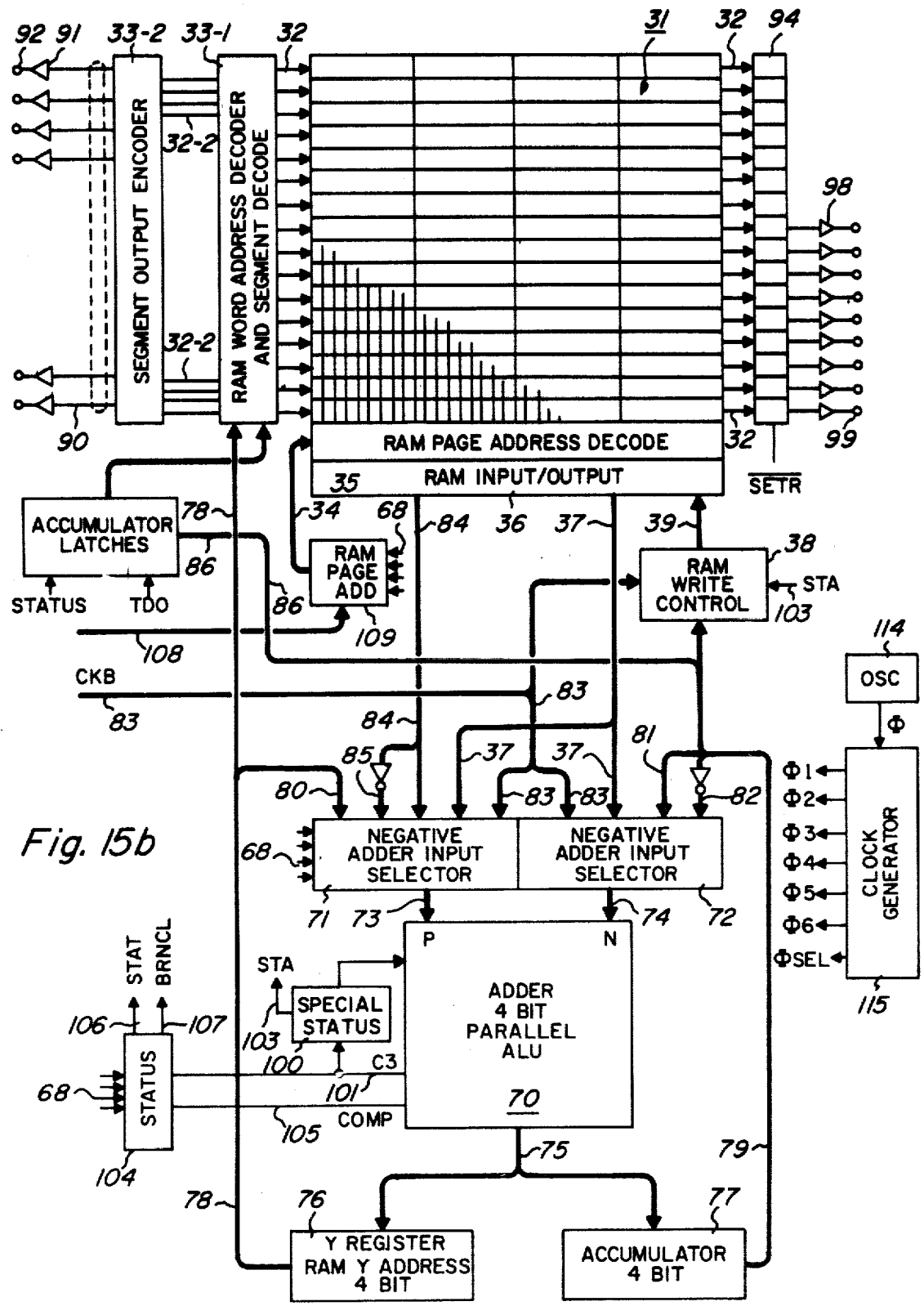

Referring now to FIGS. 15a-15b, which form a composite block diagram of the microprocessor preferably used in the learning aid, it should be appreciated that this block diagram generally corresponds with the block diagram of FIGS. 7a and 7b of U.S. Pat. No. 4,074,355; several modifications to provide the aforementioned features of six bit operation and VF display compatability are also shown. The numbering shown in FIGS. 15a and 15b generally agrees with that of U.S. Pat. No. 4,074,355. The modifications will now be described in detail.

Figure 13C:
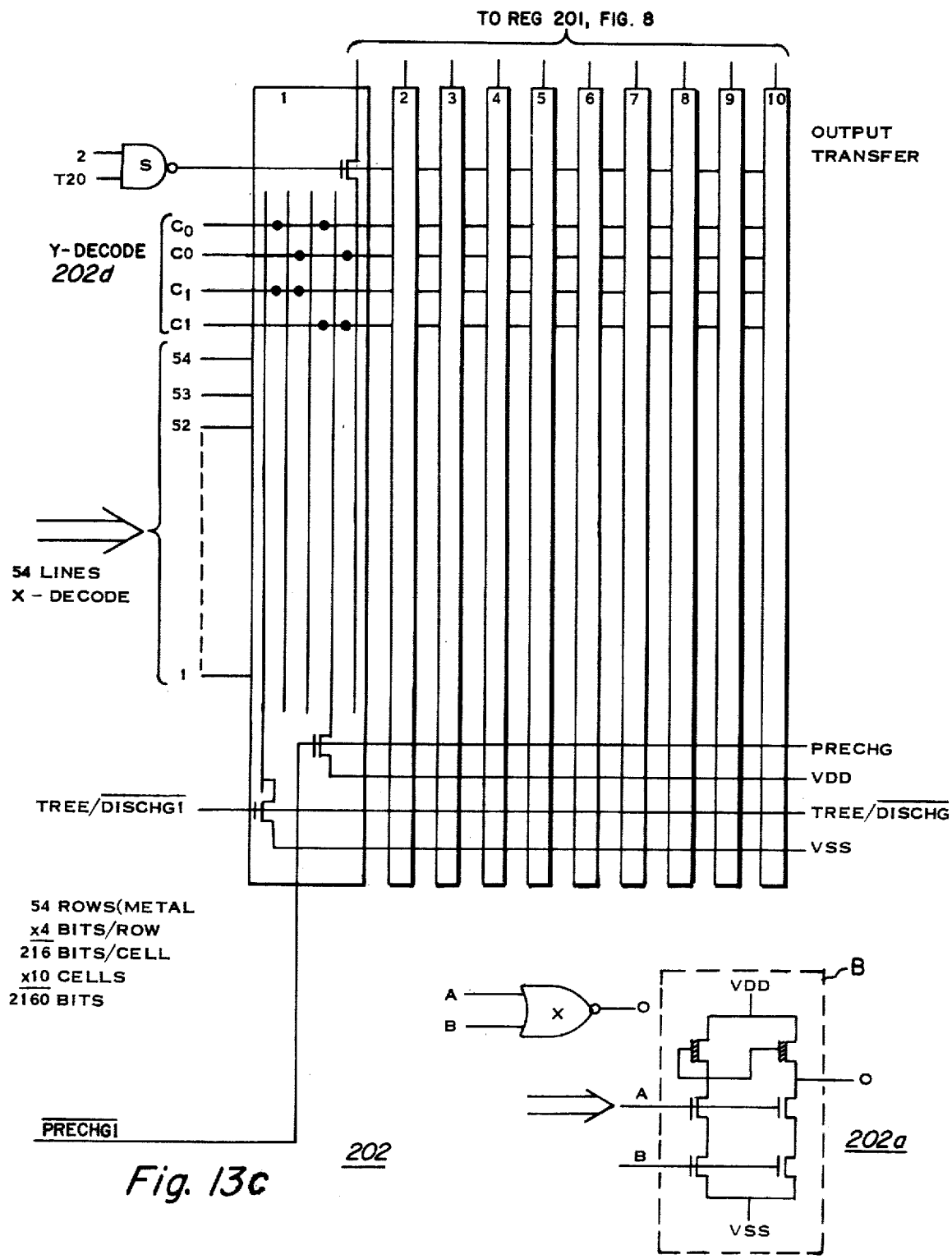
Figure 16A:
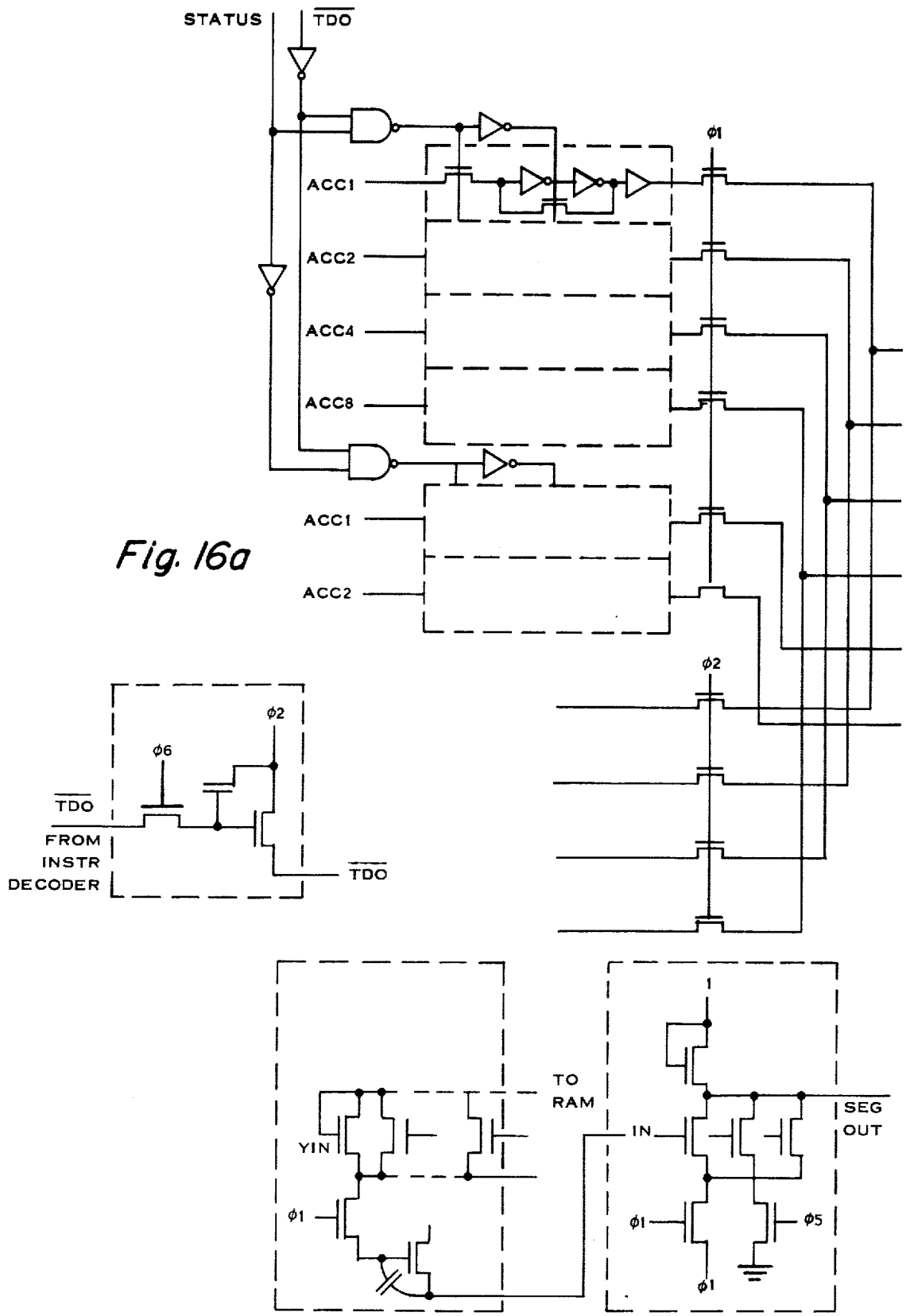
FIGS. 16a–c form a composite logic diagram of the segment decoder of the microprocessor.
Figure 16B:
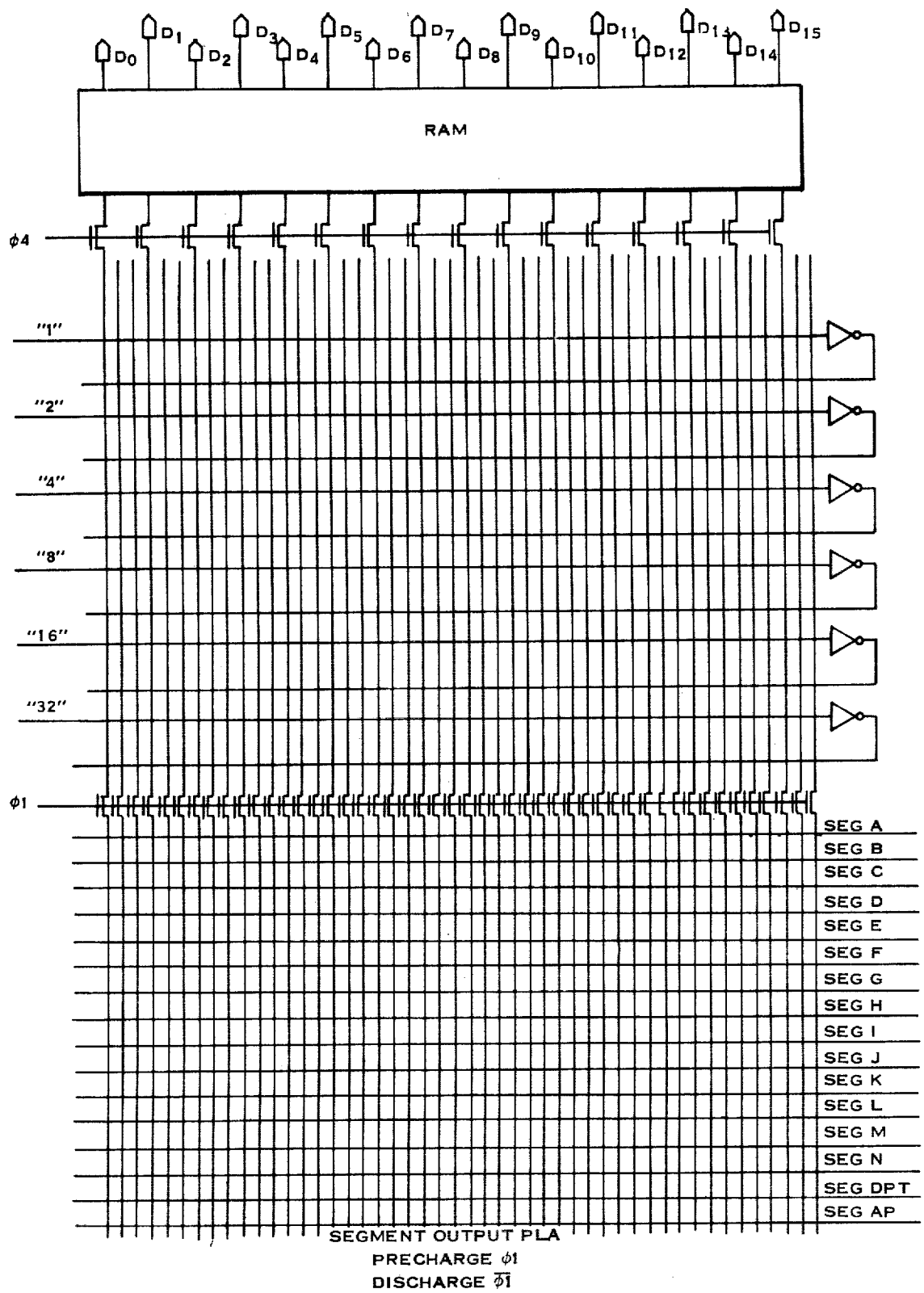
Figure 16C:
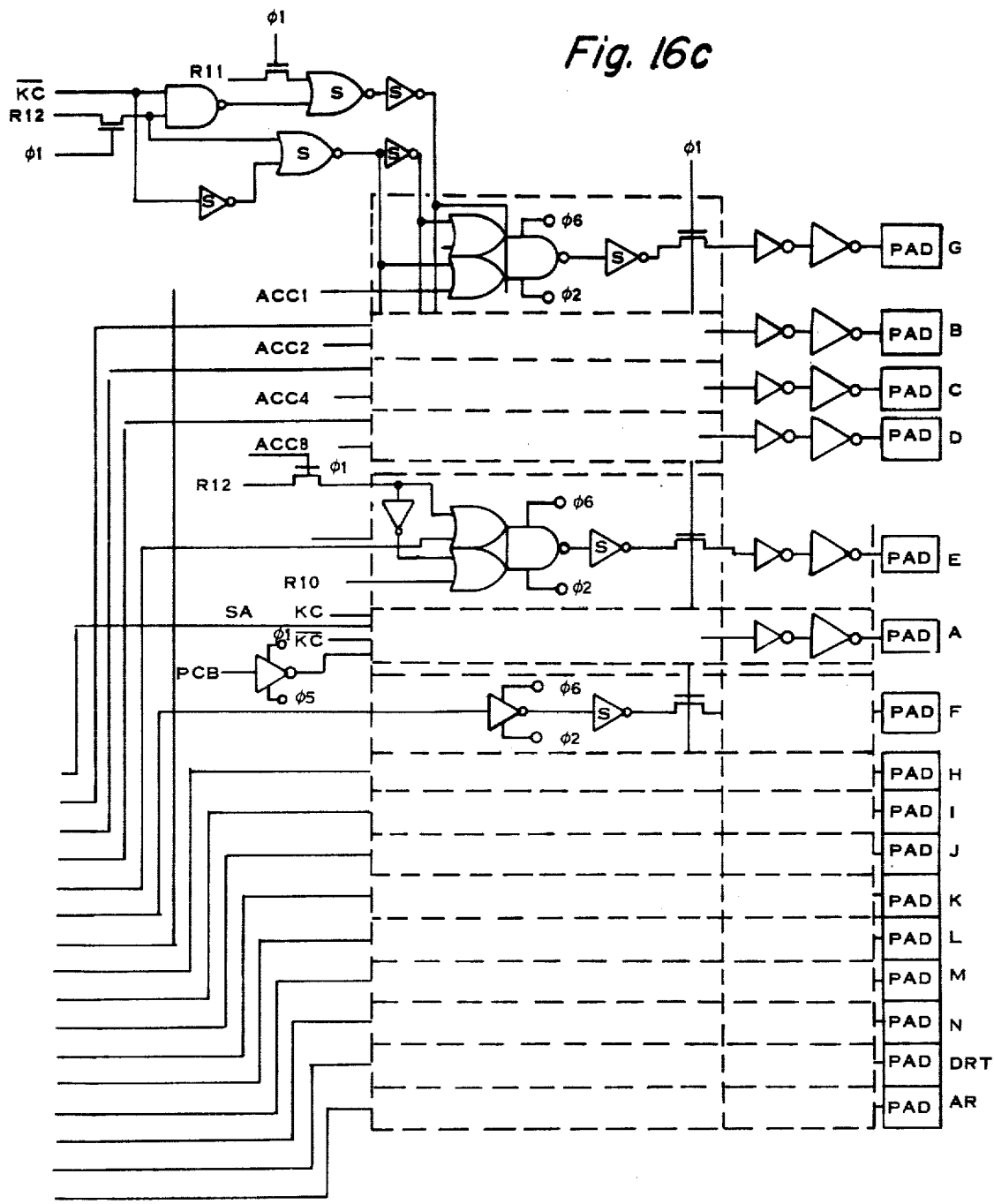

Referring now to the composite diagram formed by FIGS. 16a-16b, which replace FIG. 13 of U.S. Pat. No. 4,074,355, there can be seen the segment decoder and RAM address decoder 33-1 which decodes RAMY for addressing RAM 31 or ACC1-ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TD0 instruction when status is a logical zero. Then the six bits in latches 87-1 through 87-32 is decoded in decoder 33-1. Segment drivers 91 may preferably be of one of three types, 91A, 91B or 91C as shown on FIGS. 16a-16b. The 91A type drivers permits the data on ACC1-ACC8 to be communicated externally via pins SEG G, SEG B, SEG C and SEG D. The 91B type driver coupled to pin SEG E permits the contents of digit register 94-10 to be communicated externally when digit register 94-12 is set. The 91B type driver coupled to pin SEG A permits the contents of the program counter to be outputted during test operations.

Figure 17:
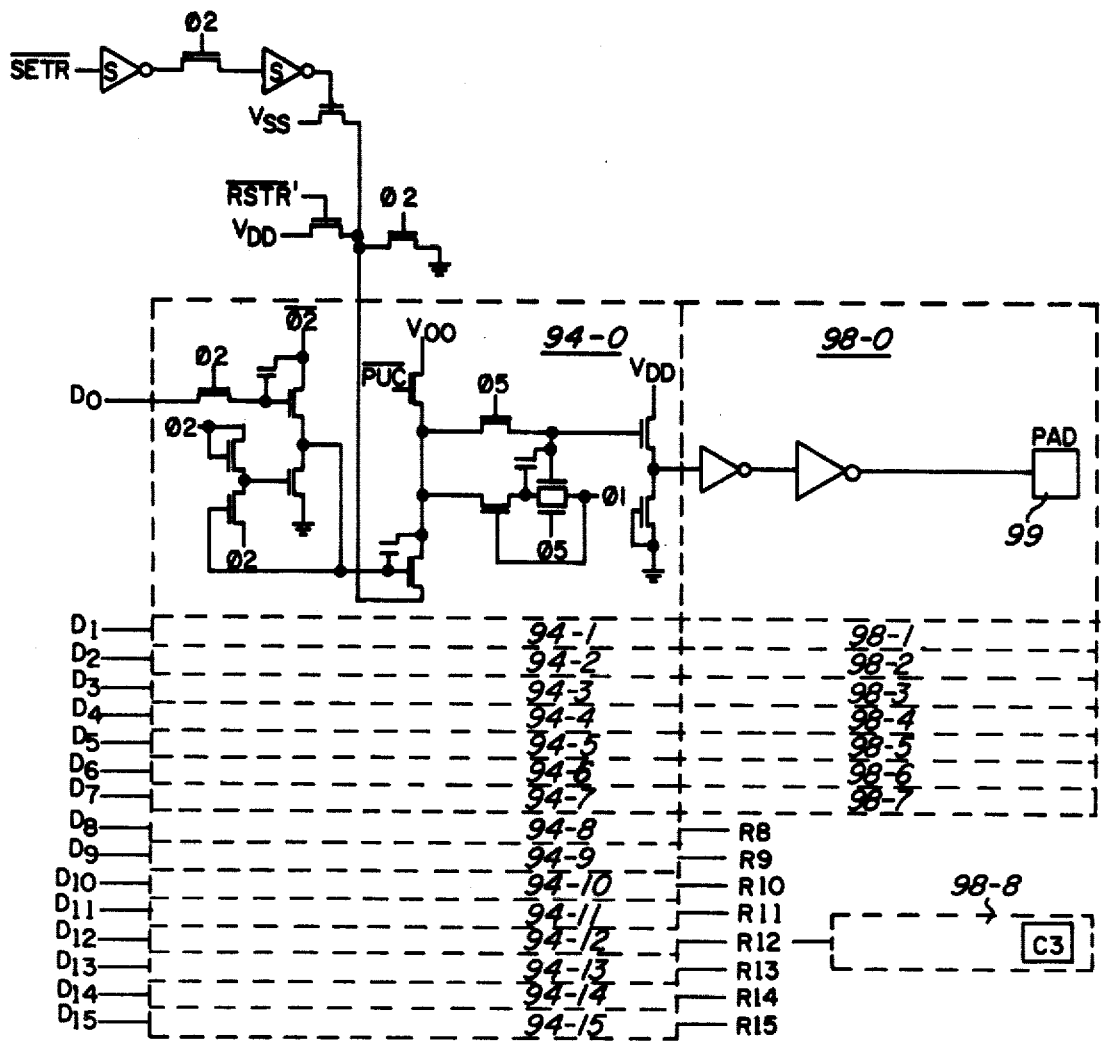
FIG. 17 depicts the digit output buffers and digit registers of the microprocessor.

The digit buffers registers and TD0 latches of FIG. 14 of U.S. Pat. No. 4,074,355 are also preferably replaced with the digit buffers registers of FIG. 17 herein inasmuch as (1) the DDIG signal is no longer used and (2) the digit latches (elements 97 in U.S. Pat. No. 4,074,355) are no longer used. For simplicity's sake, only one of the digit output buffer registers 94 is shown in detail. Further, since in this embodiment of the learning aid, display 2 preferably has eight character positions, eight output buffers 98-0 through 98-7 connect $D_0$-$D_7$ to the common electrodes of display 2 via registers 94-0 through 94-7 are shown in FIG. 17. An additional output buffer 98-8 communicates the contents of registers 94-12, which is the chip select signal, to synthesizer 10.

To facilitate bi-directional communication with synthesizer 10, the microprocessor of U.S. Pat. No. 4,074,355 is preferably modified to permit bi-directional communication on pins SEG G, SEG B, SEG C and SEG D. Thus, in FIG. 18, these SEG pins are coupled to the normal K lines, 112-1 through 112-8, via an input selector 111a for inputting information when digit registers 94-12 (R12) is set. Further, these pins are also coupled to ACC1-ACC8 via segment drivers 91A when digit registers 94-12 (R12) and 94-11 (R11) are set for outputting information in accumulator 77.

Figure 18:
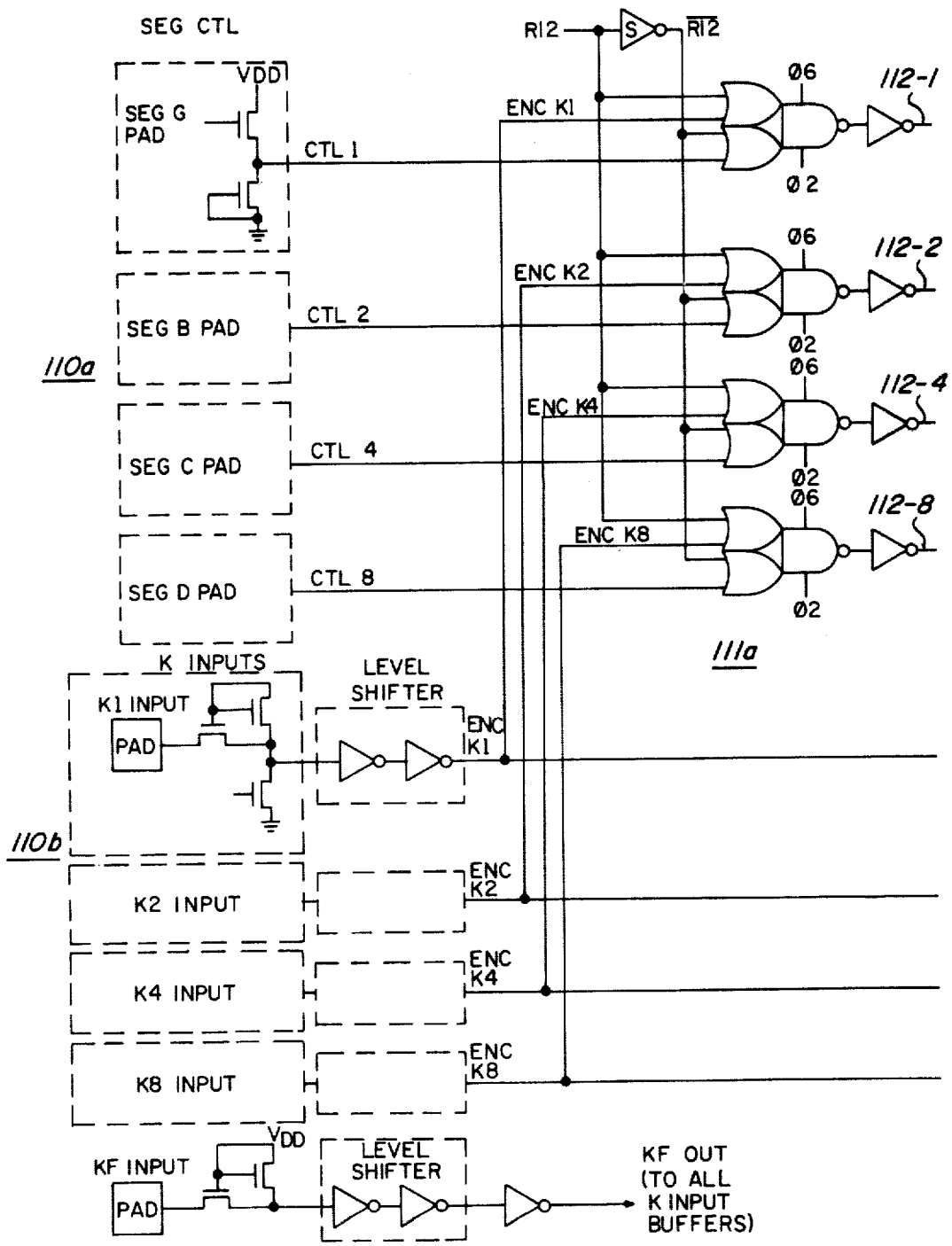
FIG. 18 depicts the KB selector circuit of the microprocessor.

Thus, when digit latch 94-12 (which communicates the chip select signal externally) is set, SEG E is coupled to R10 (digit registers 94-10) for communicating the PDC signal to synthesizer 10. Also, ACC1-ACC8 is outputted on SEG G and SEG B-SEG D, during the time R12 and R11 are set. When R11 is a logical 0, i.e., is reset, segment drivers 91A are turned off and data may be read into CKB circuit 113 for receiving data from ROMs 12a-12b via synthesizer 10, for instance. FIG. 18 replaces the keyboard circuit 111 shown in FIG. 22 of U.S. Pat. No. 4,064,554.

Preferably, pins SEG G and SEG B-SEG D are coupled to CTL1-CTL8 pins of synthesizer 10, while pin SEG E is coupled to the PDC pin of synthesizer 10.

In Table IX (which comprises Tables 0 through IX-15) is listed the set of instructions which may be stored in the main Read-Only-Memory 30 of FIGS. 15a–15b to provide controller 11. Referring now to Table IX, there are several columns of data which are, reading from left to right: PC (Program Counter), INST (Instruction), BRLN (Branch Line), Line and Source Statement (which includes Name, Title and Comments). In U.S. Pat. No. 4,074,355, it can be seen that main Read-Only-Memory 30 is addresed with a seven bit address in program counter 47 and a four bit address in a buffer 60. The address in buffer 60 is referred to as a page address in the main Read-Only-Memory. The instructions listed on Table IX-0 correspond to page zero in the microprocessor while the instructions listed in Table IX-1 are those on page one and so forth through to the instructions in Table IX-15 which are stored on page fifteen in the microprocessor.

The program counteer 47 of the aforementioned microprocessor is comprised of a feedback shift register and therefore counts in a pseudorandom fashion, thus the addresses in the left-hand column of Table IX, which are expressed as a hexadecimal number, exhibit such pseudorandomness. If the instruction starting at page zero were read out sequentially from the starting position in the program counter (00) then the instructions would be read out in the order shown in Table IX. In the "Line" column is listed a sequentially increasing decimal number associated with each source statement and its instruction and program counter address as well as those lines in which only comments appear. The line number starts at line 55 merely for reasons of convenience not important here. When an instruction requiring either a branch or call is to be performed, the address to which the program counter will jump and the page number to which the buffer will jump, if required, is reflected by the binary code comprising the instruction or instructions performing the branch or call. For sake of convenience, however, the branch line column indicates the line number in Table IX to which the branch or call will be made. For example, the instruction on line 59 (page 0, Program Counter Address 0F) is a branch instruction, with a branch address of 1010111 (57 in hexadecimal). To facilitate finding the 57 address in the program counter, the branch line column directs the reader to line 80, where the 57 address is located.

READ-ONLY-MEMORY LOGIC DIAGRAMS

Figure 19:
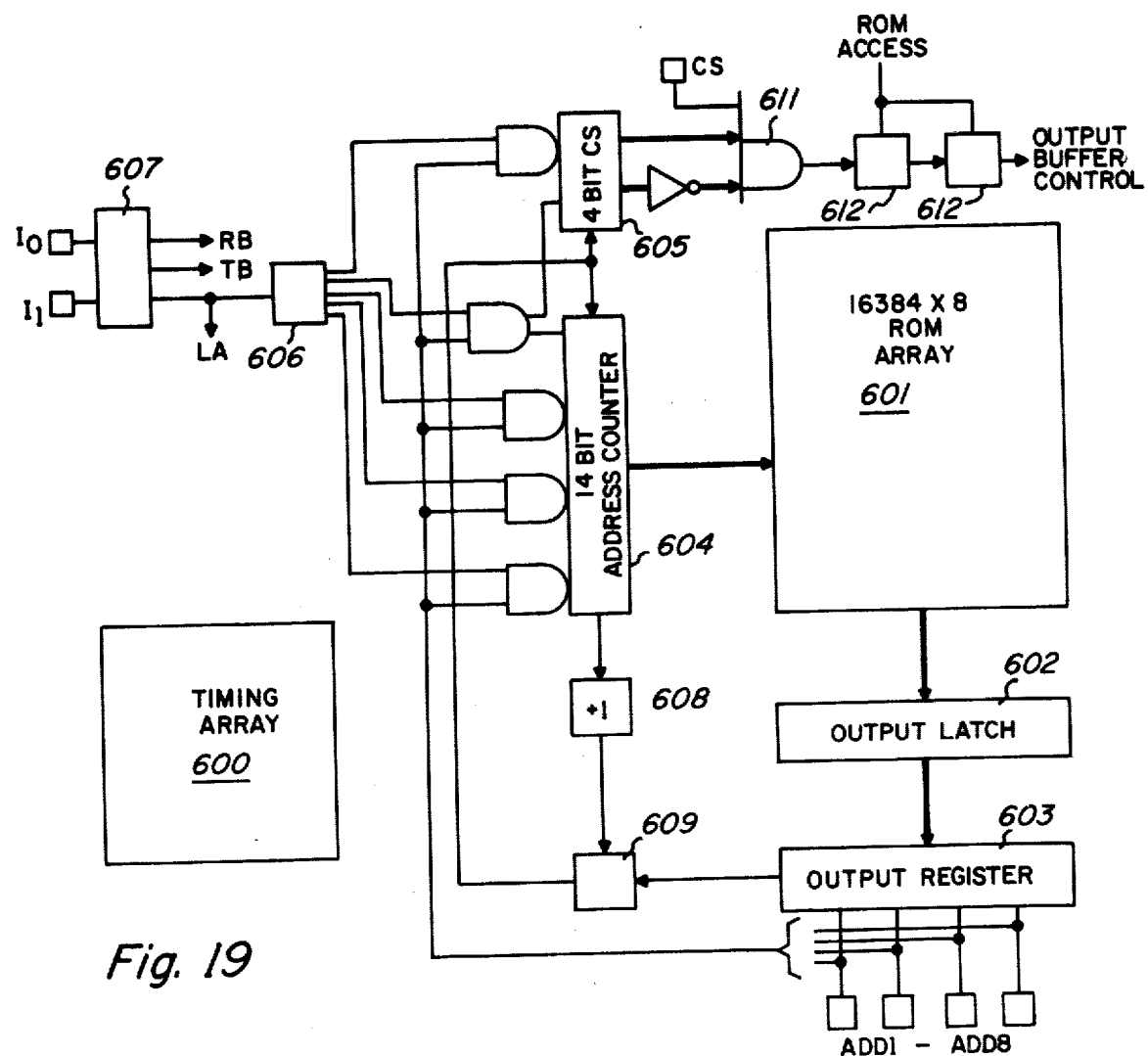
FIG. 19 is a block diagram of ROM's 12a, 12b, 13a or 13b.
Figure 20A:
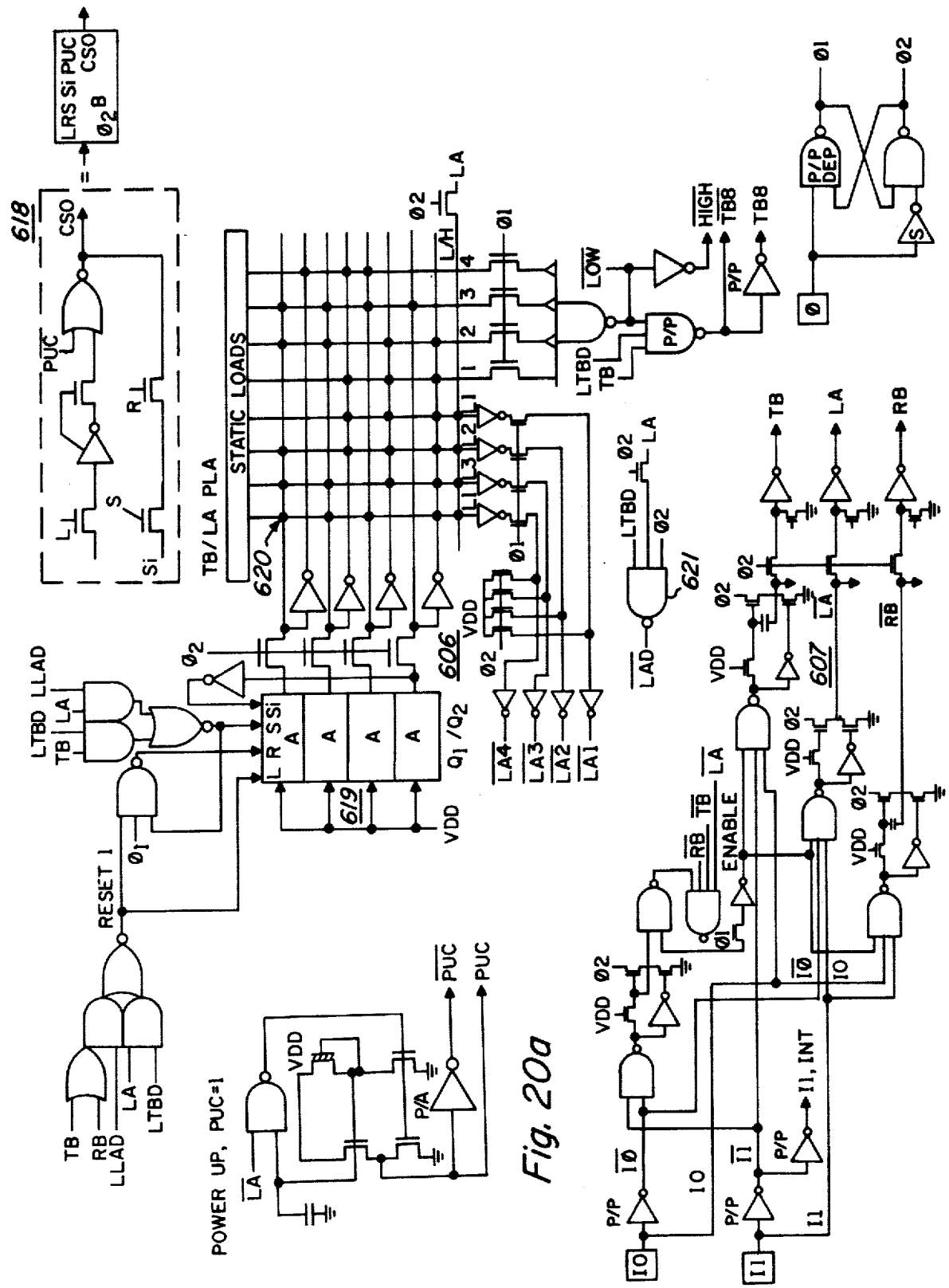
Figure 20B:
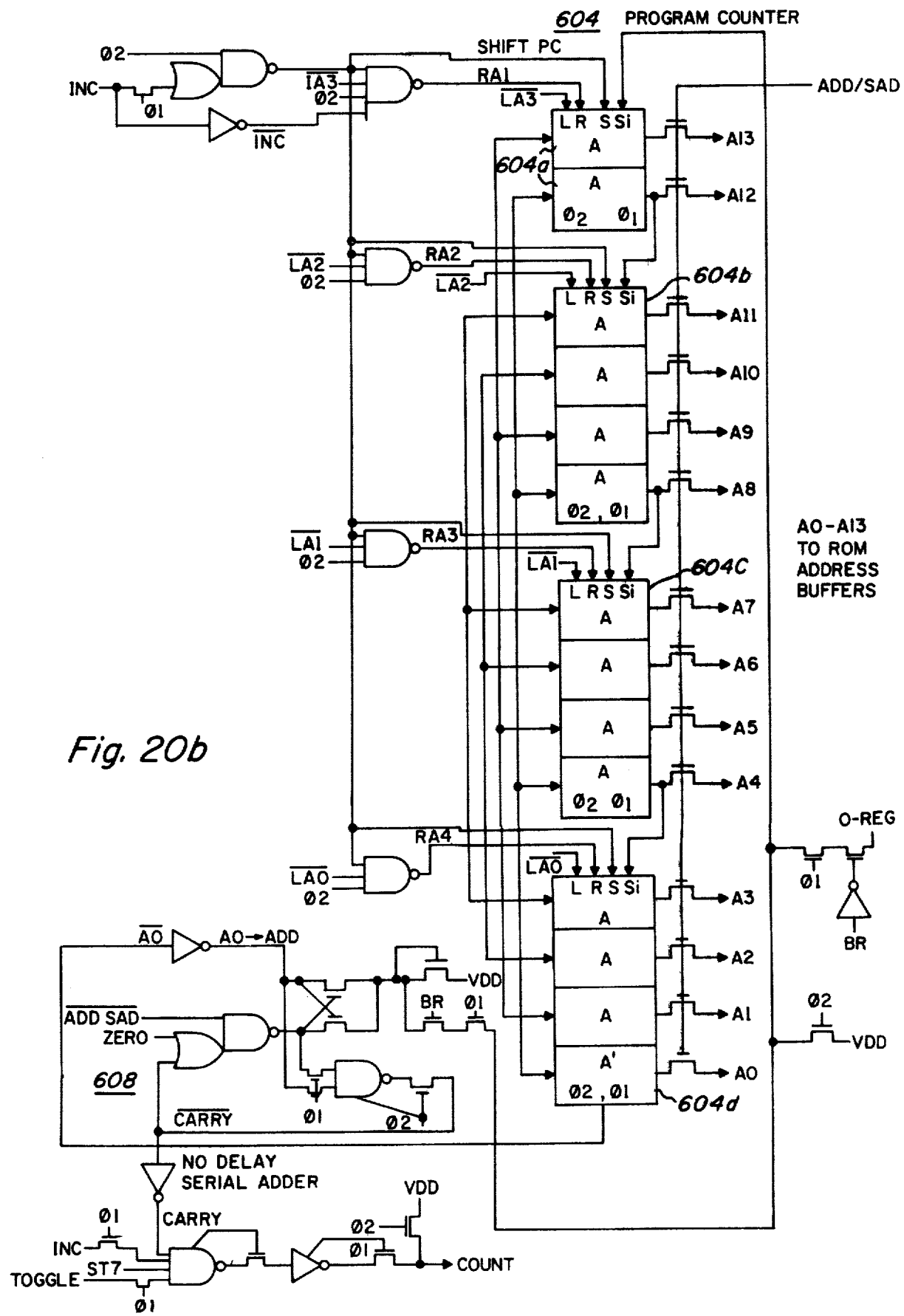
Figure 20C:
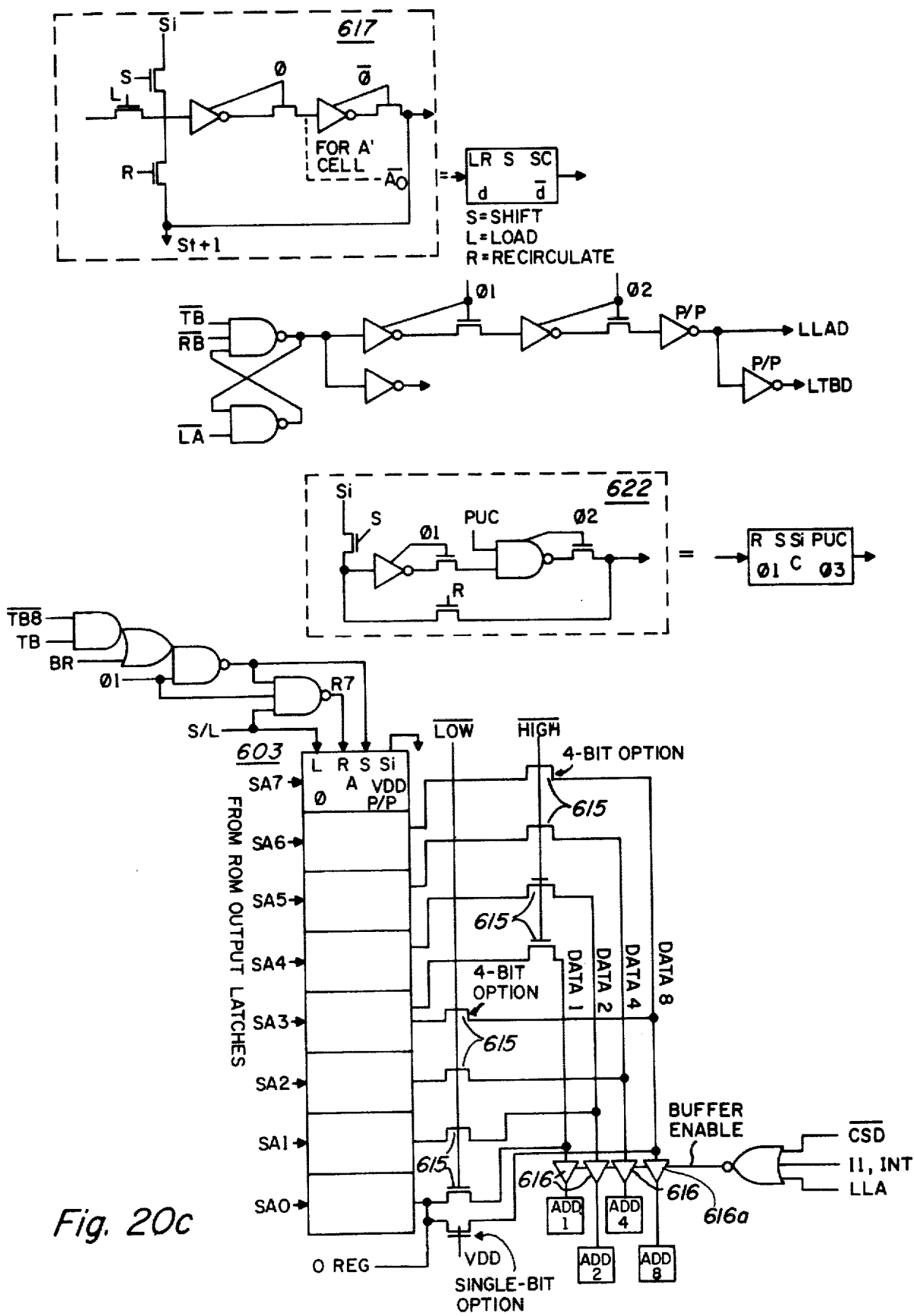
Figure 20D:
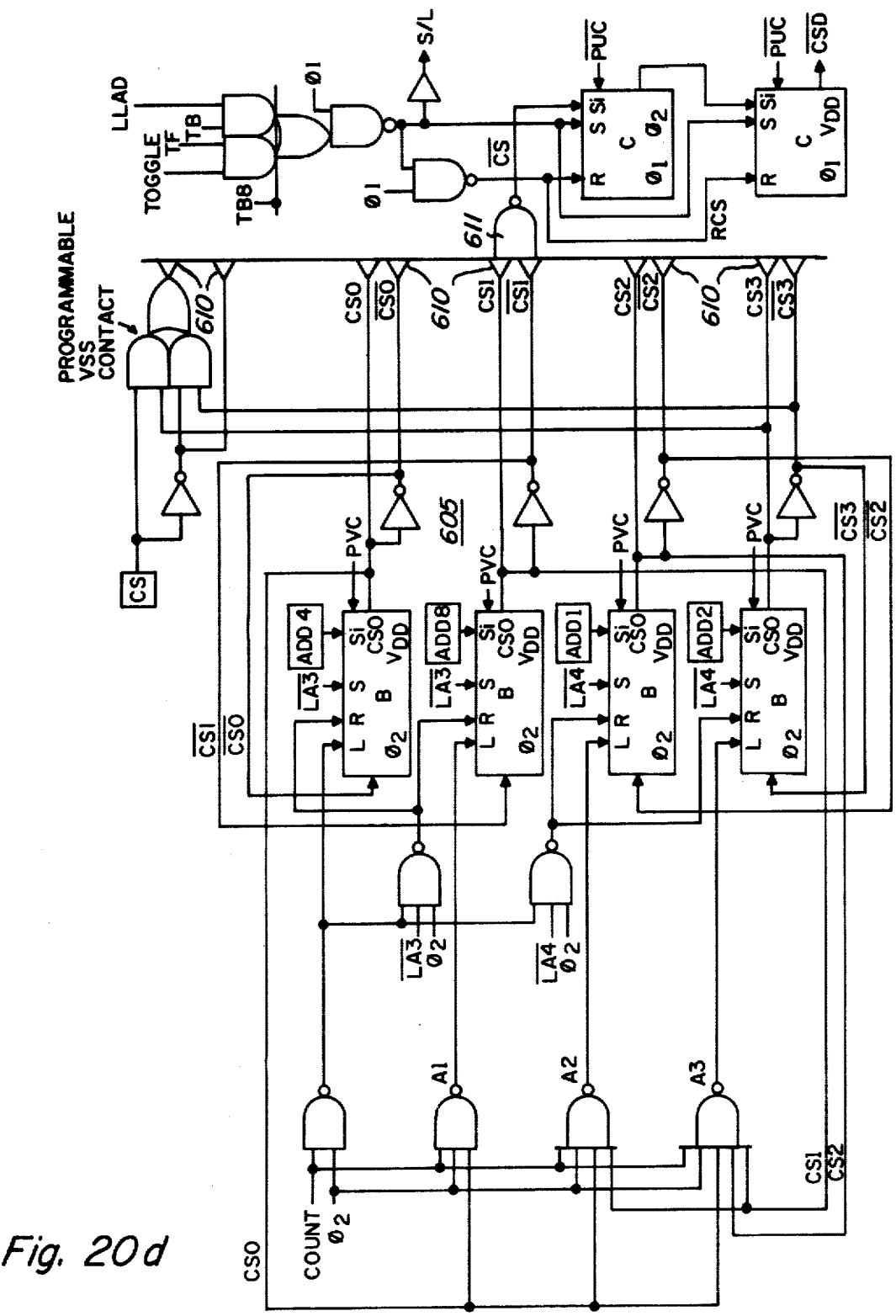
Figure 20F:
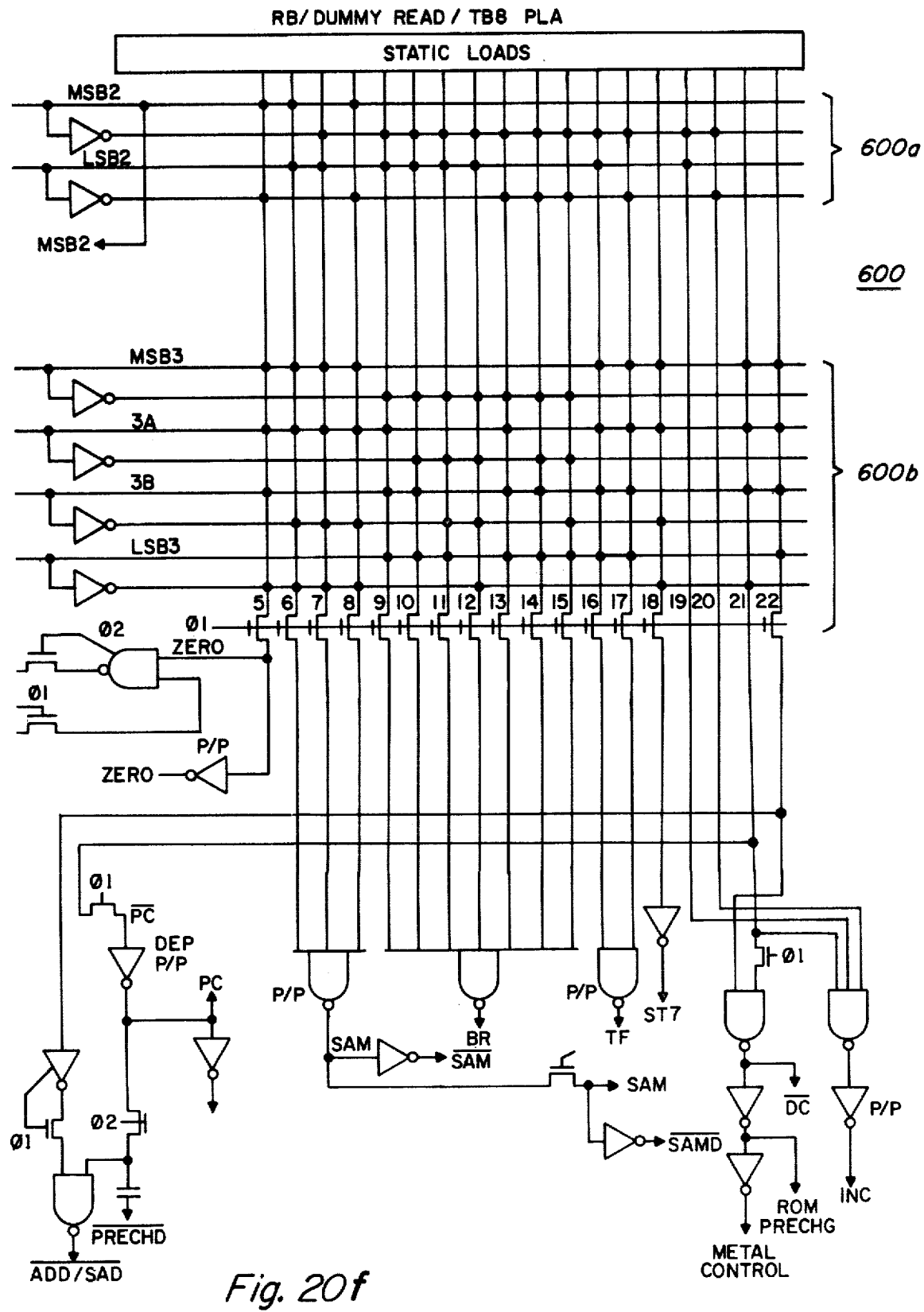

Read-Only-Memories 12a or 12b or 13a or 13b are shown in FIGS. 19, 20a, 20b, 21a and 21b. FIG. 19 is a block diagram of any one of these ROMs. FIGS. 20a and 20b form a composite logic diagram of the control logic for the ROMs while FIGS. 20a and 20b form a composite logic diagram of the X and Y address decoders and pictorially show the array of memory cells.

Referring now to FIG. 19, the RAM array 601 is arranged with eight output lines, one output line from each section of 16,384 bits. The eight output lines from ROM array 601 are connected via an output latch 602 to an eight bit output register 603. The output register 603 is interconnected with pins ADD1-ADD8 and arranged either to communicate the four high or low order bits from output register 603 via the four pins ADD1-ADD8 or alternatively to communicate the bit serially from output register 603 via pin ADD1 The particular alternative used may be selective according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1-ADD8 in response to a decoded Load Address (LA) command. The first LA command loads the four least significant bits in address counter 604 (bits $A_0$–$A_3$), and subsequent LA commands load the higher order bits, ($A_4$–$A_7$, $A_8$–$A_{11}$ and $A_{12}$–$A_{13}$). During the fourth LA cycle the $A_{12}$ and $A_{13}$ bits are loaded at the same time the CS0 and CS1 bits in chip select count 605 are loaded. Upon the fifth LA command the two most significant bits in chip select counter 605 are loaded from ADD1 and ADD2. A counter 606 counts consecutively received LA commands for indicating where the four bits on ADD-1-ADD8 are to be inputted into counters 604 and/or 605.

Commands are sent to the ROM chip via $I_0$ and $I_1$ pins to a decoder 607 which outputs the LA command a TB (transfer bit) and a RB (read and branch) command.

Address register 604 and chip select register 605 have an add-one circuit 608 associated therewith for incrementing the address contained therein. When a carry occurs outside the fourteen bit number stored in address register 604 the carry is carried into shift select register 605 which may enable the chip select function if not previously enabled or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1-ADD8. The delay imposed by delay circuits 612 effect the two byte delay in this embodiment, because the address information inputted on pins ADD1-ADD8 leads the data outputted in response thereto by the time to require to access ROM aray 601. The CS pin is preferably used in the embodiment of the learning aid disclosed herein.

A timing PLA 600 is used for timing the control signals outputted to ROM array 601 as well as the timing of other control signals.

Referring now to the composite drawing formed by FIGS. 20a and 20b, output register 603 is formed by eight "A" bit latches, an exemplary one of which is shown at 617. The output of register 603 is connected in parallel via a four bit path controlled on $\overline{LOW}$ or $\overline{HIGH}$ signals to output buffers 616 for ADD1-ADD4 and 616a for ADD8. Buffers 616 and 616a are shown in detail on FIGS. 21a–21b.

Gates 615 which control the transferring of the parallel outputs from register 603 via in response to $\overline{\text{LOW}}$ and $\overline{\text{HIGH}}$ are preferably mask level programmble gates which are preferably not programmed when this chip is used with the learning aid described herein. Rather the data in register 603 is communicated serially via programmable gate 614 to buffer 616a and pin ADD8. The bits outputted to ADD1-ADD8 in response to a $\overline{\text{HIGH}}$ signal are driven from the third through sixth bits in register 603 rather that the fourth through seventh bits inasmuch as a serial shift will normally be accomplished between a $\overline{\text{LOW}}$ and $\overline{\text{HIGH}}$ signal.

Address register 604 comprises fourteen of the bit latches shown at 617. The address in address 604 on lines $A_0$-$A_{13}$ is communicated to the ROM X and Y address buffers shown on FIG. 21a-21b. Register 604 is divided into four sections 601a-601d, the 601d section loading four bits from ADD1-ADD8 in response an $\overline{\text{LA0}}$ signal, the 601c section loading four bits from ADD1-ADD8 in response to an $\overline{\text{LA1}}$ signal and likewise for section 601b in response to an $\overline{\text{LA2}}$ signal. Section 601a is two bits in length and loads the ADD1 and ADD2 bits in response to an $\overline{\text{LA2}}$ signal. The chip select register 605 comprise four B type bit latches of the type shown at 618. The low order bits, CS0 and CS1 are loaded from ADD4 and ADD8 in response to an $\overline{\text{LA3}}$ signal while the high order bits CS2 and CS3 are loaded from ADD1 and ADD2 on an $\overline{\text{LA4}}$ signal. The $\overline{\text{LA0}}$-$\overline{\text{LA4}}$ signals are generated by counter 606. Counter 606 includes a four bit register 619 comprised of four A bit latches 617. The output of the four bit counter 619 is applied to a PLA 620 for decoding the $\overline{\text{LA1}}$-$\overline{\text{LA4}}$ signals. The $\overline{\text{LA0}}$ signal is generated by a NAND gate 621. As can be seen, the $\overline{\text{LA0}}$ signal comes up in response to an LA signal being decoded immediately after a TB signal. The gate 621 looks for a logical one on the LA signal and a logical one on an LTBD (latched transer bit delay) signal from latch 622. Decoder 607 decodes the $I_0$ and $I_1$ signals applied to pins $I_0$ and $I_1$ for decoding the TB, LA and RB control signals. The signals on the $I_0$ and $I_1$ pins are set out in Table X. Latch circuit 622 is responsive to LA, RB and TB for indicating whether the previously received instruction was either an LA or a TB or RB command.

In addition to counting successive LA commands, four bit counter 609 and PLA 620 are used to count successive TB commands. This is done because in this embodiment each TB command transfers one bit from register 603 on pin ADD8 to the synthesizer chip 10 and output register 603 is loaded once each eight successive TB commands. Thus, PLA 620 also generates a TB8 command for initiating a ROM array addressing sequence. The timing sequence of counter 619 and PLA 620 are set forth in Table XI. Of course, the $\overline{\text{LA1}}$-$\overline{\text{LA4}}$ signal is only generated responsive to successive LA commands while the TB8 signals only generate in response to successive TB commands.

Figure 21A:
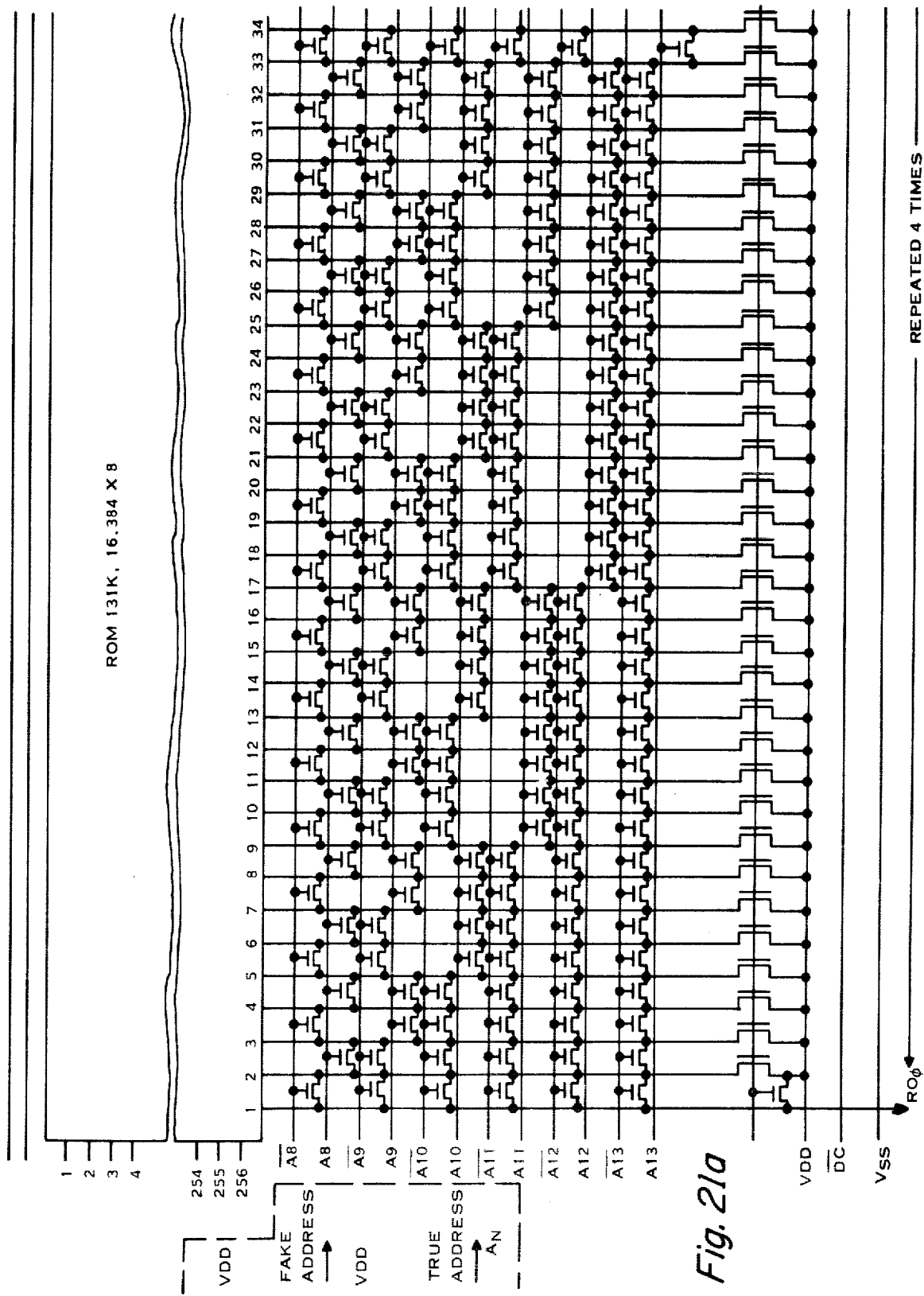

Add-one circuits 608 increments the number in program counter 604 in response to a TB cmmand or an RB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to gate 611 or compared with the contents of CS3. Thus, gate 611 can test for either (1) the state of the CS signal, (2) a specific count in counter 605 or (3) a comparison between the state on the chip select and the state of CS3 or (4) some combination of the foregoing, as may be controlled by those knowledgeable in the art according to how programmable links 610 are progrmmed during chip manufacture. The output of gate 611 is applied via two bit latches of the C type, which are shown at 622. Timing array 600 controls the timing of ROM sequencing during RB and TB sequences. Array 600 includes PLA sections 600a and 600b and counters 623 and 624. Counter 623 is a two bit counter comprising two A type bit latches shown at 617. Counter 63 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The timing sequence for a TB command is shown in Table XI which depicts the states in counter 623 and 624 in the signals generated in response thereto. A similar timing sequence for an RB command is shown in Table XIII. The various signals generated by PLA 600a and 600b will now be briefly described. The BR signal controls the transfer of two serial bits from the output register 603 to the program counter 604. The TF signal controls the transfer of eight bits from the sense amp latch 602 (FIG. 21-21b) to output register 603 on lines SA0-SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. SAM gates the data outputted from the ROM into the sense amp latch 602 while SAD gates the address lines by gating the address from the program counter into the ROM address buffers 625 (FIGS. 21a-21b).

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

THE FOLLOWING SEQUENCE IS AN EXAMPLE OF THE LEARNING AID IN THE SPELLING MODE.

| KEY | DISPLAY | SPEAKER |
|---|---|---|
| COMPUSPELL | | 4 RANDOM TONES |
|  | SPELL A | |
| B | SPELL B | B |
| C | SPELL C | C |
| D | SPELL D | D |
| P | SPELL D | P |
| A | SPELL A | A |
| GO | — | SPELL DO AS IN DO NOT |
| D | D— | D |
| O | DO— | O |
| ENTER | DO | THAT IS CORRECT, NOW SPELL |
|  | — | WAS |
| W | W— | W |
| U | WU— | U |
| S | WUS— | S |
| ERASE | — | |
| W | W— | W |
| A | WA— | A |
| S | WAS— | S |
| ENTER | WAS | THAT IS RIGHT, NEXT SPELL |
|  | — | ANY |
| A | A— | A |
| N | AN— | N |
| I | ANI— | I |
| ENTER | ANI | TRY AGAIN, |
|  | — | ANY |
|  | — | |
| REPEAT | — | ANY |
| REPEAT | — | ANY (½ SPEED) |
| E | E— | E |
| N | EN— | N |
| Y | ENY— | Y |
| ENTER | ENY | THAT IS INCORRECT, THE CORRECT SPELLING OF ANY IS |
|  | A | A |
|  | AN | N |
|  | ANY | Y |
|  | ANY | ANY NOW TRY |
|  | — | FULL |
| F | F— | F |
| U | FU— | U |
| L | FUL— | L |
| L | FULL— | L |
|  | FULL | THAT IS CORRECT, TRY SHOE MEANING FOOTWEAR |
|  | — | |
| S | S— | S |
| H | SH— | H |
| O | SHO— | O |
| E | SHOE— | E |
| ENTER | SHOE | YOUR ARE CORRECT, SPELL COMB |
| C | C— | C |
| O | CO— | O |
| M | COM— | M |
| E | COME— | E |
| ENTER | COME | TRY AGAIN, |
|  | — | COMB |
| C | C— | |
| O | CO— | |
| M | COM— | |
| B | COMB— | |
| ENTER | COMB | YOU ARE CORRECT, NOW SPELL FOUR AS IN THE NUMBER |
|  | — | |
| F | F— | F |
| O | FO— | O |
| U | FOU— | U |
| R | FOUR— | R |
| ENTER | FOUR | THAT IS CORRECT, NEXT SPELL WHO |
|  | — | |
| W | W— | W |

TABLE I-continued

THE FOLLOWING SEQUENCE IS AN EXAMPLE OF THE LEARNING AID IN THE SPELLING MODE.

| KEY | DISPLAY | SPEAKER |
|---|---|---|
| H | WH— | H |
| O | WHO— | O |
| ENTER | WHO | YOU ARE RIGHT, |
|  | — | NOW TRY SOUP |
| S | S— | S |
| O | SO— | O |
| U | SOU— | U |
| P | SOUP— | P |
| ENTER | SOUP | THAT IS RIGHT, |
|  | — | TRY MOST |
| M | M— | M |
| O | MO— | O |
| S | MOS— | S |
| T | MOST— | T |
| ENTER | MOST | YOU ARE CORRECT |
|  | +8 −2 | 4 TONES |
|  | +8 −2 | 4 TONES |
|  | +8 −2 | HERE IS YOUR SCORE, EIGHT CORRECT, TWO DID NOT COMPUTE. |

TABLE II

LEARN MODE

| KEY | DISPLAY | SPEAKER |
|---|---|---|
|  | BUSY | (1 SECOND PAUSE) SAY IT (2 SECOND PAUSE) BUSY |
|  | MANY | (1 SECOND PAUSE) SAY IT (2 SECOND PAUSE) MANY |
|  | CARRY | (1 SECOND PAUSE) SAY IT (2 SECOND PAUSE) CARRY |
|  | YOUR | (1 SECOND PAUSE) SAY IT (2 SECOND PAUSE) YOUR |
|  | WILD | (1 SECOND PAUSE) SAY IT (2 SECOND PAUSE) WILD |
|  | LOVE | (1 SECOND PAUSE) SAY IT (2 SECOND PAUSE) LOVE |
|  | BUSH | (1 SECOND PAUSE) SAY IT (2 SECOND PAUSE) |
| REPEAT REPEAT REPEAT REPEAT | IGNORED | BUSH |
|  | EARN | (1 SECOND PAUSE) SAY IT (2 SECOND PAUSE) EARN |
|  | — | SPELL MANY |
| M | M— | M |
| A | MA— | A |
| N | MAN— | N |
| Y | MANY— | Y |
| ENTER | MANY | YOUR ARE CORRECT, |
|  | — | NOW SPELL EARN |

THE LEARNING AID CONTINUES THROUGH THE REMAINING 9 WORDS AS IN THE SPELLING MODE.

TABLE III

IN THE WORD GUESSER MODE THE LEARNING AID RANDOMLY SELECTS A WORD FROM LEVEL C OR D AND DISPLAYS DASHES TO REPRESENT THE NUMBER OF LETTERS IN THE CHOSEN WORD. THE USER TRIES TO GUESS THE WORD. THE USER MUST COMPLETE THE WORD BEFORE MAKING SEVEN INCORRECT GUESSES. THE FOLLOWING IS AN EXAMPLE OF THE FUNCTION OF THE LEARNING AID IN THE SPELLING MODE

| KEY | DISPLAY | SPEAKER |
|---|---|---|
| HANGMAN | - - - - - - - - | 4 TONES |
| A | - - - - - - - - | |
| E | E- E- - - - E | 4 TONES |
| I | E- E- - - - E | |
| O | E- E- - O- E | 4 TONES |
| U | E- E- - O- E | |
| B | E- E- - O- E | |
| C | E- E- - O- E | |
| D | E- E- - O- E | |
| F | E- E- - O- E | |
|   | EVERYONE | 4 TONES, I WIN |
|   | - - - - - - | |
| A | - - - - - - | |
| E | - - - - - E | 4 TONES |
| I | - - - - - E | |
| O | - O- - - - E | 4 TONES |
| U | - OU- - E | 4 TONES |
| B | - OU- - E | |
| C | COU- - E | 4 TONES |
| R | COUR- E | 4 TONES |
| S | COURSE | 4 TONES |
|   | COURSE | 4 TONES, YOU WIN |

TABLE IV

The synthesizer 10 includes interpolation logics to accomplish a nearly linear interpolation of all twelve speech parameters at eight points within each frame, that is, once each 2.5 msec. The parameters are interpolated one at a time as selected by the parameter counter. The interpolation logics calculate a new value of a parameter from its present value (i.e. the value currently stored in the K-stack, pitch register or E-10 loop) and the target value stored in encoded form in RAM 203 (and decoded by ROM 202). The value computed by each interpolation is listed below.

Where
- $P_i$ is the present value of the parameter,
- $P_{i+1}$ is the new parameter value
- $P_t$ is the target value
- $N_i$ is an integer determined by the interpolation counter The values of $N_i$ for specific interpolation counts and the values $(P_i - P_o)/(P_t - P_o)$ ($P_O$ is initial parameter value) are as follows:

| INTERPOLATION COUNT | $N_i$ | $\dfrac{P_i - P_o}{P_t - P_o}$ |
|---|---|---|
| 1 | 8 | 0.125 |
| 2 | 8 | 0.234 |
| 3 | 8 | 0.330 |
| 4 | 4 | 0.498 |
| 5 | 4 | 0.623 |
| 6 | 2 | 0.717 |
| 7 | 2 | 0.859 |
| 0 | 1 | 1.000 |

TABLE V

"HELP"

ϕϕϕϕ
ϕ1 ϕϕϕϕϕϕϕ1 ϕϕ1 1 ϕ1 1 1 ϕ1 ϕϕ1 ϕ1 1 1
ϕ1 1 1 ϕϕϕϕ1
1 1 ϕ1 1 ϕϕ1 ϕϕ1 ϕϕϕϕ1 ϕ1 ϕϕ1 ϕϕϕϕ1 1 ϕϕ1 1 1 1 ϕϕϕ1 ϕ1 ϕ1 ϕϕ1 ϕ1 ϕ1 ϕ
1 1 ϕ1 1 ϕϕ1 1 1
1 1 1 ϕ1 ϕϕ1 1 1
1 1 ϕ1 1 ϕ1 ϕϕϕϕ1 1 ϕ1 ϕ1 1 1 1 ϕ1 ϕ1 ϕ1 ϕϕ1 ϕ1 1 1 1 ϕϕϕ1 ϕϕ1 ϕ1 1 ϕ1
1 1 ϕ1 1 ϕ1 ϕϕϕϕ1 1 1 ϕϕ1 ϕ1 1 1 ϕϕϕ1 1 ϕϕ1 1 ϕ1 1 ϕϕϕϕ1 ϕϕ1 ϕϕϕ1 1 1 ϕ1
1 1 ϕ1 1 ϕϕ1 1 ϕ1 ϕϕϕ1 ϕ1 ϕ1 ϕϕ1 1 ϕ1 ϕϕ1 1 1 1 1 ϕ1 1 ϕ1 ϕ1 ϕϕϕϕ1 1 ϕ
1 ϕ1 1 1 ϕϕ1 ϕ1
1 ϕ1 ϕ1 ϕϕ1 ϕϕϕ1 1 ϕ1 ϕϕ1 1 1 1 ϕϕϕ1 1 ϕϕ1 1 1 1 ϕ1 1 1 ϕϕ1 ϕϕϕ1 ϕ1 ϕ1 1 ϕ
1 ϕϕ1 1 ϕϕϕϕ1
1 ϕϕ1 ϕ1 1 1 ϕ1
1 ϕϕϕϕ1 1 ϕ1 1
ϕϕ1 ϕϕ1 1 1 ϕϕϕϕ1 ϕ1 ϕϕ1 ϕ1 1 1 ϕ1 1 ϕϕ1 1 1 1 ϕϕ1 ϕ1 ϕ1 1 1 ϕϕ1 ϕ1 1 ϕ1 1

} HEL

ϕϕϕϕ
ϕϕϕϕ
ϕϕϕϕ
ϕ1 1 1 ϕϕϕϕϕϕ1 ϕ1 ϕϕϕ1 ϕ1 1 1 ϕ1 1 ϕϕϕ
ϕ1 1 1 ϕϕϕϕϕϕ1 ϕϕϕ1 ϕ1 ϕ1 1 1 ϕ1 1 ϕ1 1ϕ
ϕ1 ϕ1 ϕϕϕϕϕ1
ϕϕ1 1 ϕϕϕϕϕϕ1 ϕϕ1 1 ϕϕ1 1 1 1 ϕ1 ϕϕ1 1ϕ
ϕϕ1 ϕϕϕϕϕϕϕ1 ϕϕ1 ϕϕϕ1 ϕ1 1 ϕ1 1 ϕ1 ϕ1
ϕϕϕϕ
1 1 1 1

} P

| | | | K1 | K2 | K3 | K4 | K5 | K6 | K7 | K8 | K9 | K10 |
| E N E R G Y | P I T C H | R E P E A T | | | | | | | | | | |

TABLE VI

DECODED PARAMETERS

| CODE | E | P | K1 | K2 | K3 | K4 | K5 | K6 | K7 | K8 | K9 | K10 |
|---|---|---|---|---|---|---|---|---|---|---|---|---|
| 00 | 000 | 000 | 208 | 2A3 | 273 | 288 | 2C1 | 2DE | 2DD | 326 | 31F | 34D |
| 01 | 000 | 029 | 20F | 2B8 | 293 | 282 | 2E2 | 304 | 300 | 37B | 363 | 386 |
| 02 | 001 | 02B | 213 | 2CF | 2B9 | 2D8 | 306 | 32F | 328 | 3DA | 3AE | 3C3 |
| 03 | 001 | 02D | 218 | 2F8 | 2E6 | 30B | 32D | 35D | 352 | 038 | 3FD | 001 |
| 04 | 002 | 02F | 220 | 304 | 31B | 341 | 358 | 38E | 380 | 098 | 04C | 03E |
| 05 | 003 | 031 | 229 | 321 | 356 | 37D | 386 | 3C2 | 3B0 | 0FB | 097 | 07B |
| 06 | 005 | 033 | 234 | 340 | 398 | 3BD | 386 | 3F7 | 3E1 | 131 | 0DC | 0B3 |
| 07 | 007 | 035 | 242 | 362 | 3DC | 3FF | 3E7 | 02C | 013 | 169 | 118 | 0E7 |
| 08 | 00A | 037 | 255 | 384 | 023 | 040 | 018 | 061 | 045 | | | |
| 09 | 00F | 03A | 268 | 3A8 | 068 | 080 | 049 | 093 | 075 | | | |
| 0A | 015 | 03C | 286 | 3CD | 0A9 | 0BC | 079 | 0C2 | 0A3 | | | |
| 0B | 01F | 03F | 2A8 | 3F2 | 0E4 | 0F3 | 0A7 | 0EE | 0CE | | | |
| 0C | 028 | 042 | 2CF | 017 | 119 | 123 | 0D2 | 116 | 0F6 | | | |
| 0D | 03D | 046 | 2FD | 03C | 146 | 14C | 0F9 | 139 | 118 | | | |
| 0E | 056 | 049 | 332 | 061 | 16C | 16F | 11D | 158 | 13C | | | |
| 0F | 000 | 04C | 36C | 085 | 18C | 18D | 13E | 173 | 159 | | | |
| 10 | | | 04F | 3AA | 0A7 | | | | | | | |
| 11 | | | 053 | 3FB | 0C7 | | | | | | | |
| 12 | | | 057 | 02D | 0E6 | | | | | | | |
| 13 | | | 05A | 06E | 103 | | | | | | | |
| 14 | | | 05F | 0AB | 11F | | | | | | | |
| 15 | | | 063 | 0F3 | 136 | | | | | | | |
| 16 | | | 067 | 115 | 14D | | | | | | | |
| 17 | | | 068 | 140 | 162 | | | | | | | |
| 18 | | | 070 | 165 | 174 | | | | | | | |
| 19 | | | 076 | 184 | 1B5 | | | | | | | |
| 1A | | | 07B | 19D | 194 | | | | | | | |
| 1B | | | 081 | 1B2 | 1A1 | | | | | | | |
| 1C | | | 086 | 1C3 | 1AD | | | | | | | |
| 1D | | | 08C | 1D0 | 1B7 | | | | | | | |
| 1E | | | 093 | 4DA | 1C1 | | | | | | | |
| 1F | | | 099 | 1E2 | 1FA | | | | | | | |

TABLE VII

DATA OUTPUTTED FROM K-STACK 302 TO RECORDING LOGIC 301 BY TIME PERIODS

| K-STACK OUTPUT BIT | LINE | T8 | T9 | T10 | T11 | T12 | T13 | T14 | T15 | T16 | T17 | T18 | T19 | T20 | T21 | T22 | T23 | T24 | T25 | T24 | T27 |
|---|---|---|---|---|---|---|---|---|---|---|---|---|---|---|---|---|---|---|---|---|---|
| LSB | 32-1 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-2 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-3 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-4 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| | 32-5 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| | 32-6 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| | 32-7 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| | 32-8 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| | 32-9 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |
| MSB | 32-10 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |

TABLE VIII

CHIRP ROM CONTENTS

| ADDRESS | CHIRP FUNCTION VALUE | STORED VALUE (COMPLEMENTED) |
|---|---|---|
| 00 | 00 | FF |
| 01 | 2A | D5 |
| 02 | D4 | 2B |
| 03 | 32 | CD |
| 04 | B2 | 4D |
| 05 | 12 | ED |
| 06 | 25 | DA |
| 07 | 14 | EB |
| 08 | 02 | FD |
| 09 | E1 | 1E |
| 10 | C5 | 3A |
| 11 | 02 | FD |
| 12 | 5F | A0 |
| 13 | 5A | A5 |
| 14 | 05 | FA |
| 15 | 0F | F0 |
| 16 | 26 | D9 |
| 17 | FC | 03 |
| 18 | A5 | 5A |
| 19 | A5 | 5A |
| 20 | D6 | 29 |
| 21 | DD | 22 |
| 22 | DC | 23 |
| 23 | FC | 03 |
| 24 | 25 | DA |
| 25 | 2B | D4 |
| 26 | 22 | DD |
| 27 | 21 | DE |
| 28 | 0F | F0 |
| 29 | FF | 00 |
| 30 | F8 | 07 |
| 31 | EE | 11 |
| 32 | ED | 12 |
| 33 | EF | 10 |
| 34 | F7 | 08 |
| 35 | F6 | 09 |
| 36 | FA | 05 |
| 37 | 00 | FF |
| 38 | 03 | FC |
| 39 | 02 | FD |
| 40 | 01 | FE |

The page image is too low-resolution and faded to transcribe reliably.

```
0059  01001110        0163          LDX     3
0072  00105001        0164          TCY     3
0065  01010111        0165          XMIT    5
0046  05011001        0166          TMA
001B  01001000        0167          LDX     1         * ADD
0020  00100101        0168          TCY     11        * TO
005A  11111000   0112 0169          CALL    ADDCARRY  * ROM ADDRESS
0034  01001100        0170          LDY     1         GET LSD OF RANDOM NUMBER
006B  00110001        0171          TCY     6         GET MSD OF RANDOM NUMBER
0051  00101001        0172          TMA
0022  01001100        0173          LDX     1
0094  00100101        0174          TCY     10
000A  11101100   0112 0175          CALL    ADDCARRY  * ADD TO ROM ADDRESS
0011  01000101        0176          CALL    MEMADDR   LOAD ADDRESS TO 0350
0025  11101100   1501 0177
0046  01001110        0178          CALL    GETADDR2  GET LSD OF RANDOM LETTER
000C  11100001   1083 0179
0019  01010000        0180          LDX     0
0053  00100111        0181          TCY     14
0066  00010111        0182          TAM
0040  01001110        0183          CALL    GETADDR2  GET MSD OF RANDOM LETTER
0014  11100001   1083 0184
0035  01001000        0185          LDX     0         * STORE
006A  00100111        0186          TCY     15        * LIKE A
0055  00010111        0187          TAM              * KEYPRESS
0024  01001100        0188          LDX     2
0051  00110000        0189          TCMIY   0
002E  01001011        0190          BL      TRANSFER  ** SAYS LETTER AND
0050  10111111   1875 0191
                       0192                          ** PUTS IT IS DISPLAY
```

TABLE IX-1

```
                       0193          PMGPG    1
0000 00010111          0194 NOTFULL  TAMIYC
0001 00101000          0195          TCMIY    1
0005 00100111          0196          TCY      14
0007 00010010          0197          TMA
000F 00100111          0198          TCY      11
001F 00010010          0199          TMY
003F 01001000          0200          LDX      1
007F 00101001          0201          TAMIYC
007E 00110011          0202          TCMIY    12
007C 01001000          0203          LDX      0
007B 00100101          0204          TCY      NXTDISP    **
0077 00110010          0205          TMAC                **
006F 00010111          0206          TAM                 **
005F 01000010          0207          BL       NOTTRANS   **
003F 10111100   0650   0208
                       0209  *
                       0210  * GO ROUTINE--> DECIDES WHICH MODE YOUR IN AND BRANCHES
                       0211  *    TO THAT MODE, ELSE GOES TO DISP/KB.
                       0212  *
007C 01001010          0213 GO       BL       RANDOM
0079 10000000   0753   0214
0073 01001001          0215 RANRTN   LDX      B          RAM
0067 00100110          0216          TCY      6
006F 01010110          0217          XMIT     1
001E 00100001          0218          TCY      8          SET GO MODE FLAG
0040 01010010          0219          SMIT     1          *
007A 01001110          0220          TCY      7          TEST WHICH MODE
0075 00010001          0221          TMA
006B 01001110          0222          LDX      5
0057 00100111          0223          TCY      13
002E 00110000          0224          TCMIY    0
005C 01001101          0225          CALL     CORMSPEL
0038 11100000   15B2   0226
0070 01000100          0227          LDP      2
0061 01110110          0228          ALEC     1          SPELL?
0045 10000000   0342   0229          BRANCH   DSPELL     *
0006 01000100          0230          LDP      4          *
0006 01101100          0231          ALEC     3          LEARN?
001B 10011001   1209   0232          BRANCH   DLRN+1
0037 01001111          0233          LDP      11
006E 01110010          0234          ALEC     5          GAME#1?
005D 10111110   1590   0235          BRANCH   CORR+1
003A 01100000          0236 CLEAR    TCY      0
0074 01001000          0237 HERE     LDX      0
0069 00110000          0238          TCMIY    1
0053 00000100          0239          CYR
002B 01101010          0240          LEX      1
004C 00110101          0241          TCMIY    11
001B 01101001          0242          YNEC     8
0051 10111100   0237   0243          BRANCH   HERE
0062 00100000          0244          TCY      0
0045 00110011          0245          TCMIY    12
000A 01001000          0246          LDX      0
0015 00100111          0247          TCY      11
002B 00110000          0248          TCMIY    0
0055 01011111          0249          RETN
002C 10111011   0215   0250 REPLAY   BRANCH   RANRTN
                       0251  *
                       0252  * ENTER= ROUTINE TO PROCESS ENTER KEY DEPRESS
                       0253  *
005A 01001001          0254 ENTER    LDX      B          RAM
005D 00101110          0255          TCY      7          FLAG
0060 00011011          0256          CMEZ                SPELL MODE?
0041 10000001   0258   0257          BRANCH   TST4A5     NO
0002 10110011   0273   0258          BRANCH   SPACE=5
0005 00010010          0259 TST4A5   TMY
000B 00101100          0260          YNEC     3          SPELL IT MODE?
0017 10011110   0263   0261          BRANCH   TST4A6     NO
002E 10110011   0273   0262          BRANCH   SPACE=5
005E 01101100          0263 TST4A6   YNEC     4          GAME 2 MODE?
003C 11110011   0273   0264          BRANCH   SPACE=3
0078 01000110          0265          BL       CRYPTO
0071 10000000   0885   0266
```

This page contains low-resolution assembly code listing that is largely illegible.

This page contains a dense assembly/machine code listing that is too low-resolution to transcribe reliably.

This page contains an assembly code listing that is too low-resolution and faded to reliably transcribe. A best-effort partial reading follows.

```
0485        TCMIY   14              HANGMAN FLAG
0486        TCY     10
                    INIT    0               * TEST RANDOM COUNTER
0487        BRANCH  HANG2           * HIT AND PUT 2 OR 3
0488        AFACC                   * IN ACC
0489 HANG2  ACACC   2
0490        LDX
0491        TCY     15              * STORE 2 OR 3 IN LEVEL
0492        TAM                     * OF DIFFICULTY
0493        LDX     8               DAM
0494        TCY     7
0495        TCMIY   5               SET HANGMAN MODE
0496        X1      CURLEVL
0497
0498        * 'RANDOM' GENERATES A RANDOM WORD,
0499        * PUTS IT IN THE CORRECT SPELLING
0500        * BUFFER AND RETURNS TO 'HANG'
0501 HANG   CALL    CLEAR           PUT BLANKS IN DISPLAY
0502
0503        TCY     8
0504 HANG3  DYN
0505        CALL    SPLNTR+1        * COMPARE DISPLAY DIGIT TO
0506        ALEC    0               * DIGIT IN CORRECT
0507        BRANCH  HANG3           * SPELLING BUFFER
0508
0509        * FINDS THE FIRST DIGIT THAT IS NOT A
0510        * BLANK, STARTING FROM THE RIGHT SIDE;
0511        * THE ROUTINE BELOW THEN PUTS CURSORS IN
0512        * THE DIGITS CORRESPONDING TO LETTERS
0513        LDX     1
0514 HANG4  TAMDYN
0515        BRANCH  HANG4
0516 SONG   HL      TONES
0517
0518        * IF THE HANGMAN FLAGS ARE SET UP, LETTER
0519        * KEYS GO TO 'HANG1' AFTER SPEAKING THE LETTER
0520        ** THIS ROUTINE COMPARES LETTER ENTERED TO CORRECT SPELLING
0521 HANG1  TCY     15              * HIT 1=WORD NOT COMPLETE
0522        LDX     0               * HIT 0=CORRECT LETTER
0523        TCMIY   0
0524        TCY     8
0525 HANG5  SMIT    3               HIT IS SET AFTER EACH DIGIT IS COMPARED
0526        DYN
0527        BRANCH  HANG6
0528        TCY     8               COMPARISONS ARE COMPLETE
0529 HANG10 RBIT    3               RESET HIT 3 IN EACH DIGIT
0530        DYN
0531        BRANCH  HANG10
0532        TCY     15
0533        TBIT    0               WAS THE LETTER CORRECT?
0534        BRANCH  HANG11
0535        LDX     2               NO
0536        IMAC                    * ADD 1 TO INCORRECT
0537        TAM                     * GUESS COUNTER
0538        LDP     15
0539        ALEC    6
0540        BRANCH  DISP/KB
0541 TWIN   LDX     1
0542        TCY     10
0543        TCMIY   0
0544        TCMIY   7
0545 TWIN1  TCMIY   0
0546        TCMIY   0
0547        TCY     15
0548        LDX     2
0549        TCMIY   0
0550        LDX     8
0551        TCY     8
0552        RBIT    1
0553        HL      LOADDISP        CLEAR HANGMAN
0554
0555 HANG11 TBIT    1
0556        BRANCH  SONG
0557 YOUWIN TCY     10              YES
0558        LDX     1
0559        TCMIY   2
0560        TCMIY   7               * 'YOU WIN'
0561        BRANCH  TWIN1
0562 HANG6  CALL    SPLNTR+1        *CHECK IF CORRECT
0563                                *LETTER HAS ALREADY
0564        ALEC    0               *BEEN ENTERED IN EACH DIGIT
0565        BRANCH  HANG8
0566        TCY     15              NO
0567 FINDIT TMA                     PUT LETTER CODE IN ACC
0568        TCY     8               * FIND THE FIRST LETTER
0569 HANG7  DYN                     * THAT HASN'T YET
0570        TBIT    3               * BEEN ENTERED
0571        BRANCH  HANG7           * CORRECTLY
0572        XETN
0573        TAM                     STORE LETTER CODE
0574        TCY     14              *GET OTHER HALF OF
0575        CALL    FINDIT          *LETTER CODE AND STORE IT
0576
0577        LDX     1
0578        TAM
0579        CALL    SPLNTR+1        CHECK TO SEE IF
0580                                NEW LETTER MATCHES
0581        ALEC    0
0582        BRANCH  HANG8
0583        LDX     1               * DOES NOT MATCH
0584        TYA                     * PUT BLANK BACK
0585        TCMIY   12              * IN DISPLAY
0586        LDX     0
0587        TCY     13
0588        SBIT    1               SET FLAG FOR WORD NOT COMPLETE
0589        TAY
0590        BRANCH  HANG9           HEY
0591 HANG8  TYA                     CORRECT LETTER GUESS
0592        TCY     13
0593 HANG9  SBIT    0               * CORRECT LETTER FLAG IF Y=13
0594        TAY
```

```
0651  101101110  0525  0595           BRANCH    HANGS
                       0596    *
                       0597    * NXTWORD--RESETS FLAGS, INCREMENTS COUNTERS AND POINTERS
                       0598    *
0022  010110010        0599   NXTWORD COMXB
0044  001000010        0600           ICY       4                 INCREMENT PHRASE COUNTER
000R  000101001        0601           TMA
0011  001110100        0602           ACACC     2
0625  011100001        0603           ALEC      8
0046  100011001  0606  0604           BRANCH    NXT2
040C  000000110        0605           CLA
0019  000101111        0606   NXT2    TAM
0033  001000110        0607           ICY       6                 RESET HITS FLAGS
0066  010101001        0608           RBIT      0
0040  010100110        0609           RBIT      1
001A  001000000        0610           TCY       6                 INCREMENT RWE POINTER
0035  000110010        0611           TMAC
006A  000101111        0612           TAM
0055  000101010        0613           TCY
002A  010001000        0614           LDP       2
0054  001010101        0615           YNEC      10                *
002B  100100111  0345  0616           BRANCH    DSPELL+1
0050  001000100        0617           RI        F5
0020  101100101  0431  0618
```

TABLE IX-4

```
                       0619           ORGPG     4
0000  010001000        0620   GAME#2  CALLL     CLEAR             PUTS BLANKS AND CURSOR IN DISPLAY
0001  110111010  0236  0621
0003  010001001        0622           LDX       8                 DAM
0007  001001110        0623           TCY       7
000F  001100110        0624           TCMIY     6                 SET MODE FOR CODE BREAKER
001F  010100010        0625           SBIT      1                 SET GO FLAG
003F  010001101        0626           RL
007F  101000111  1657  0627           BL                TONES
                       0628   *
007E  010010001        0629   DIFFSLV LDX       8
0070  001001110        0630           TCY       SEVEN             **
007B  000101001        0631           TMA
0077  010010000        0632           LDX       0
006F  001000000        0633           TCY       0
005F  001101000        0634   BLANKM  TCMIY     1
003F  001010001        0635           YNEC      8
007C  101011111  0634  0636           BRANCH    BLANKM
0079  001001000        0637           TCY       1
0073  011100000        0638           ALEC      0
0067  101000011  0656  0639           BRANCH    LZEROS
                       0640   *
004F  001100000        0641           TCMIY     0                 *
001F  001000010        0642           TCY       8
003D  001100000        0643           TCMIY     0                 !
                       0644   *
007A  010011000        0645           LDX       ONE               **
0075  001000000        0646           TCY       DISPLAY           **
006B  001100100        0647           TCMIY     2                 S
0057  001100000        0648           TCMIY     0                 *
002E  001100003        0649           TCMIY     8                 Y
005C  001101101        0650           TCMIY     11
0038  001100001        0651           TCMIY     4                 ?
0070  001101100        0652           TCMIY     3                 ?
0061  101110100  0665  0653           BRANCH    BLANK
                       0654   *
                       0655   *
0043  001100000        0656   LZEROS  TCMIY     0                 PUT ,SPELL, IN DISPLAY
0006  001011010        0657           YNEC      5
0000  101000011  0656  0658           BRANCH    LZEROS
                       0659   *
001B  010011000        0660           LDX       ONE               **
0037  001000000        0661           TCY       DISPLAY           **
006F  001100100        0662           TCMIY     LSMSS             **
0050  001101111        0663           TCMIY     LSMSP             **
003A  001100010        0664           TCMIY     ISMSE             **
0074  001101101        0665   BLANK   TCMIY     11
0069  001010001        0666           YNEC
0053  101110100  0665  0667           BRANCH    BLANK
0026  001001111        0668   PUTSLVL TCY       LEVEL             * PUT LEVEL IN DISPLAY
004C  000101001        0669           TMA                         **
001R  001001110        0670           TCY       7
0031  000101111        0671           TAM                         **
                       0672   *
0062  010001000        0673           LDX       ZERO              **
0045  001100000        0674           TCMIY     0
                       0675   *
0004  010110010        0676           COMXB                       * CLEAR GO FLAG
0015  001000001        0677           TCY       FLAG2             **
002A  001100000        0678           TCMIY     0
0056  000111111        0679           RETN                        **
002C  010010000        0680   NOSTRANS LDX      0                 CALCULATE LETTER ADDRESS
005A  001001111        0681           TCY       15
0050  000101001        0682           TMA
0060  010011000        0683           LDX       1
0041  001000011        0684           TCY       12
0002  001100000        0685           TCMIY     0
0005  001100000        0686           TCMIY     0
0000  001001101        0687           TCY       11
0017  000101111        0688           TAM
002F  110000000        0689           CALL      ADDCARRY
005E  111011000  0112  0690
003C  010010000        0691           LDX       0
0074  001000111        0692           TCY       14
0071  000101001        0693           TMA
0063  010011000        0694           LDX       1
0047  001000101        0695           TCY       10
000F  000101111        0696           TAM
0010  010000000        0697           CALLL     ADDCARRY
0038  111011000  0112  0698
0076  000100110        0699           CLA
006D  001111011        0700           ALACC     12
```

```
0054  ...          0701          TCY      10
0058  ...          0702          CALL     ADDLARRY
006C  ...   2112   0703
0054  ...          0704  ADDCTR6 CALL     MEMADDR
0052  111111000 1501 0705
0061  110001110      0706          CALL     LOADRESS
0049  111000010 1121 0707
0012  010001111      0708          BL       ADDWDS2
0025  100001010 2057 0709
0044  010010100      0710  RETNSRCH LDX     2        RETNSRCH FLAG=ACC
0014  001001111      0711          TCY      15       *
0029  000101001      0712          TMA
0052  010001111      0713          LDP      15
0024  011101000      0714          ALEC     1        SPELL?
0048  100101100 2219 0715          BRANCH   DISP/KB
0010  010001101      0716          LDP      11
0021  011100100      0717          ALEC     2
0002  101000010 1A80 0718          BRANCH   NXTTONE
0004  010001100      0719          LDP      3
0009  011101100      0720          ALEC     3        NXTWORD?
0013  100100010 0594 0721          BRANCH   NXTWORD
0027  010000101      0722          LDP      10
004E  011100010      0723          ALEC     4        NEG?
001C  100001001 1540 0724          BRANCH   MSPEL3
0039  010000001      0725          LDP      8
0072  011101010      0726          ALEC     5        SAY IT?
0065  101100011 1232 0727          BRANCH   DISLP-5
004A  010001001      0728          LDP      9
0016  011100110      0729          ALEC     6        SPEAK LETTER?
002D  101110110 1372 0730          BRANCH   LET+4
0054  010001100      0731          LDP      3
0034  011101110      0732          ALEC     7
0068  100000110 0521 0733          BRANCH   HANGI
0051  011100001      0734          ALEC     8
0022  100001000 0479 0735          BRANCH   GAME#1
0049  010000101      0736          LDP      10
0005  011101001      0737          ALEC     9
0033  101101010 1570 0738          BRANCH   ADDCTR2
0023  010000001      0739          LDP      8
0046  011101101      0740          ALEC     10
000C  101100111 1232 0741          BRANCH   DISLP-5
                     0742  * TSTBIT2-->USED IN LOADING LNK/EDT TO TEST FOR 3 WORDS OF ZERO
                     0743  *                   1 WORD OF 0001
                     0744  *
0019  ...          0745  TSTBIT2 COMXR                     DAN NEG
0033  ...          0746          TCY      2
0068  ...          0747          RMIT     1
0040  ...          0748          BDIT     2
0014  ...          0749          EQ=XR
0055  ...          0750          RETN
                     0751          ORGPG    5                  **
                     0752  * STORE SEED NUMBER
0000  010010010      0753  RANDOM  LDX     0
0001  001000101      0754          TCY     10
0005  000000110      0755          CLA
0007  010001111      0756          CALL    FILSLOOP
000F  110101110 2183 0757
001E  001001110      0758          TCY     7
0056  010010001      0759          LDX     8
007E  010001110      0760          LDP     7
007E  000100000      0761          TMIT    0
0070  101110011 1039 0762          BRANCH  LDPREV
0076  010100000      0763          SBIT    0
0077  010001010      0764          LDP     5
                     0765  * CURLEVL-->
                     0766  * STORES NUMBER OF ENTRIES IN CURRENT LEVEL
                     0767  * INTO RAM
                     0768  *
006F  001000101      0769  CURLEVL TCY     10
005A  010010000      0770          LDX     1
                     0771  * ZERO OUT RAM ADDR
003F  001100000      0772          TCMIY   0
007C  001100000      0773          TCMIY   0
0079  001100000      0774          TCMIY   0
0075  001100000      0775          TCMIY   0
0067  001000101      0776          TCY     10
004F  010111111      0777          RETN
                     0778  * FIND DIFFICULTY LEVEL
001E  001001111      0779          TCY     15
0030  000101001      0780          TMA
007A  001001010      0781          TCY     10
0075  000101111      0782          TAM
0068  010000111      0783          CALL    ADD8
0057  110001100 2139 0784
002E  010001101      0785          CALL    MEMADDR
005C  111011000 1501 0786
                     0787  * OUTPUT # OF ENTRIES IN THIS LEVEL
003A  010001110      0788          CALL    OUTADDR2
0070  111000011 1085 0789
0061  001001111      0790          TCY     15
0045  010011010      0791          LDX     5
006A  000101111      0792          TAM
0003  010001110      0793          CALL    OUTADDR2
001A  111000011 1083 0794
0037  001001111      0795          TCY     15
006E  010010110      0796          LDX     4
005C  000101111      0797          TAM
0058  010010010      0798          LDX     6
0074  100000111      0799          BMAN
0069  100111100 0A00 0800          BRANCH  DECMEM
0053  000101111      0801          TAM
0062  010010010      0802          LDX     4
004C  100000111      0803          BMAN
0018  000101111      0804  DECMEM  TAM
0031  010111110      0805          LDX     5
0062  001101010      0806          TCY     6
0045  000101111      0807          TMA
000A  010000010      0808          LBA     5
0015  001000010      0809          TCY     0
0026  000101111      0810          TAM
0055  010001110      0811          LDX     5
```

```
005C   0x1x01x40                 0812            TCY      9
0058   00011x111                 0813            THA
0050   01001010                  0814            LDX      0
0050   00011x100                 0815            TCY      0
0011   00010111                  0816            TAM
                                 0817   * DETERMINE IF SEED IS 1ST NUMBER OF ENTRIES
0002   00101111                  0818   DECLOOP  TCY      15
0005   00000001                  0819            ALEM
000R   10111000      0x25        0820            BRANCH   RANDM
0017   00010000                  0821            TCY      0
0026   01111110                  0822            ACACC    5
005E   00010111                  0823            TAM
005C   10001010      0x1x        0824            BRANCH   DECLOOP
0074   00000001                  0825   RANDM    INEA
0071   10101001      0x37        0826            BRANCH   RANDM2
0065   00111000                  0827            TCY
0047   01001010                  0828            LDX      5
000E   00010001                  0829            TAM
0010   00101111                  0830   DECLOOP3 TCY      15
0050   00000001                  0831            ALEM
0076   10101001      0x37        0832            BRANCH   RANDM2
0068   00111000                  0833            TCY
005A   00111100                  0834            ALACC
005E   00011111                  0835            TAM
006C   10001101      0x30        0836            BRANCH   DECLOOP3
0059   01011010                  0837   RANDM2   COMXB
                                 0838   * ZERO RWE POINTER
0032   01000000                  0839            TCY      0
0068   00110000                  0840            TCMIY    0
0049   01001010                  0841   RPLOOP   LDX      5
0012   01001101                  0842            CALLL    RCOMXB
0025   11100100      1631        0843
0044   00010001                  0844            THA
0014   00000101                  0845            IYC
0029   00111000                  0846            ACACC    1
0052   11010100      088A        0847            CALL     INCARRY
0024   00010100                  0848            TAMDYN
0048   01001010                  0849            LDX      4
0010   00010101                  0850            THA
0021   00000101                  0851            IYC
0042   00010101                  0852            AMAAC
0004   00010111                  0853            TAM
0009   01001101                  0854   RANARND  CALLL    RCOMXB
0013   11100100      1631        0855
0027   00010101                  0856            THA
000E   00100111                  0857            TCY      15
001C   00000001                  0858            ALEM
0039   10100101      0x61        0859            BRANCH   RANCNT
0072   10101010      0x70        0860            BRANCH   ZROHAND
0065   00000101                  0861   RANCNT   INEA
004B   10110110      0x78        0862            BRANCH   RANCOMP
0016   01001010                  0863            LDX      5
0020   01001101                  0864            CALLL    RCOMXB
005A   11100100      1631        0865
0034   00010101                  0866            THA
0068   00101111                  0867            TCY      15
0051   00000001                  0868            ALEM
0022   10110110                  0869            BRANCH   RANCOMP
0044   01001101                  0870   ZROHAND  CALL     RCOMXB
000E   11100100      1631        0871
0011   00110000                  0872            TCMIY    0
0023   00000100                  0873            DYE
000A   01001010                  0874            LDX      4
000C   00110000                  0875            TCMIY    0
0019   00110100                  0876            TCMIY    0
0055   10100101      0x41        0877            BRANCH   RPLOOP
0066   00100000                  0878   RANCOMP  TCY      0
                                 0879   * COMPARE RANDOM # TO # OF ENTRIES
0040   01011010                  0880            COMXB
001A   00010010                  0881            IMAC
0035   00010111                  0882            TAM
0064   01101001                  0883            ALEC     9
0055   10100101      0x41        0884            BRANCH   RPLOOP
002A   01001110                  0885            BL       RANSTOP
0054   10000000      1021        0886
                                 0887   *
0028   00010111                  0888   INCARRY  TAM
0050   01001010                  0889            LDX      0
0020   00010010                  0890            IMAC
0040   01011111                  0891            RETN

TABLE IX-6

0892            ORGPG    6
                                 0893   ****     CODE     BREAKER
0000   01000100                  0894   CRYPTO   CALLL    SPACE=3
0001   11100011      0273        0895
0003   00100000                  0896            TCY      0
0007   01001000                  0897   CRY1     LDX      0
000F   00110011                  0898            MNEZ
001F   10011101      0915        0899            BRANCH   CRY2
005F   01001000                  0900   COMPL    LDX      1
007F   00110010                  0901            IMAC
007E   00010000                  0902            CPAIZ
0070   01011111                  0903            RETN
007A   01110001                  0904            ALEC     9
0077   10011110      0904        0905            BRANCH   CRY3
006F   00110110                  0906            ACACC    6
005F   10100111      0919        0907            BRANCH   CRY6
003E   00010111                  0908   CRY3     TAM
007C   01001000                  0909   CRY5     LDX
0079   00110000                  0910            TCMIY    1
0071   00010001                  0911   CRY4     YNEC     4
0067   10000111                  0912            BRANCH   CRY1
004F   01001101                  0913   CRY12    BL       TUNES
001E   10100111      1657        0914
0050   01000111                  0915   CRY2     CALLL    COMPL
007A   11011111      0900        0916
0075   01110010                  0917            ALEC     5
```

```
0064  101111100  0909  0918         BRANCH   CRY5        * THAN LETTERS AND SKIP THEM
0057  000101111        0919  CRY6   TAM
002E  010010000        0920         LDX      0
005C  001100000        0921         TCMIY    0           SET MSB TO ZERO
005B  101110011  0911  0922         BRANCH   CRY4        RET
0070  010011100        0923  CLUE   LDX      3
0061  001000001        0924         TCY      8
0083  000101001        0925         TMA                  GET HEX RANDOM NUMBER
0006  011101110        0926         ALEC     7           * IF NUMBER IS GREATER
008D  100110111  0929  0927         BRANCH   CLUE1       * THAN 7, ADD 8
0018  001110001        0928         ACACC    8           *
0037  000101000        0929  CLUE1  TAY                  SET Y RANDOMLY 0- 7
000E  000001100        0930  CLUE2  DYN                  * LOOK FOR FIRST
0050  101110100  0933  0931         BRANCH   YOK
0034  001101110        0932         TCY      7
0074  010000110        0933  YOK    CALL     SPLNTR+1    * LETTER THAT HASN'T
0069  110101110  0374  0934
0053  011100000        0935         ALEC     0           * BEEN CORRECTLY ENTERED
0026  101110111  0936  0936         BRANCH   CLUE2
004C  010010100        0937         LDX      2
001A  010100000        0938         TBIT     0           MSB IS A ONE?
0051  100000001  0452  0939         BRANCH   CLUE5       YES
0062  010011100        0940  GETIT  LDX      3           NO
0065  000101000        0941         TMA                  * GET LSD OF LETTER
000A  010010000        0942         LDX      0           * FROM CORRECT SPELLING
0015  001100111        0943         TCY      14          * BUFFER AND PUT IT IN
002E  000101101        0944         TAMIYC              * KEY CODE
0058  010111111        0945         RETN
0C2C  001100000        0946         TCMIY    0           SET MSB=0
0058  001101011        0947  CLUE4  TCY      15
0030  010010100        0948         LDX      2
0060  001101001        0949         TMA
0041  010000001        0950         HL       MISS3
0002  100111101  0471  0951
0005  111101110  0944  0952  CLUE3  CALL     GETIT
0006  011111000        0953         TCMIY    1           SET MSB=1
0017  101110110  0907  0954         BRANCH   CLUE4       RET
0026  000101000        0955  F2     TAY
005E  001110000        0956         YNEC     0
005C  101110111  0413  0957         BRANCH   CRY12
007A  010011100        0958         LDX      4           10
0071  001001010        0959         TCY      5
0063  001101000        0960         TCMIY    1
0047  001100100        0961         TCMIY    2
010E  001101100        0962         TCMIY    2
0010  010011000        0963         LDX      1
0034  001101010        0964         TCY      5
0076  001100111        0965         TCMIY    14
0060  001101000        0966         TCMIY    1
0054  001100000        0967         TCMIY    0
0036  101101111  0913  0968         BRANCH   CRY12
006C  010011110        0969  F5     LDX      3
0059  001101011        0970         TCY      13          LNK/ROT VALUE
0062  001100000        0971         TCMIY    0
0064  010011000        0972  F2LOOP LDX      1
0069  001000101        0973         TCY      10
0012  001101100        0974         TCMIY    2
0025  001100010        0975         TCMIY    4
0044  001100000        0976         TCMIY    0
0014  001100000        0977         TCMIY    0
0029  010011010        0978         LDX      5
0052  001000011        0979         TCY      11          * IF CORRECT SCORE
002A  000101001        0980         TMA
002B  011000001        0981         AMAAC
0016  101100111  1012  0982         BRANCH   F2
0021  010011000        0983         LDX      1
0042  001000111        0984         TCY      10
0044  011000010        0985         AMAAC
0027  101110111  1015  0986         BRANCH   F5
0015  000101110        0987         TAM
0027  000111111        0988  FINL2  RETN
0004  100001001        0989         CALL     RERANDM
001C  111001001        0990         CALL     LOADRESS    * A DRESS
0053  010111111        0991         CALL     1
0072  111000011  1121  0992         CALL     TRANSNT     STORE IN TAM
0065  001111011        0993         TCY      1
004A  111001011        0994         CALL     TRANSNT     STORE IN TAM
0015  111111011  1036  0995
0020  000101001        0996
0054  101001111  1022  0997
0034  001000101        0998  FINL3  TCY      10
0066  010011000        0999  FINL6  LDX      1
0051  000101001        1000         TMA
0022  010010010        1001         LDX      4
0044  000101101        1002         TAMIYC
0005  001010111        1003         YNEC     14
0011  101101000  0999  1004         BRANCH   FINL6
0023  010001010        1005         CALL     CURLEVL
0046  111101111  0769  1006
000C  001100010        1007         TCMIY    4
0019  001101110        1008         TCMIY    7
0033  101001000        1009         HL       SPR4
0060  101100101  0311  1010
                        1011  *
0040  010011000        1012  NOF2   LDX      1
0014  001000101        1013         TCY      10
0035  011000101        1014         AMAAC
006A  000101101        1015  NOF3   TAMIYC
0055  000110010        1016         IMAL
0028  000101111        1017         TAM
0054  100100111  0988  1018         BRANCH   FINL2
```

TABLE IX-7

```
                        1019         DMSPG    7          **
                        1020  * LOADED 16 VALUES =STORE LAST VALUE
0000  001100000        1021  RANSTOP TCMIY   0
0001  001000101        1022         TCY      10
0003  010011010        1023         LDX      5
```

```
0007  00010100?         1024            TMA
000F  00100?111         1025            TCY    14
001F  00010111?         1026            TAM
003F  01001001?         1027            LDX    4
007F  00133010?         1028            TCY    10
007E  00010100?         1029            TMA
007D  0310001!1         1030            TCY    14
007B  00010111?         1031            TAM
0077  010011010         1032   RSCRAM2  LDX    5
006B  111110000   1052  1033            CALL   RSCRAM
005F  010010010         1034            LDX    4
003E  111110000   1052  1035            CALL   RSCRAM
007C  010001000         1036            RL     RANRTN
0079  101110011   0215  1037
                              1038  * LDPREV==> LOADS NEXT VALUE NTO RWF
007S  001000111         1039   LDPREV   TCY    14
00A7  010010010         1040            LDX    4
004F  00010100?         1041            TMA
001F  001000000         1042            TCY    0
003D  000101111         1043            TAM
007A  001000111         1044            TCY    14
0075  010011010         1045            LDX    5
006B  000101001         1046            TMA
0057  001000000         1047            TCY    0
002E  000101111         1048            TAM
005C  010001010         1049            LDP    5
0058  101011001   0B37  1050            BRANCH RANOR2
                              1051  * SCRAMBLES RWE WORDS
0070  001000000         1052   RSCRAM   TCY    0
0061  000101001         1053            TMA
0043  001000110         1054            TCY    6
0006  000000011         1055            XMA
0000  001000000         1056            TCY    0
001B  000101101         1057            TAMIYC
0037  000101001         1058            TMA
006E  001001110         1059            TCY    7
005C  000000011         1060            XMA
003A  001001000         1061            TCY    1
0074  000101101         1062            TAMIYC
0069  000101001         1063            TMA
0053  001001010         1064            TCY    5
0026  000000011         1065            XMA
004C  001001100         1066            TCY    2
001E  000101101         1067            TAMIYC
0051  000101001         1068            TMA
0062  001000001         1069            TCY    8
0045  000000011         1070            XMA
000A  001001100         1071            TCY    3
0015  000101101         1072            TAMIYC
002A  000101001         1073            TMA
0056  001001001         1074            TCY    9
002C  000000011         1075            XMA
005A  001001010         1076            TCY    4
0056  000000011         1077            XMA
0009  010111111         1078            RETN
                              1079  *
                              1080  *  OUTADDR2:
                              1081  *  LOADS 4 BITS INTO K-LINES USING PDC AND OUTPUT 4 BITS
                              1082  *
0041  001000011         1083   OUTADDR2 TCY    12           ** CHIP SELECT
0002  000001101         1084            SETR                **
0005  001001101         1085            TCY    11           L/R = 0
0008  000001101         1086            SETR                **
0017  001000101         1087            TCY    10
002F  000000110         1088            CLA                 ACC=OUTPUT 4 BITS COMMAND
005F  001111001         1089            ACACC  EIGHT        **
003C  000001101         1090            SETR                **
007A  000110110         1091            RSTR                **
0071  000001101         1092            SETR                **
0063  000110110         1093            RSTR                **
0047  000001101         1094            SETR                **
000E  000110110         1095            RSTR                **
0010  000001101         1096            SETR                **
003B  000110110         1097            RSTR                **
0076  000000110         1098            CLA                 **
0060  001110010         1099            ACACC  FOUR         **
005B  000001101         1100            SETR                1ST PDC LOADS COMMAND
0036  000110110         1101            RSTR                .
006C  001001101         1102            TCY    11
0059  000110110         1103            RSTR                .
0032  001000101         1104            TCY    10
0064  000001101         1105            SETR                2ND PDC APPLIES SR TO K-LINES
0049  000110110         1106            RSTR                *
0012  001110000         1107            ACACC  0            LOAD INTO ACC
0025  000001000         1108            TKA                 3RD PDC DISCONNECTS SR
0044  000001101         1109            SETR                *
0014  000110110         1110            RSTR
0029  001001101         1111            TCY    11
0052  000001101         1112            SETR
0024  010010100         1113            LDX    2
0048  001010011         1114            TBIT   3
0010  101001011   1131  1115            BRANCH LSHIFT=1
0021  010111111         1116            RETN
                              1117  *
                              1118  *  END OF OUTADDR2 SUBROUTINE
                              1119  *
                              1120  *
0042  001001101         1121   LOADRESS TCY    11
0004  010010100         1122            LDX    2
0009  010100011         1123            SBIT   3
0013  001000101         1124            TCY    10
0027  000000110         1125            CLA
004E  001111100         1126            ACACC  3
001C  010010100         1127            LDX    2
0039  000101110         1128   LOADR+1  TAMZA
0072  010011000         1129            LDX    1
0065  101000001   1083  1130            BRANCH OUTADDR2
004B  001001011         1131   LSHIFT=1 TCY    13
0016  010011000         1132            LDX    1
002D  000000011         1133   LSHIFT   XMA                 SHIFT ROUTINE
005A  000000100         1134            DYN                 *
```

```
0034  00101101    1135         YNEC     4
006A  11011111 1133 1136        BRANCH   LSHIFT
0051  00100101    1137         TCY      10         TEST LOOP COUNT
0022  01001100    1138         LDX      2
0044  00000111    1139         BMAN
000M  11011001 1128 1140        BRANCH   LOADR+1
0011  00100101    1141         TCY      11
0023  01010111    1142         KBIT     3
0046  11111111    1143         RETN
                  1144    *
000C  01001010    1145  +12    LDX      5
0019  00100011    1146         TCY      13
0055  00000110    1147         CLA
0066  00111101    1148         ACACC    10
0040  00000011    1149         XMA
001A  00011001    1150         SAMAN
0055  00010111    1151         TAM
006A  01011111    1152         RETN
0055  00101110    1153  RDM    TCY      6
0024  01001001    1154         LDX      8
0054  00010101    1155         TMA
0028  01111001    1156         ACACC    4
0050  00111111    1157         TAM
0025  01001111    1158         BL       DISP/KM
0047  10010110    2219 1159
```

TABLE IX-8

```
                  1160         ORGPG    8
                  1161    *
                  1162    * CALADOR==> STICKS ADDRESS WANTED INTO LNK/EDT
                  1163    *
0000  00100111    1164  CALADOR TCY     14
0001  00100101    1165         TCMIY    10
0003  00100101    1166         TCY      9
0007  01001100    1167         LDX      1
000F  00010001    1168         TMA
001F  00111111    1169         ACACC    15
003F  01011010    1170         COMXA                ADDRESS DAM
007F  00010111    1171         TAM
007E  01000101    1172         TCY      10
0070  00010001    1173  THAA   TMA
0075  01001100    1174         LDX      1
0077  00010111    1175         TAMIYC
006F  01011010    1176         COMXA                ADDRESS DAM
005E  00110111    1177         YNEC     14
003F  10111101    1173 1178    BRANCH   TMAA
007C  11101111    1153 1179  CALL+2 CALL CAL+1
0079  01001100    1180         LDX      7
0073  00010111    1181         TAM                  STORE WORD
0067  01011010    1182         COMXA                ADDRESS DAM
004F  01100111    1183  CAL+1  TCY     14
001E  00011010    1184         IMAC
0050  00010111    1185         TAM
007A  00010010    1186         TMY
0075  00011011    1187         DYN
006A  00010001    1188         TMA
0057  00101001    1189  OUTSRTN TCY    9         GET LNK/EDT POINTER
002F  00010010    1190         TMY
005C  01011010    1191         COMXA                EXIT DAM
005A  01011111    1192         RETN
0070  01001110    1193         LDX      6        STORE WORD
0061  00011111    1194         TAM
0063  01011010    1195         COMXA                ADDRESS DAM
0006  00100101    1196         TCY      9
0009  00011010    1197         IMAC
001A  00010111    1198         TAM
0057  00100111    1199         TCY      14
000F  00010010    1200         TMY
0050  00101101    1201         YNEC     14         Y=14? IF YES,
003A  10111100    1179 1202    BRANCH   CALL+2      LOAD 2 MSW
0074  00100110    1203         TCY      2
0069  01010001    1204         WHIT     2
0053  01001000    1205         LDX      1
0026  00100101    1206         TCY      9
004C  00100011    1207         BL       LNKCAT2
001B  10101100    1798 1208
0031  01001100    1209  ULRN+1 LDX     3
0062  00100011    1210         TCY      13
0085  00101010    1211         TCMIY    5
000A  01000101    1212  ULRN+2 HL      CORR+1
0015  10111110    1590 1213
                  1214    *    * CALCULATES ADDRESS
                  1215    *    * LOADS CSB
0026  00110000    1216  DIBLP=1 TCMIY  0
0056  01000101    1217         BL      LOADDISP
002C  10111101    1456 1218
0056  01011111    1219  DISLP7 CALLL   SPEAK+1
0060  11000001    2416 1220
0060  01000011    1221         CALLL   TRANS=1
0041  11010011    1436 1222
0002  01001000    1223  DISLP+2 LDX    2
0005  00100111    1224         TCY     15
0008  00101010    1225         TCMIY   5
0017  01000101    1226         CALLL   CURLEVL
002F  11111111    0769 1227
0056  00110111    1228         TCMIY   14
003C  00110010    1229         TCMIY   6
007A  01000010    1230         HL      ADDLTHB
0071  10101101    0706 1231
0065  00100111    1232  DISLP=5 TCY    15
0047  01011010    1233         COMXA                ADDRESS DAM
000E  00110111    1234         TCMIY   15
0010  01011010    1235  DISPLOOP COMXA              EXIT DAM
0036  00100111    1236         TCY     14
0076  01001000    1237         LDX      3
0063  00010000    1238         SHIF     0
005A  01011111    1239         HL      DISP/KM
0036  10011100    2219 1240
006C  01011010    1241  DISLP+1 COMXA               ADDRESS DAM
0059  00100111    1242         TCY     15         LOOP
0052  00000111    1243         BMAN
```

| | | | | | | |
|---|---|---|---|---|---|---|
| 0064 | 000101111 | | 1244 | | TAM | |
| 0049 | 000110011 | | 1245 | | AMEZ | |
| 0012 | 100011101 | 1235 | 1246 | | BRANCH | DISPLOOP | * ELSE
| 0025 | 001000111 | | 1247 | | TCY | 14 |
| 004A | 010011100 | | 1248 | | LDX | 3 |
| 0014 | 010100100 | | 1249 | | RBIT | 0 |
| 0029 | 010010001 | | 1250 | | LDX | 8 |
| 0052 | 010001001 | | 1251 | | LDP | 9 |
| 0024 | 001000100 | | 1252 | | TCY | 2 |
| 0048 | 000100011 | | 1253 | | TBIT | 3 |
| 0010 | 101010011 | 1341 | 1254 | | BRANCH | LET4 |
| 0021 | 000100001 | | 1255 | | TBIT | 2 |
| 0042 | 101001010 | 1385 | 1256 | | BRANCH | RESTO2 |
| 0004 | 010000001 | | 1257 | | LDP | 8 |
| 0009 | 010010100 | | 1258 | | LDX | 2 |
| 0013 | 001001111 | | 1259 | | TCY | 15 |
| 0027 | 000101001 | | 1260 | | TMA | |
| 004F | 111101001 | | 1261 | | ALEC | 0 |
| 001C | 101110010 | 1264 | 1262 | | BRANCH | DISP8 |
| 0039 | 101101000 | 1271 | 1263 | | BRANCH | DISP5 |
| 0072 | 001100101 | | 1264 | DISP8 | TCMIY | 10 |
| 0065 | 010011000 | | 1265 | | LDX | 1 | ADDRESS RAM
| 006A | 010110010 | | 1266 | | COMXA | |
| 001A | 010000011 | | 1267 | DISP9 | CALL | TRANS-1 |
| 0020 | 110100011 | 1836 | 1268 | | | |
| 005A | 010001111 | | 1269 | | BL | ADDRESS2 |
| 0031 | 110001010 | 2057 | 1270 | DISP5 | CALL | DELAY2 |
| 0068 | 010001001 | | 1271 | | | |
| 0051 | 110100111 | 1526 | 1272 | | COMXA | |
| 0022 | 010110010 | | 1273 | | TCY | 1 |
| 0040 | 001000000 | | 1274 | | IMAC | |
| 000A | 000110010 | | 1275 | | TAMIYL | |
| 0011 | 000101101 | | 1276 | | TCMIY | 0 |
| 0023 | 001100000 | | 1277 | | ALEC | 0 |
| 0046 | 011101001 | | 1278 | | BRANCH | DISP4 |
| 000C | 101010000 | 1291 | 1279 | | TCY | 0 |
| 0017 | 001000000 | | 1280 | | TCMIY | 0 |
| 0053 | 011100010 | | 1281 | | TCMIY | 0 |
| 0066 | 001100100 | | 1282 | | | |
| 0010 | 001001010 | | 1283 | | | |
| 001A | 010101110 | | 1284 | | BRANCH | DSPH1 |
| 0055 | 111111000 | 1052 | 1285 | | | |
| 006A | 010010010 | | 1286 | | LDX | 0 |
| 0055 | 010001110 | | 1287 | | CALL | WSCRAM |
| 0024 | 111110000 | 1052 | 1288 | | | |
| 0054 | 010000100 | | 1289 | | BL | DSPELL+1 |
| 002B | 100000111 | 0345 | 1290 | | | |
| 0050 | 010010001 | | 1291 | DISP6 | CALL | DELAY2 |
| 0026 | 110100111 | 139A | 1292 | | | |
| 0040 | 100110001 | 1209 | 1293 | | BRANCH | DLRN+1 |

TABLE IX-9

| | | | | | | |
|---|---|---|---|---|---|---|
| | | | 1294 | | ORGPG | 0 |
| | | | 1295 | * | | |
| | | | 1296 | * LETTER==>TRANSFERS LETTERS TO BE SPOKEN, FROM THE CSM |
| | | | 1297 | * INTO THE LINK/EDIT AND THEN CALCULATES THE ADDRESS FOR L/E. |
| | | | 1298 | * | | |
| 0000 | 001001111 | | 1299 | LETTER | TCY | 15 |
| 0001 | 010000010 | | 1300 | | LDA | |
| 0003 | 010000111 | | 1301 | | CALL | RETURN4 |
| 0007 | 110000100 | 2113 | 1302 | | | |
| 000F | 010001000 | | 1303 | | CALL | CLEAR |
| 001F | 110111010 | 0236 | 1304 | | | |
| 005E | 001001000 | | 1305 | | TCY | 1 |
| 007F | 010110010 | | 1306 | | COMXA | |
| 007E | 001100000 | | 1307 | | TCMIY | |
| 0070 | 001001111 | | 1308 | | TCY | 15 |
| 0070 | 001101000 | | 1309 | | TCMIY | 1 |
| 0077 | 010011101 | | 1310 | LETTER+1 | LDX | 5 | * LSW-->ACC
| 006E | 001001000 | | 1311 | | TCY | 1 |
| 005E | 010000111 | | 1312 | | CALL | COMXA |
| 003E | 110011000 | 1652 | 1313 | | | |
| 007C | 001101001 | | 1314 | | TMA | | * LSW/EOI1
| 0079 | 010011110 | | 1315 | | LDX | 7 |
| 0073 | 001000000 | | 1316 | | TCY | 0 |
| 0067 | 001101101 | | 1317 | | TAM | |
| 004F | 010101100 | | 1318 | | LDX | 2 | * EO2
| 001F | 001001000 | | 1319 | | TCY | 1 |
| 0035 | 010001101 | | 1320 | | CALL | |
| 007A | 110011000 | 1632 | 1321 | | TMA | | LOAD MSW
| 0075 | 000101001 | | 1322 | | LDP | 10 |
| 0066 | 010010101 | | 1323 | | TBIT | 2 | LAST LETTER?
| 0057 | 000100001 | | 1324 | | CALL | SETBIT2 | YES, SETBIT2
| 002E | 111010011 | 1485 | 1325 | | LDP | 15 |
| 005C | 010001111 | | 1326 | | THIT | 3 | SYLLABLE?
| 003B | 000100011 | | 1327 | | CALL | SETBIT3 | SET SYLLABLE FLAG
| 0070 | 111010101 | 2291 | 1328 | | TCY | 0 |
| 0061 | 001000000 | | 1329 | | LDX | 6 |
| 0003 | 010010110 | | 1330 | | TAM | |
| 0006 | 000101111 | | 1331 | | RBIT | 2 |
| 000B | 010100101 | | 1332 | | RBIT | 3 |
| 001A | 010101111 | | 1333 | | | |
| | | | 1334 | * CALCULATE ADDRESS OF LETTER |
| 0057 | 001000100 | | 1335 | | TCY | 2 |
| 006E | 010010001 | | 1336 | | LDX | 8 |
| 0050 | 010000001 | | 1337 | | LDP | 4 |
| 005A | 000100011 | | 1338 | | TBIT | 3 | SYLLABLE?
| 0078 | 100011101 | 1235 | 1339 | | BRANCH | DISPLOOP |
| 0069 | 010000001 | | 1340 | | LDP | 9 |
| 0053 | 001000000 | | 1341 | LET4 | TCY | 0 |
| 0026 | 010010110 | | 1342 | | LDX | 6 |
| 004C | 000101001 | | 1343 | | IMA | | MULTIPLY BY 2
| 001B | 000101101 | | 1344 | | AMAAC | |
| 0031 | 000101111 | | 1345 | | TAM | |
| 0062 | 010011110 | | 1346 | | LDX | 7 |
| 0045 | 001011001 | | 1347 | | TMA | |
| 000A | 000101101 | | 1348 | | AMAAC | |

```
0015  11100010   1394  1349         CALL    TLETTER          CARRY, GO TO TLETTER
002A  00101111         1350         TAM
005A  01001110         1351         LDX     7
0500  00001001         1352         TMA
0054  00110011         1353         ALACC   12
0061  11100010   1394  1354         CALL    TLETTER
0069  00101111         1355         TAM
                       1356  * LOADS LETTER ADDRESS INTO RUM ADDR AREA (RAM)
0041  01000111         1357         CALL    SPEAK+1
0002  11000001   2410  1358
0005  00101110         1359         LDX     5                FLAG
0054  00101011         1360         TCY     15
0017  00111011         1361         TCMIY   12
002E  01001100         1362         LDX     7                FLAG
005F  01100111         1363         TCY     15
003C  00110110         1364         TCMIY   6
007A  00100000         1365         TCY     1
0071  01001101         1366         CALLL   COPXA
0063  11001100   1632  1367
0047  01000101         1368         CALL    CPLOAC
000E  11111011   1457  1369         BL      ADDCTR6
0010  01000010         1370
0034  10101001   0704  1371
0076  00100100         1372  LET+4  TCY     2
                       1373  * SPEAKS LETTER
0060  01011010         1374         COMXA
0055  01010111         1375         RBIT    3
003B  00010001         1376         1BIT    2
000C  10001010   1384  1377         BRANCH  RESTO
0059  00100100         1378         TCY     1
0032  00110010         1379         IMAC                     BUMP POINTER FOR CSB
0069  00101111         1380         TAM
0049  10111011   1314  1381         BRANCH  LETTER+1         GET NEXT LETTER--ALWAYS P.
                       1382  * RESTORE LNK/EDT POINTER AND RETURN TO CONTINUE SPEAKING
0012  01000001         1383  RESTO  BL      DISLP=5
0025  10110011   1232  1384
004A  01010101         1385  RESTO2 RBIT    2
0014  01001100         1386         LDX     2
0029  00100111         1387         TCY     15
0052  00110100         1388         TCMIY   3
0024  00100100         1389         TCY     1
0044  01011010         1390         COMXA
0010  01000101         1391         BL      HEPT2
0021  10000011   1439  1392
                       1393  * INCREMENT WHEN OVERFLOW OCCURS
0042  00101111         1394  TLETTER TAM
0004  01001110         1395         LDX     6
0009  00110010         1396         IMAC
0013  01011111         1397         RETN
0027  00000110         1398  DELAY2 CLA
004E  01001010         1399         LDX     2               DELAY BUFFER--RAM
001C  00100001         1400         TCY     8
0039  00110000         1401         TCMIY   0               CLEAR
0072  00110000         1402         TCMIY   0
0065  00110000         1403         TCMIY   0
0046  00100001         1404         TCY     8
0016  00101111         1405  DELAY2+1 TAM
0020  00110010         1406         IMAC
005A  10110010   1409  1407         BRANCH  PLUSONE
0034  10001110   1405  1408         BRANCH  DELAY2+1
006D  00101101         1409  PLUSONE TAMIYC
0051  00110010         1410         IMAC
0022  10001001   1414  1411         BRANCH  WORD3
0044  00101110         1412         TAMDYN
0060  10001110   1405  1413         BRANCH  DELAY2+1
0011  00101101         1414  WORD3  TAMIYC
0025  00110010         1415         IMAC
0046  10110110   1420  1416         BRANCH  QUIT
000C  00101110         1417         TAMDYN
0019  00000110         1418         DYN
0033  10001110   1405  1419         BRANCH  DELAY2+1
0066  01011111         1420  QUIT   RETN
                       1421  *
0045  01000111         1422  F3     CALL    FL2              STORE # OF WRONG RESPONSES
001A  11001110   1145  1423         CALL    F2LOOP
0055  01000110         1424
00BA  11110010   0972  1425         CALL    MEMADDR
0055  01000101         1426
002A  11101100   1501  1427         CALL    LOADRESS
0054  01001111         1428
0028  11100010   1121  1429         BL      FINL3
0050  01000010         1430
0020  10001010   0948  1431
```

TABLE IX-10

```
                       1432         ORGRO   10
                       1433  *
                       1434  * REPEAT ROUTINE-->REPEATS PHRASE PREVIOUSLY SPOKEN
                       1435  *         TWO REPEATS OR MORE CAUSES PHRASE TO BE SPOKEN SLOWER
                       1436  *
0008  01001110         1437  REPEAT LDX     2
0001  00100111         1438         TCY     15
0003  00110000         1439  REPT2  TCMIY   0
0007  01001100         1440         LDX     1
000F  00100101         1441         TCY     10
001F  01011010         1442  RPT+1  COMXA                    RAM REG
003F  00101001         1443         TMA                      STORE WORD-->ACC
007F  01011010         1444         COMXA                    EXIT RAM
007E  00101101         1445         TAMIYC
0070  00101111         1446         YNEC    14
007A  10001111   1442  1447         BRANCH  RPT+1
0077  01011010         1448         COMXA
006F  00100100         1449         TCY     1
005F  00110000         1450         TCMIY   0
003E  01000111         1451         BL      ADDRDS2
007C  10001010   2057  1452
                       1453  * LOADDISP-->
                       1454  * SUBROUTINE TO DISPLAY WORD BEING USED IN LEARN MODE
```

```
0079  001900000         1455   *
0073  010011100         1456   LOADDISP  TCY      0              INITIALIZE Y/POINTER
0067  000101001         1457   DPLOAD    LDX      3              TRANSFER LSW'S
004F  010011000         1458             TMA                     *
001E  000101111         1459             LDX      1              *
0030  010010100         1460             TAM                     *
007A  000101001         1461             LDX      2              TRANSFER MSW'S
0075  010010000         1462             TMA                     *
006A  000101111         1463             LDX      0              *
0057  010111111         1464             TAM                     *
002F  000100000         1465             RETN
005C  101100001  1470   1466             TBIT     0
003A  001100000         1467             BRANCH   LDONE
0070  101000011  1471   1468             TCMIY    0
0061  001101000         1469             BRANCH   LDONE+1
0043  001010001         1470   LDONE     TCMIY    1
0006  111110011  1457   1471   LDONE+1   YNEC     8
000D  010010001         1472             BRANCH   DPLOAD         NO, LOOP=ELSE,
0018  001101110         1473             LDX      8
0037  000101010         1474             TCY      7
006E  010000001         1475             TAY
0050  001011010         1476             LDP      8
003A  101011010  1219   1477             YNEC     5
0074  010000010         1478             BRANCH   DISLP7
0069  101011001  0704   1479             BL       ADDCTR6
                                1480  *
                                1481  *
                                1482  *
                                1483  *   SETBIT2 - SUBROUTINE TO USE DAM REG FOR FLAG PURPOSES
                                1484  *
0053  010110010         1485   SETBIT2   COMXR                   DAM REG
0026  001000100         1486             TCY      2
004C  010100001         1487             SBIT     2
0018  001101000         1488             TCY      1              TEST BIT 2
0031  000101010         1489             TMY
0062  010110010         1490             COMXR                   EXIT DAM
0045  010111111         1491             RETN
                                1492  *
000A  010110010         1493   SETBIT1   COMXR
0015  001001100         1494             TCY      2
002B  010100010         1495             SBIT     1
0056  010110010         1496             COMXR
002C  010111111         1497             RETN
                                1498  *
                                1499  *  MEMLOOP- LOADS ADDRESS INTO RUM ADDRESS, 4 BITS AT A TIME
                                1500  *
005A  001000011         1501   MEMADDR   TCY      12             CHIP SELECT
0030  000001101         1502             SETR
0060  001001101         1503             TCY      11             L/R = 1 (INPUT)
0041  000001101         1504             SETR                    W11 = 1
0002  001010101         1505             TCY      10
0005  000000110         1506             CLA
000A  001111100         1507             ACACC    3              FOR LOOP COUNT, ACC = 3
0017  010010100         1508             LDX      2              MEMORY FOR LOOP (SAVE ADDR)
002F  000101110         1509   MEMLOOP   TAMZA
005E  010011000         1510             LDX      1
003C  001110100         1511             ACACC    1+0
0078  000001101         1512             SETR                    LOADS COMMAND
0071  000110110         1513             RSTR                    *
0063  000101001         1514             TMA                     4 BITS OF ADDR --->ACC
0047  001111000         1515             ACACC    0
000E  000001101         1516             SETR                    LOADS DATA
001D  000110110         1517             RSTR                    *
003B  001001011         1518             TCY      13
0076  000000011         1519   SHIFTUP   XMA                     SHIFT ROUTINE        *
006D  000000100         1520             DYN                     *  SHIFT UP IN       *
005A  001011001         1521             YNEC     9              *  SAME REGISTER     *
0036  101110110  1519   1522             BRANCH   SHIFTUP        *********************
006C  001000101         1523             TCY      10             ORIGINAL WORD
0059  010010100         1524             LDX      2              REG=6
0032  000000111         1525             DMAN                    MEM=1,---> ACC LOOP
0064  101101111  1509   1526             BRANCH   MEMLOOP
0049  000101111         1527             TAM
0012  001111100         1528             ACACC    3
0025  000001101         1529             SETR
0044  000110110         1530             RSTR
0014  000000110         1531             CLA
0029  000001101         1532             SETR
0052  000110110         1533             RSTR
0024  010011000         1534   MEMDRED   LDX      ONE            * DUMMY READ TO SETUP MEMORY ADDRESS
0048  001000101         1535             TCY      TEN            **
0010  001110001         1536             ACACC    EIGHT          **
0021  000001101         1537             SETR                    **
0042  000110110         1538             RSTR                    **
0004  010111111         1539             RETN
0009  010001000         1540   MSPEL3    CALLL    CLEAR
0013  110111010  0236   1541             CALLL    DELAY2
0027  010001001         1542             CALLL    DELAY2
004E  110100111  1396   1543             BRANCH   REPEAT
001C  100000000  1437   1544
                                1545  * SPELLING IS INCORRECT
0039  010111111         1546   MISSPELL  RETN
0072  010110010         1547             COMXR
0065  001000110         1548             TCY      6              FLAG
004A  010001000         1549             LDP      1
0016  000010010         1550             TBIT     1              HIT 1-->0=FIRST TRY
0020  100001001  0304   1551             BRANCH   DUPHRASE       HIT 1-->1=SECOND TRY
005A  010100010         1552             SBIT     1              *
                                1553  * LOAD NEGATIVE RESPONSE INTO L/E
0054  010011010         1554   SCORE     LDX      4
0068  001001011         1555             TCY      13
0051  001011010         1556             IMAC
0022  000010111         1557             IAC
0044  010011100         1558             LDX      3
0008  001010011         1559             TCY      13             FLAG
0011  001100100         1560             TCMIY    2
0023  010000010         1561             CALLL    CORLEVL
0046  111101111  0764   1562
000C  000000101         1563             IYC
0019  001101110         1564             TCMIY    6
0033  010010100         1565             LDX      2              FLAG
0066  001001111         1566             TCY      15             *
004D  001100010         1567             TCMIY    4
001A  010001000         1568             BL       SPK4
```

TABLE IX-11

```
0055  101110101   0511  1569              TCMIY      0            FOR RETNSBCH
0064  001101000         1570  ADDCTR2     LDX        3
0055  010011110         1571              TCY        15
0024  001101011         1572              TCMIY      4
0054  001100010         1573              BL         CORR+1
002H  010001101         1574
0054  101111110   1540  1575
                        1576    *

1577              ORGPG      11
                        1578    *
                        1579    *   POINTERS DAM-WORD 0 ==> RANDOM WORD ENTRY POINTER
                        1580    *   POINTER DAM-WORD 1 ==> CORRECR SPELLING BUFFER POINTER
                        1581    *
0000  010010101         1582  CORRSSPL COMXB                       DAM REG-POINTER
0001  001010100         1583              TCY        0
0003  001110000         1584              TCMIY      0             ZEROS OUT POINTER
0007  001110100         1585              TCMIY      0
006F  001110110         1586              TCMIY      0
001F  001110100         1587              TCMIY      0
005E  010111010         1588              COMXB                    OUT OF DAM REG
007F  010111111         1589              RETN
007E  010001010         1590  CORR+1      CALL       CORLEVI
0070  111101111   0769  1591
0070  010101111         1592              TCY        15
0077  001101001         1593              TMA
006F  000101011         1594              AMAAC
005F  001110010         1595              ACACC      4
003E  001100010         1596              TCY        10
007C  000101111         1597              TAM
0079  010000111         1598              CALL       ADDR
0073  110001100   2139  1599
0067  010000101         1600              CALL       MEMADDR
004F  111001000   1501  1601
001E  010001110         1602              CALL       LOADRESS
0050  111001010   1121  1603
                        1604    *
                        1605    *   RESIDENT:
                        1606    *      LOOP TO TRANSFER ADDRESS FROM RESIDENT (RAM) TO ADDRESS
                        1607    *      REGION (RAM)
                        1608    *
007A  001001110         1609  RESIDENT TCY        7              OLD BLKCSB ROUTINE
0075  000000110         1610  CSB2        CLA
006B  001111000         1611              ACACC      1
0057  010011100         1612              LDX        2
002E  000101111         1613              TAM
005C  010011100         1614              LDX        3
0038  001110101         1615              ACACC      10
0070  000101100         1616              TAMDYN
0081  101111101   1610  1617              BRANCH     CSB2
0043  010011000         1618              LDX        1
0006  001000001         1619              ICY        8
0040  001100100         1620              TCMIY      2
0018  010011010         1621  ADRECALC LDX        5              LSW
0037  111001100   1651  1622              CALL       RCOMXB
006F  010101101         1623  ADD2ROM  TMA                        READY FOR ADDITION
0050  010011000         1624              LDX        1            LSW OF ROM ADDR REGION
003A  001100101         1625              TCY        10
0074  010010010         1626              CALL       ADDCARRY
0069  111011000   0112  1627
0053  010011010         1628              LDX        4
0024  001001000         1629              TCY        0            *
                        1630    *
004C  001000000         1631  RCOMXB      TCY        0
0019  010011010         1632  COMXB       COMXB
0051  010101010         1633              TCY
006?  010011110         1634              COMXB
0045  010011111         1635              RETN
000A  000101010         1636              TMA
0015  000011000         1637              LDX        1            ROM ADDR REGION
002H  001001011         1638              TCY        11
0054  010101010         1639              CALL       ADDCARRY
002C  111011100   0112  1640
0050  001101001         1641              TCY        4            *
0050  001000111         1642              CMAN                    ADD2ROM TO BE EXECUTED TWICE
0060  000101111         1643              TAM                     *
0041  001011011         1644              MNEZ
0002  100011011   1621  1645              BRANCH     ADRECALC
0005  010000101         1646              CALL       MEMADDR
0004  111011000   1501  1647
0017  010001110         1648              CALL       LOADRESS
002F  111000010   1121  1649
005E  010000101         1650              CALL       MEMADDR
005F  111011000   1501  1651
                        1652    *
0076  010000011         1653              BL         OUTADDR
0071  100001010   1723  1654
                        1655    *
0063  000101111         1656  TONE22   TAM
0047  010011000         1657  TONES    CALL       CORLEVI
000F  111101111   0769  1658
0010  001101001         1659              TCMIY      0
003E  001101110         1660              TCMIY      7
007E  010011100         1661              LDX        3
006D  001100100         1662              TCY        8
0051  010101010         1663              MBIT       0
0036  010101111         1664              BBIT       3
006C  000101001         1665              TMA
0059  010011000         1666              LDX        1
0032  011101001         1667              TCY        10
006D  001001001         1668              AMAAC
0089  100101100   1616  1669              BRANCH     TONCARRY
0012  010001111         1670  TONES    TAM
0025  010011111         1671              LDX        2
000A  011011111         1672              TCY        15
0019  001101110         1673              TCMIY      2
0029  010001110         1674              BL         ADDCTRO
0052  111101001   0750  1675
0020  010101101         1676  TONCARRY TAMIYC
000D  010011110         1677              IAC
0015  010011111         1678              IAC
```

```
0021  100010010  1670  1679            BRANCH   TONE3
0042  001001110        1680  NXTTONE   TCY      7
0004  010010001        1681            LDX      8
0009  000101010        1682            THY
0015  001011010        1683            YNEC     5
0027  101100101  1669  1684            BRANCH   CRY24
004E  010010100        1685            LDX      2
001C  001001111        1686            TCY      15
0039  001101110        1687            TCMIY    7
0072  101001011  1692  1688            BRANCH   TONESCOR
0065  001100000        1689  CRY24     TCMIY    0
                             1690  *   RETURN TO ROUTINE
                             1691  *
0048  010010001        1692  TONESCOM  LDX      8
0016  001000001        1693            TCY      8
0020  000100001        1694            TBIT     2
005A  101010001  1698  1695            BRANCH   TON12
0050  010001111        1696            HL       DISP/KB
006B  100101100  2219  1697
0051  010010100        1698  TON12     LDX      2
0022  001000111        1699            TCY      14
0044  000000111        1700            DMAN
0008  101110011  1656  1701            BRANCH   TONE22
0011  010010001        1702            LDX      8
0023  001000101        1703            TCY      8
0046  010100101        1704            KBIT     2
000C  010011010        1705            LDX      5
0019  001001011        1706            TCY      13
0033  000101001        1707            IMA
0066  010011000        1708            LDX      1
0040  010000110        1709            LDP      6
001A  011101001        1710            ALEC     9
0035  101101100  0969  1711            BRANCH   F5
006A  010001010        1712            CALL     CURLEVL
0055  111100111  0769  1713
002A  001100110        1714            TCMIY    6
0054  001100110        1715            TCMIY    7
0028  010000010        1716            HL       ADDCTR6
0050  101011001  0704  1717
```

TABLE IX-12

```
                             1718            ORGPG    12
                             1719  *
                             1720  *   OUTADDR-
                             1721  *       LOADS CORRECT SPELLING BUFFER WITH ACTUAL SPELLING CODE
                             1722  *
0000  010001110        1723  OUTADDR   CALL    OUTADDR2
0001  111000001  1083  1724
0003  010001100        1725            LDX     3
0007  001001000        1726            TCY     1
000F  010001101        1727            CALL    COMXB
001F  110011000  1652  1728
005F  000010111        1729            TAM
007F  010001110        1730            CALL    OUTADDR2      PDC FOR OUTPUT COMMAND
007E  111000001  1083  1731
007C  010010100        1732            LDX     2
007A  001001000        1733            TCY     1
0077  010001101        1734            CALL    COMXB
006F  110011000  1652  1735
005F  010000101        1736            LDP     10
005F  000101111        1737            TAM
007C  000100001        1738            TBIT    2             END OF SPELLING?
0079  110001010  1493  1739            CALL    SETBIT1
0073  010000011        1740            LDP     12
0067  001011010        1741            COMXB
004F  001001100        1742            TCY     1
001E  000110010        1743            IMAC                  INCREMENT COR SPEL POINTER
0010  000101111        1744            TAM
007A  001001000        1745            TCY     2
0075  000100010        1746            TBIT    1             TEST FLAG
0009  100111000  1751  1747            BRANCH  LNKSET
0057  100101110  1749  1748            BRANCH  EXDAM2
002E  010011010        1749  EXDAM2    COMXB
005C  110000010  1765  1750            BRANCH  OUTADDR       ADDR==> ALWAYS BRANCH
0038  000001110        1751  LNKSET    CLA
0072  001001001        1752            TCY     9
0061  010001000        1753            LDX     1
0043  000101111        1754  LNKSET+3  TAM
0000  010001110        1755            CALL    OUTADDR2      PDC FOR OUTPUT 4 BITS
0600  111000001  1083  1756
0015  010000101        1757            LDP     10
0057  011000000        1758            ALEC    0
000E  110101011  1005  1759            CALL    SETBIT2
0050  010000011        1760            LDP     12
005A  011000000        1761            ALEC    0
0074  101001100  17nn  1762            BRANCH  LNKON
0067  010000101        1763            LDP     10
0053  011101000        1764            ALEC    1
0026  110001010  1493  1765            CALL    SETBIT1
004C  010000011        1766  LNKON     CALL    LNKPTR2
0018  111011110  1785  1767
0051  010001110        1768            CALL    OUTADDR2      PDC
0062  111000001  1083  1769
0045  010000010        1770            LDP     4
000A  001111111        1771            ACACC   15
0015  110011001  0745  1772            CALL    TSTBIT2
002B  001111000        1773            ACACC
005B  010000111        1774            CALL    LNKPTR
002C  111101000  2130  1775
0058  000110010        1776            IMAC
0056  000101111        1777            TAM
0060  010001110        1778            CALL    OUTADDR2      PDC'S
0041  111000001  1083  1779
0002  010000010        1780            LDP     4
0005  001111111        1781            ACACC   15
006E  110001100  0745  1782            CALL    TSTBIT2
0017  010000011        1783            LDP     12
002F  001111000        1784            ACACC   1
0065  010001100        1785  LNKPTR2   LDX     1
005F  001001001        1786            TCY     9
007E  000101010        1787            THY
0071  010011110        1788            LDX     7
```

```
0045  1101011111         1749            TAM                  STORE WORD
0047  001100101          1790            TCY       10         K10
000E  01011111           1791            RETN
0030  01000110           1792            CALL      OUTADDR2
005F  11100001   1883    1793
0076  01110000           1794            ALEC      0
0060  111101100  1861    1795            BRANCH    LNKEND
0055  01000111           1796   LNKCNT   CALL      LNKPTR
003A  11110100   2156    1797
006C  00010010           1798   LNKCNTS  TMAC
0059  10101010   1813    1799            BRANCH    ENDSPEL      GO TO ENDSPEL
0032  10100011   1756    1800            BRANCH    LNKSET+1     ELSE
0067  11110010           1801   LNKEND   COMXB
0043  00100010           1802            TCY       7
0012  00010001           1803            TMIT      1
0025  10001100   1814    1804            BRANCH    ENDSPELL1
004A  00010001           1805            TMIT      2
0014  10101010   1808    1806            BRANCH    LNK4
0029  10101011   1796    1807            BRANCH    LNKCNT
0052  00010000           1808   LNK4     TMIT      0
0024  10001001   1853    1809            BRANCH    F9
0048  10101000           1810            SBIT      0
0017  01000101           1811            HL        CALADDR
0021  11000000           1812
0042  01011010           1813   ENDSPEL  COMXB                  ADDRESS DAM
0009  00100010           1814   ENDSPEL1 TCY       2
0004  00110000           1815            TCMIY     0
0013  01001100           1816            LDA       3
0027  00100111           1817            TCY       13
000F  00010001           1818            TMA
001C  01000111           1819            LDP       14
0039  01110100           1820            ALEC      3
0072  10000000   2069    1821            BRANCH    SPEAK
0065  01000011           1822            LDP       12
0049  01110010           1823            ALEC      4           'SPELL'
0015  10101010   1847    1824            BRANCH    USPELL3
0020  01000001           1825            LDP       9
005A  01110101           1826            ALEC      5           'SAY IT'
0034  10101011   1215    1827            BRANCH    DISLP-1
0069  01000100           1828            LDP       3
0051  01110111           1829            ALEC      14
0022  11101111   0501    1830            BRANCH    HANG
0049  11100111           1831            HL        DISP/KB
0005  10001110   2219    1832
0011  01011010           1833   F9       LDX       0
                         1834   * TRANS-->STORES CALCULATED ADDRESS IN DAM FOR USE IN LINK/EDIT
                         1835   *
0025  00100101           1836   TRANS-1  TCY       10
0016  00100011           1837   TRANS    TBR                    LOAD ACC
000C  01001110           1838            COMXB
0014  00010111           1839            TAMIYC
0035  00010010           1840            COMXB
006C  00101111           1841            YNEC      14
0090  10100011   1857    1842            BRANCH    TRANS
001A  01011111           1843            RETN
0045  01011010           1844            COMXB
006A  01000001           1845            HL        CALADDR
0055  10100000   1154    1846
002A  01000111           1847   USPELL3  CALL      SPEAK+1
0054  11100011   2010    1848
002A  01000111           1849            CALL      TRANS-1
0050  11010011   1836    1850
0020  01000111           1851            HL        SPEAK
0040  10000000   2009    1852

TABLE IX-13
                         1853            ORGPG     13
                         1854   *
                         1855   *
                         1856   *
                         1857   *  THE FOLLOWING ROUTINE DIRECTS THE PROGRAM FLOW ACCORDING TO THE
                         1858   *  KEY PRESSED.
                         1859   *
0060  00010010           1860   KEY00    TMIT      1
0001  10011011   1933    1861            BRANCH    KEY2
0003  01001001           1862   KEY0     LDX       8           * LETTER KEYS
0007  00100001           1863            TCY       9
0006  00010010           1864            TMIT      1           TEST GO FLAG
001F  10101111   1875    1865            BRANCH    TRANSFER
003F  00100110           1866            TCY       7
0076  00010001           1867            TMIT      2           TEST FOR MODE OTHER THAN SPELL
                         1868   *                              * OR LEARN
007E  10101111   1875    1869            BRANCH    TRANSFER
0070  01110100           1870            ALEC      3           A,B,C,D?
0078  10110001   1892    1871            BRANCH    KEY12
0077  01000101           1872   KEY13    HL        DIFFSLV     CHANGE LEVEL IN DISPLAY
006F  11111110   0629    1873
                         1874   *
005F  00100110           1875   TRANSFER TCY       7
005F  01001000           1876            LDX       8
007C  00010101           1877            TMY
0079  00101010           1878            YNEC      5
0073  10101111   1882    1879            BRANCH    TRANS3
0067  01000110           1880            HL        NOTRANS
000F  10101111   0880    1881
001E  00100110           1882   TRANS3   TCY       15
0030  01001000           1883            LDX       0
0074  00010001           1884            TMA
0075  00100111           1885            TCY       11
006B  00010101           1886            TMY
0057  01001010           1887            LDP       1
002F  00101110           1888            YNEC      8
005C  10000000   0193    1889            BRANCH    NOTFULL
003A  01001011           1890            LDP       13
0070  10000100   1946    1891            BRANCH    NOP
0061  00100111           1892   KEY12    TCY       15           * STORE
0043  01001000           1893            LDX       1            * NEW
0008  00010111           1894            TAM                    * DIFFICULTY LEVEL
0000  10111111   1872    1895            BRANCH    KEY13
0014  01110101           1896   KEY1     ALEC      10           * MSD=1
```

```
0037  101000111  1930  1897         BRANCH  KEY15
006E  011100111        1898         ALEC    14
0050  101101001  1902  1899         BRANCH  KEY7
003A  010000010        1900         BL      GAME#2       KEY=1F * CODEBREAKER
0074  100000000  0620  1901
006V  011101011        1902  KEY7   ALEC    13
0053  100011000  1906  1903         BRANCH  KEY8
0026  010001100        1904         BL      GAME#1       KEY=1E * HANGMAN
004C  100000000  0479  1905
0018  010010001        1906  KEY8   LDX     8
0031  001001110        1907         TCY     7
0062  001101010        1908         TMY                  PUT MODE # IN Y
0045  011101101        1909         ALEC    11
000A  101001001  1918  1910         BRANCH  KEY14
0015  001011010        1911         YNEC    5            * CHECK MODE --
0024  100101100  1914  1912         BRANCH  K10A         * IGNORE ERASE AND
0056  100010101  1946  1913         BRANCH  NOP
002C  001000001        1914  K10A   TCY     8
005B  000100010        1915         TBIT    1            TEST GO FLAG
0050  100001101  1921  1916         BRANCH  KEY10
0060  100010100  1946  1917         BRANCH  NOP
0041  010001110        1918  KEY14  BL      NOP
0002  101010101  1153  1919
                       1920    *                         * HANGMAN MODE
0005  011100011        1921  KEY10  ALEC    12
0008  100010001  1974  1922         BRANCH  ERASE        KEY=1C * ERASE
0017  001001110        1923         TCY     7
002E  000101010        1924         TMY
005F  001011110        1925         YNEC    7            * IGNORE ENTER
003C  101110001  1928  1926         BRANCH  KEY9         * IN RANDOM LETTER
007A  100010100  1946  1927         BRANCH  NOP          * MODE
0071  010001000        1928  KEY9   BL      ENTER        KEY=10 * ENTER
0063  101011010  0254  1929
0047  000101011        1930  KEY15  TYA                  PUT 15 IN ACC
000E  010001011        1931         BL      KEY0         * LETTERS O-Z
0010  100000011  1662  1932
003A  010010001        1933  KEY2   LDX     8            MSD=2
0076  001001110        1934         TCY     7
006D  011101100        1935         ALEC    3
005A  101010010  1949  1936         BRANCH  KEY3
003B  011100110        1937         ALEC    6
006C  101110010  1962  1938         BRANCH  KEY6
0059  000101010        1939         TMY                  PUT MODE IN Y
0032  001101010        1940         YNEC    5            * IGNORE CLUE
0064  100010100  1946  1941         BRANCH  NOP          * KEY UNLESS
0049  010001110        1942         LDP     6
0012  001000001        1943         TCY     8            * IN HANGMAN MODE
0025  000100010        1944         TBIT    1            * AND GO FLAG
0044  101110000  0923  1945         BRANCH  CLUE
0014  010001111        1946  NOP    BL      DISP/KB      * ENTER KEYS IN
0029  100101100  2219  1947
                       1948    *                         KEY=27 * CLUE
0052  011100100        1949  KEY3   ALEC    2
0024  100101001  1955  1950         BRANCH  KEY4
0048  010000001        1951         BL      OFF          KEY=23 * OFF
0010  101110001  0124  1952
0021  011101000        1953  KEY4   ALEC    1
0042  100010011  1957  1954         BRANCH  KEY5
0004  010000100        1955         BL      SPELL
0009  100010001  0462  1956
0015  010000001        1957  KEY5   LDP     0
0027  011100000        1958         ALEC    0
004E  101001001  0142  1959         BRANCH  GAME#3       KEY=20 * RANDOM LETTER
001C  010001100        1960         BL      LEARN        KEY=21 * LEARN
0039  100011001  0466  1961
0072  000100001        1962  KEY6   TBIT    2            * TEST FOR MODES OTHER
0065  100010100  1946  1963         BRANCH  NOP          * THAN SPELL OR LEARN
004B  011100010        1964  K16    ALEC    4
0016  101000100  1972  1965         BRANCH  K17
0020  001000001        1966         TCY     8
005A  000100010        1967         TBIT    1            GO FLAG
0034  100001100  1977  1968         BRANCH  K19
0068  011101010        1969         ALEC    5            REPLAY?
0051  101001101  1981  1970         BRANCH  K23
0022  100010100  1946  1971         BRANCH  NOP
0044  010001000        1972  K17    BL      GO           KEY=24 * GO
000B  101111100  0213  1973
0011  010001010        1974  ERASE  CALL    CLEAR
0023  110111010  0235  1975
0046  100010100  1946  1976         BRANCH  NOP
000C  011101010        1977  K19    ALEC    5
0014  100100000  1990  1978         BRANCH  K21
0033  010001010        1979         BL      REPEAT
0066  100000000  1437  1980
0040  010001000        1981  K23    LDX     0
0014  001000000        1982         TCY     0
0035  000110011        1983         MNEZ
006A  100101010  1986  1984         BRANCH  K20
0055  100010100  1946  1985         BRANCH  NOP
002A  010011000        1986  K20    LDX     1
0054  011110001        1987         ACALC   8            ACC=13 AFTER THIS INSTRUCTION
0028  000001001        1988         MNEA
0050  100010100  1946  1989         BRANCH  NOP
0020  010001000        1990  K21    BL      REPLAY
0040  100101100  0250  1991
```

TABLE IX-14

```
1992         ORG.PG    14
1993  ****************************************************************
1994  * SPEAK                                                          *
1995  * ROUTINE TO CONTROL SPEECH TO AND FROM SYNTHESIZER              *
1996  *                                                                *
1997  * IF SS=SET, SPEAK WAS CALLED                                    *
1998  * IF SS=RESET, REMADDR WAS CALLED                                *
1999  *                                                                *
2000  * IF SS=1, ADDRESSES ARE TRANSFERED FROM FILES 6 AND 7 TO FILE   *
2001  * 1, WORDS 10-13, ELSE IF SS=0, ADDRESS IS IN FILE 1 PRIOR TO CALL*
2002  *                                                                *
2003  * 2 POINTERS USED                                                *
2004  *   1) LINK/EDIT POINTER FOR WORDS IN FILES 6 AND 7              *
2005  *   2) ROM ADDR POINTER FOR WORDS IN FILE 1.                     *
2006  *                                                                *
2007  ****************************************************************
2008  *
```

```
0000  01011111             2009  SPEAK    SBAC
0001  01001100             2010  SPEAK+1  LDX     1
0003  00100000             2011           TCY     M                    INITIALIZE ROM ADDR POINTER
0007  00110101             2012           TCMIY   10                   INITIALIZE LNK/EOT POINTER
000F  00110000             2013           TCMIY   0
001F  00100001             2014  SPKLOP+1 TCY     9
005F  00101010             2015  SPKLOOP  TMY
007E  10011110             2016           LDX     7                    GET WORD FROM LNK/EOT
007E  00101001             2017           TMA                          LOAD WORD IN ACC
007F  01001100             2018           LDX     1                    POINTER
007A  00100001             2019           TCY     M                    *
0077  00101000             2020           TMY                          *
006F  00101111             2021           TAM                          STORE WORD
005F  00100001             2022           TCY     M                    BUMP POINTER
005F  00110010             2023           IMAC                         *
0070  00101111             2024           TAM                          *
0079  00100001             2025           TCY     9                    GET FILE FOR NEXT WORD
                           2026           TMY
0067  00101010             2027           CPMA                         FILE 0
004F  00101001             2028           TMA                          WORD-->ACC
001F  00101010             2029           CPMA                         FILE 1
0010  00100001             2030           TCY     M                    POINTER
007A  00101010             2031           TMY                          *
0075  00101111             2032           TAM                          STORE WORD
006F  00100001             2033           TCY     M                    BUMP LNK/EOT POINTER
0057  00110010             2034           IMAC                         IF > 15, RETURN
002E  10010001       2111  2035           BRANCH  RETURN
005C  00101111             2036           TAM                          STORE INCREMENT
003B  00100001             2037           TCY     8                    BUMP ROM AREA POINTER
0070  00110010             2038           IMAC                         *
0061  00101110             2039           TAMZA                        
0043  00101010             2040           TMY
0006  00101111             2041           YNEC    14                   IS Y = 14?
0000  10011111       2014  2042           BRANCH  SPKLOP+1             
001A  01011111             2043           RETN
0037  01100101             2044           TCY     10                   YES, CONTINUE
006E  01100111             2045  ADDWDS   LDX     14
005D  00010101             2046           AMAAC
003A  10000010       2057  2047           BRANCH  ADDWDS2
0074  01000111             2048           LDP     10
0069  00000101             2049           TYC                          LOOP COUNT
0053  00101011             2050           YNEC    14                   *
0026  10101110       2045  2051           BRANCH  ADDWDS               *
004C  01110100             2052           ALEC    1
001A  10010001       2111  2053           BRANCH  RETURN               IF YES, RETURN
0031  01000001             2054           LDP     9
0062  01110100             2055           ALEC    2                    ACC-->2?
0045  10010001       1244  2056           BRANCH  LETTER
000A  01000101             2057  ADDWDS2  CALL    MEMADDR
0015  11101100       1501  2058
                           2059  * ROM ADDRESSING SUBROUTINES
                           2060  * ASSUMES X AND Y HAVE BEEN DEFINED PRIOR TO CALLING
                           2061  *
                           2062  *
                           2063  * LOADS ADDRESS INTO ROM ADDRESS AREA
                           2064  * ALL R LINES, ETC.... REMAIN THE SAME AS WHEN
                           2065  * ENTERING SUBROUTINE.
                           2066  *
                           2067  *********************************************************
                           2068  *
                           2069  *
                           2070  * END OF ROUTINE
                           2071  *
002H  00100011             2072  MEMADDR2 TCY     12                   CS , GIVING SYN. COMMANDS
0056  00000101             2073           SETR                         R12 = 1
002C  00000110             2074           CLA
005H  00111101             2075  SPKREG   ACACC   TEN
0030  00100101             2076           TCY     10
0060  00001101             2077           SETR
0041  00011110             2078           RSTR                         *
0002  00000110             2079  SPKREG+1 CLA
0005  00100011             2080           TCY     12
000B  00000101             2081           SETR
0017  00100101             2082           TCY     10
002F  00111101             2083           ACACC   14
005E  00001101             2084           SETR                         1ST PDC LOADS COMMAND
003C  00110110             2085           RSTR                         *
0078  00100101             2086           TCY     11
0071  00110110             2087           RSTR
0063  00100101             2088           TCY     10
0047  00000101             2089           SETR                         2ND PDC APPLIES TALK TO CTL8
000E  00110110             2090           RSTR                         *
001D  00110000             2091           ACACC   0
003A  00101010             2092           TMA
0076  00001101             2093           SETR                         3RD PDC RELEASES OUTPUT
006D  00110110             2094           RSTR                         *
0054  00100101             2095           TCY     11
0056  00001101             2096           SETR
006C  01001100             2097           LDX     3
0059  00100111             2098           TCY     15
0032  00101111             2099           TAM
0060  00010000             2100           TMIT    0
0049  10101010       2125  2101           BRANCH  BITSE10
0012  01001100             2102           LDX     1
0025  00100001             2103           TCY     8
0044  00100101             2104           TCMIY   10
0014  00010010             2105           CCLA
0029  01110000             2106           ALEC    ZERO
0052  10101000       2109  2107           BRANCH  RETS
0026  10011111       2014  2108           BRANCH  SPKLOP+1
004B  01001100             2109  RETS     LDX     1
0010  00100001             2110           TCY     8
0021  00101110             2111  RETURN   TAMZA                        ACC = ZERO
0042  00100111             2112           TCY     15
0064  01001110             2113  RETURN4  LDX     SIX
0009  00101111             2114           TAM
0053  01001100             2115           LDX     SEVEN
0027  00101010             2116           TAMDYN
006E  10010100       2115  2117           BRANCH  RETURN4
```

```
001C  010111111        2118              RETN
0039  010110100        2119  RETURN+1    REAC
0072  001001111        2120  RETURN+2    TCY       15              TALK BIT
0065  010011100        2121              LDX       3               *
004B  010100100        2122              XMIT      0               *
0016  010000010        2123              BL        RETNSBCH
002D  101001010  0710  2124
005A  010001111        2125  BITSET0     LDP       15
0034  100101100  2219  2126              HBRANCH   DISP/KB
                       2127  *
                       2128  *           END OF SPEECH CONTROL SUBROUTINE
                       2129  *
0068  010011000        2130  LNKPTR      LDX       1               POINTER FOR LNK/EOT
0051  001001001        2131              TCY       9               *
0022  000101010        2132              TMY                       *
0044  010010110        2133              LDX       6
000B  000101111        2134              TAM                       STORE WORD
0011  010011000        2135              LDX       1               POINTER
0023  001001001        2136              TCY       9               *
0046  010111111        2137              RETN
                       2138  *
000C  001000110        2139  ADDB        TCY       6
0019  010010001        2140              LDX       8
0033  000100011        2141              TBIT      3
0066  100011010  2144  2142              HBRANCH   RADDB
004D  101010101  2147  2143              HBRANCH   RADD2
001A  010011000        2144  RADDB       LDX       1
0035  001001011        2145              TCY       13
0064  001100101        2146              TCMIY     H
0055  010111111        2147  RADD2       RETN
```

TABLE IX-15

```
                       2148              ORGPG     15
                       2149  *
                       2150  *                     POWER UP / CLEAR ROUTINE
                       2151  *
                       2152  *           THIS ROUTINE SETS UP INITIAL CONDITIONS IN RAM
                       2153  *
                       2154  *
                       2155  *
0000  001001111        2156  START       TCY       FIFTEEN         * RESET ALL R-LINES
0001  000110110        2157  LOOPSST     RSTR                      **
0003  000000100        2158              DYN                       **
0007  100000001  2157  2159              BRANCH    LOOPSST         **
000F  001001011        2160              TCY       13
001F  000001101        2161              SETR
003F  001001111        2162              TCY       15
007F  010111111        2163              RETN                      **
007E  000000110        2164              CLA                       **
007D  010010001        2165              LDY       H
007B  110101110  2183  2166              CALL      FILSLOOP        **
0077  010011110        2167              LDX       SEVEN           **
006F  110101110  2183  2168              CALL      FILSLOOP        **
005F  010010110        2169              LDX       SIX             **
005E  110101110  2183  2170              CALL      FILSLOOP        **
007C  010011010        2171              LDX       FIVE            **
0079  110101110  2183  2172              CALL      FILSLOOP        **
0073  010010010        2173              LDX       FOUR            **
0067  110101110  2183  2174              CALL      FILSLOOP        **
004F  010011100        2175              LDX       THREE           **
001E  110101110  2183  2176              CALL      FILSLOOP        **
003D  010010100        2177              LDX       TWO             **
007A  110101110  2183  2178              CALL      FILSLOOP        **
0075  010011000        2179              LDX       ONE             **
006B  110101110  2183  2180              CALL      FILSLOOP        **
0057  010010000        2181              LDX       ZERO            **
                       2182  *
002E  000101100        2183  FILSLOOP    TAMDYN                    * ROUTINE FILLS FILE WITH CONTENTS
005C  100101110  2183  2184              BRANCH    FILSLOOP        **OF ACC.
003B  010111111        2185              RETN                      **
                       2186  *
                       2187  *
0076  010001000        2188  DSP7        CALLL     CLEAR
0061  110111010  0236  2189
                       2190  *
0043  010000010        2191              CALLL     DIFFSLV         * DISPLAY DIFF LEVEL A - SPELL MODE
0006  111111110  0629  2192
000D  000000110        2193              CLA
001B  001001101        2194              TCY       11
0037  000110110        2195              RSTR
006E  001000011        2196              TCY       12
005D  000001101        2197              SETR
003A  001000101        2198              TCY       10
0074  000000101        2199              SETR
0069  000110110        2200              RSTR
0053  000001101        2201              SETR
0026  000110110        2202              RSTR
004C  001001101        2203              TCY       11
001A  000001101        2204              SETR
0051  001000101        2205              TCY       10
0062  000000101        2206              SETR
0045  000110110        2207              RSTR
000A  010000101        2208              CALLL     MEMREU
0015  110100100  1534  2209
002B  010001101        2210              BL        TONES
0056  101000111  1657  2211
                       2212  *
                       2213  *
                       2214  *                     KEYBOARD SCAN / DISPLAY ROUTINE
                       2215  *
                       2216  *           THIS ROUTINE DISPLAYS THE CONTENTS OF 'DISPLAY BUFFER' AND
                       2217  *           CHECKS FOR A KEYPRESS.
                       2218  *
002C  010011100        2219  DISP/KB     LDX       3
0058  001001101        2220              TCY       11
0030  001100000        2221              TCMIY     0               RESET TIMEOUT COUNTER
0060  000110110        2222              RSTR                      RESET R12 TO ENABLE DISPLAY
0041  001100000        2223              TCMIY     0
0002  000000110        2224              CLA
0005  001000011        2225  DSP1        TCY       12
0008  010010000        2226              LDX       0
0017  000101101        2227              TAMIYC                    STORE DEBOUNCE COUNTER; SET Y=0
002F  001100000        2228              TCMIY     0               RESET R-LINE POINTER
```

TABLE X

| $I_0$ | $I_1$ | |
|---|---|---|
| 0 | 0 | No Operation |
| 0 | 1 | Load Address (LA) |
| 1 | 0 | Transfer Bit (TB) |
| 1 | 1 | Read and Branch (RB) |

I₀/I₁ COMMANDS

TABLE XI

Counter 619/PLA 620 Timing Sequence

| STEP | COUNTER CONTENTS (HEX) | SIGNALS GENERATED |
|---|---|---|
| 1 | 0 | $\overline{LA1}$, TB8 |
| 2 | 8 | $\overline{LA2}$ |
| 3 | C | $\overline{LA3}$ |
| 4 | E | $\overline{LA4}$ |
| 5 | F | |
| 6 | 7 | |
| 7 | 3 | |
| 8 | 1 | |

TABLE XII

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 10 | F | SAD, INC |
| 2 | 10 | E | DC, INC |
| 3 | 10 | C | DC, INC |
| 4 | 10 | 8 | DC, INC |
| 5 | 10 | 0 | DC, INC |
| 6 | 10 | 1 | DC, INC |
| 7 | 10 | 3 | SAM, DC, INC |
| 8 | 10 | 7 | PC, $\overline{ZERO}$ |

TABLE XIII

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 11 | F | SAD, INC |
| 2 | 11 | E | DC, INC |
| 3 | 11 | C | DC, INC |
| 4 | 11 | 8 | DC, INC |
| 5 | 11 | 0 | DC, INC |
| 6 | 11 | 1 | DC, INC |
| 7 | 11 | 3 | SAM, DC, INC |
| 8 | 11 | 7 | PC |
| 9 | 01 | F | SAD, TF |

TABLE XIII-continued
TB8 READ SEQUENCE

| STEP | COUNTER 623 CONTENTS (BINARY) | COUNTER 624 CONTENTS (HEX) | SIGNALS GENERATED |
|---|---|---|---|
| 10 | 01 | E | BR, PC |
| 11 | 01 | C | BR, DC |
| 12 | 01 | 8 | BR, DC |
| 13 | 01 | 0 | BR, DC |
| 14 | 01 | 1 | DC |
| 15 | 01 | 3 | SAM, DC |
| 16 | 01 | 7 | PC |
| 17 | 00 | F | SAD, TF |
| 18 | 00 | E | BR |
| 19 | 00 | C | BR |
| 20 | 00 | 8 | BR |
| 21 | 00 | 0 | |
| 22 | 00 | 1 | |
| 23 | 00 | 3 | |
| 24 | 00 | 7 | PC |
| 25 | 10 | F | SAD, INC |
| 26 | 10 | E | DC, INC |
| 27 | 10 | C | DC, INC |
| 28 | 10 | 8 | DC, INC |
| 29 | 10 | 0 | DC, INC |
| 30 | 10 | 1 | DC, INC |
| 31 | 10 | 3 | SAM, DC, INC |
| 32 | 10 | 7 | PC, $\overline{\text{ZERO}}$ |

What is claimed is:

1. A method of decoding encoded variable frame length data being coupled to a speech synthesis circuit from a memory means storing said encoded variable frame length data, each frame including at least one encoded parameter and a majority of the frames including a plurality of encoded parameters, the method comprising the steps of:
    (a) generating a frame timing signal indicative of the start of a new frame of data;
    (b) generating a parameter timing signal indicative of the start of a new encoded parameter;
    (c) loading a new encoded parameter from said memory means into an input register associated with said speech synthesis circuit in timed relation with said parameter timing signal unless inhibited by an inhibit signal;
    (d) testing the first encoded parameter loaded into said input register after the occurrence of said frame timing signal to determine whether said first encoded parameter is a preselected code; and
    (e) generating said inhibit signal until the next frame of data is ready to be inputted into said input register as determined by the occurrence of said frame timing signal if said first encoded parameter is in the preselected code.

2. The method according to claim 1, wherein the second encoded parameter in a frame is also indicative of the length of said frame and further including the steps of:
    (a) testing the second encoded parameter loaded into said input register after the occurrence of said frame timing signal to determine whether said second encoded parameter is a preselected code; and
    (b) when said second encoded parameter is a preselected code, generating said inhibit signal:
        (i) after at least three of said encoded parameters have been inputted to said speech synthesis circuit via said input register, and
        (ii) until the next frame of data is ready to be inputted into said input register as determined by the occurrence of said frame timing signal.

3. The method according to either claim 1 or 2, wherein a repeat bit is included among said encoded parameters in each frame of data having a plurality of encoded parameters and further including the steps of:
    (a) testing the state of said repeat bit; and
    (b) when said repeat bit is of a preselected state, generating said inhibit signal:
        (i) after at least two of said encoded parameters have been inputted to said speech synthesis circuit via said input register; and
        (ii) until the next frame of data is ready to be inputted into said input register as determined by the occurrence of said frame timing signal.

4. A method of decoding encoded variable frame length data being coupled to a speech synthesis circuit from a memory means storing said encoded variable frame length data, each frame including at least one encoded parameter and a majority of the frames including a plurality of encoded parameters, the second encoded parameter in a frame being indicative of the length of said frame, the method comprising the steps of:
    (a) generating a frame timing signal indicative of the start of a new frame of data;
    (b) generating a parameter timing signal indicative of the start of a new encoded parameter;
    (c) loading encoded parameters from said memory means into an input register associated with said speech synthesis circuit in timed relation with said parameter timing signal unless inhibited by an inhibit signal;
    (d) testing the second encoded parameter loaded into said input register after the occurrence of said frame timing signal to determine whether said second encoded parameter is a preselected code; and
    (e) generating said inhibit signal:
        (i) after a plurality of said encoded parameters have been inputted to said speech synthesis circuit via said input register; and
        (ii) until the next frame of data is ready to be inputted into said input register as determined by the occurrence of said frame timing signal.

5. The method according to claim 4, wherein a repeat bit is included among said encoded parameters in each frame of data having a plurality of encoded parameters and further including the steps of:
    (a) testing the state of said repeat bit; and
    (b) when said repeat bit is of a preselected state, generating said inhibit signal:
        (i) after at least two of said encoded parameters have been inputted to said speech synthesis circuit via said input register; and
        (ii) until the next frame of data is ready to be inputted into said input register as determined by the occurrence of said frame timing signal.

6. The method according to either claim 4 or 5, further including the steps of:
    (a) testing the first encoded parameter loaded into said input register after the occurrence of said frame timing signal to determine whether the first encoded parameter is a preselected code; and
    (b) generating said inhibit signal until the next frame of data is ready to be inputted into said input register as determined by the occurrence of said frame timing signal when said first encoded parameter is the preselected code.

7. A method of decoding encoded variable frame length data being coupled to a speech synthesis circuit from a memory means storing said encoded variable frame length data, each frame including at least one encoded parameter and a majority of frames including a plurality of encoded parameters and a repeat bit, the method comprising the steps of:
  (a) generating a frame timing signal indicative of the start of a new frame of data;
  (b) generating a parameter timing signal indicative of the start of a new encoded parameter;
  (c) loading a new encoded parameter from said memory means into an input register associated with said speech synthesis circuit in timed relation with said parameter timing signal unless inhibited by an inhibit signal;
  (d) testing the state of said repeat bit; and
  (e) when said repeat bit is of a preselected state, generating said inhibit signal:
    (i) after at least two of said encoded parameters have been inputted to said speech synthesis circuit via said input register; and
    (ii) until the next frame of data is ready to be inputted into said input register as determined by the occurrence of said frame timing signal.

8. The method according to claim 7, further including the steps of:
  (a) testing the first encoded parameter loaded into said input register after the occurrence of said frame timing signal to determine whether the first encoded parameter is a preselected code; and
  (b) generating said inhibit signal until the next frame of data is ready to be inputted into said input register as determined by the occurrence of said frame timing signal when said first encoded parameter is the preselected code.

9. The method according to claim 7 or 8, further including the steps of:
  (a) testing the second encoded parameter loaded into said input register after the occurrence of said frame timing signal to determine whether the speech is voiced or unvoiced; and
  (b) when said speech is unvoiced, generating said inhibit signal:
    (i) after at least three of said encoded parameters have been inputted to said speech synthesis circuit via said input register; and
    (ii) until the next frame of data is ready to be inputted into said input register as determined by the occurrence of said frame timing signal.

10. A speech synthesis system comprising:
  (a) memory means for storing variable frame length data, said variable frame length data including encoded variable length speech parameters representative of pitch, energy and filter coefficients, each frame of said variable frame length data including at least one encoded parameter;
  (a) control means coupled to said memory means for selectively addressing said variable frame length data;
  (c) speech synthesis means coupled to said memory means for converting said encoded variable length speech parameters into analog signals representative of human speech, said speech synthesis means including:
    a parametric data converter comprising:
      (i) timing means for generating a frame timing signal indicative of the start of a frame of data as well as parameter timing signals indicative of the start of each encoded parameter in a frame:
      (ii) an input register, coupled to said memory means, whose length is sufficient to accommodate the longest of said encoded parameters;
      (iii) an input register control means coupled to said input register and said timing means for controlling the inputting of said encoded speech parameters into said input register in timed relationship with said parameter timing signals generated by said timing means, in the absence of an inhibit signal, and for prohibiting the inputting of said encoded speech parameters into said input register in the presence of an inhibit signal;
      (iv) first circuit means, coupled to said input register and said timing means, for testing a first encoded parameter in a frame of data to determine whether said frame contains only one encoded parameter, said first encoded parameter having at least one preselected code indicating said frame of data contains only one encoded parameter; and
      (v) second circuit means, coupled to said first circuit means and said timing means for generating said inhibit signal in response to said first circuit means detecting said at least one preselected code, said inhibit signal being generated until said timing means indicates the start of a next frame of data; and
  (d) audio means for converting said analog signals representative of human speech into audible sounds.

11. The speech synthesis system according to claim 10 wherein said parametric data converter further includes means for testing a second encoded parameter in a frame of data to determine whether said frame contains only two encoded parameters, said second encoded parameter having at least one preselected code indicating said frame of data contains only two encoded parameters.

12. The system according to claim 11 wherein said parametric data converter further includes means for testing a second encoded parameter in a frame of data to determine whether said frame contains only three encoded parameters, said second encoded parameter having at least one preselected code indicating said frame of data contains only three encoded parameters.

13. The system according to claim 10 wherein said parametric data converter further includes an encoded parameter storage means, coupled to said input register, for storing encoded parameters inputted to said input register.

14. The system according to claim 13 wherein said parametric data converter further includes a digital storage means for storing a plurality of decoded parameters and means for addressing said digital storage means utilizing said encoded parameters stored in said encoded parameter storage means.

15. The system according to claim 14 wherein said digital storage means comprises a read only memory.

16. The system according to claim 10 wherein said first encoded parameter is indicative of an energy parameter and wherein the state of said energy parameter equal to zero is indicative of a pause during speech.

17. The system according to claim 12, wherein said second encoded parameter is indicative of a repeat frame in which said three encoded parameters are indicative of an energy parameter, a repeat parameter and a pitch parameter.

18. The system according to claim 12 wherein said parametric data converter further includes means for testing a third encoded parameter in a frame of data to determine whether said frame of data contains some preselected number of parameters, said preselected number being less than the maximum number of parameters, said third encoded parameter having at least one preselected code indicating said frame of data contains said preselected number of parameters.

19. The system according to claim 18 wherein said third encoded parameter is indicative of a pitch parameter and wherein the state of said pitch parameter equal to zero is indicative of an unvoiced speech period.

20. The system according to claim 18 wherein said preselected number is six less than said maximum number.

* * * * *